US011556132B2

(12) United States Patent
Nishi et al.

(10) Patent No.: US 11,556,132 B2
(45) Date of Patent: Jan. 17, 2023

(54) WORK VEHICLE

(71) Applicant: KUBOTA CORPORATION, Osaka (JP)

(72) Inventors: Keishiro Nishi, Osaka (JP); Atsushi Shinkai, Osaka (JP); Tomofumi Fukunaga, Osaka (JP); Takahiro Nakatsuka, Osaka (JP); Yushi Matsuzaki, Osaka (JP); Kazuo Sakaguchi, Hyogo (JP); Takafumi Morishita, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 766 days.

(21) Appl. No.: 16/479,436

(22) PCT Filed: Dec. 21, 2017

(86) PCT No.: PCT/JP2017/046013
§ 371 (c)(1),
(2) Date: Jul. 19, 2019

(87) PCT Pub. No.: WO2018/135234
PCT Pub. Date: Jul. 26, 2018

(65) Prior Publication Data
US 2019/0384321 A1    Dec. 19, 2019

(30) Foreign Application Priority Data

Jan. 20, 2017  (JP) ............................. JP2017-008347
Jan. 20, 2017  (JP) ............................. JP2017-008351
(Continued)

(51) Int. Cl.
*G05D 1/02*    (2020.01)
*A01B 69/04*   (2006.01)
(Continued)

(52) U.S. Cl.
CPC ......... *G05D 1/0278* (2013.01); *A01B 69/008* (2013.01); *B60Q 1/50* (2013.01);
(Continued)

(58) Field of Classification Search
CPC .. G05D 1/0278; G05D 1/0016; G05D 1/0088; G05D 2201/0201; A01B 69/008;
(Continued)

(56) References Cited

U.S. PATENT DOCUMENTS 6,279,989 B1 *   8/2001  Marchart ............... B62D 65/06
                                                    296/210
7,029,060 B1 *   4/2006  Osterberg ............... B60R 13/04
                                                    296/210
(Continued)

FOREIGN PATENT DOCUMENTS

AU     2015347785 A9    5/2016
EP     3 104 244 A1    12/2016
(Continued)

OTHER PUBLICATIONS

English translation of JP-2016002874-A (Year: 2016).*
(Continued)

*Primary Examiner* — Yazan A Soofi
(74) *Attorney, Agent, or Firm* — Greenblum & Bernstein, P.L.C.

(57) ABSTRACT

A work vehicle includes: an electronic control system for automatic driving; and a cabin with which a boarding space is formed. The electronic control system includes an antenna unit for satellite navigation, and the antenna unit is attached to a central area of a roof of the cabin in a left-right direction. An upper surface of an area of the roof around the antenna unit is formed so as to be an inclined surface that is inclined in a front-rear direction. Left and right end portions of the roof are provided with left and right bulging edge portions (Continued)

that bulge upward from the left and right end portions and have a length that spans between front and rear ends of the roof, and water drain grooves that guide water on the roof toward the left and right bulging edge portions such that water detours the antenna unit.

3 Claims, 23 Drawing Sheets

(30) Foreign Application Priority Data

Apr. 26, 2017 (JP) .............................. JP2017-087496
Apr. 26, 2017 (JP) .............................. JP2017-087497

(51) Int. Cl.
| | |
|---|---|
| *B60Q 1/50* | (2006.01) |
| *B60R 11/02* | (2006.01) |
| *B62D 25/07* | (2006.01) |
| *B62D 33/06* | (2006.01) |
| *G05D 1/00* | (2006.01) |
| *H01Q 1/27* | (2006.01) |

(52) U.S. Cl.
CPC .......... *B60R 11/0258* (2013.01); *B62D 25/07* (2013.01); *B62D 33/0617* (2013.01); *G05D 1/0016* (2013.01); *G05D 1/0088* (2013.01); *H01Q 1/27* (2013.01); *G05D 2201/0201* (2013.01)

(58) Field of Classification Search
CPC ....... B60Q 1/50; B60R 11/0258; B62D 25/07; B62D 33/0617; H01Q 1/27
USPC ......................................................... 180/204
See application file for complete search history.

(56) References Cited

U.S. PATENT DOCUMENTS

| | | | | |
|---|---|---|---|---|
| 11,396,288 | B2* | 7/2022 | Tashiro .................. | B60K 35/00 |
| 2005/0077757 | A1* | 4/2005 | Schonauer ........... | H01Q 1/3283 |
| | | | | 296/215 |
| 2008/0224503 | A1* | 9/2008 | Betzl ...................... | B60J 7/0084 |
| | | | | 296/213 |
| 2009/0102241 | A1* | 4/2009 | Harberts ................. | B60R 13/04 |
| | | | | 296/213 |
| 2014/0324291 | A1* | 10/2014 | Jones .................... | G01C 21/165 |
| | | | | 701/41 |
| 2017/0177002 | A1* | 6/2017 | Ogura .................. | G05D 1/0278 |
| 2017/0322550 | A1* | 11/2017 | Yokoyama ............ | A01B 63/111 |
| 2019/0382005 | A1* | 12/2019 | Nishi ................... | A01B 69/001 |
| 2020/0251809 | A1* | 8/2020 | Hanada ................. | H01Q 5/307 |

FOREIGN PATENT DOCUMENTS

| | | | |
|---|---|---|---|
| JP | 62-292004 | A | 12/1987 |
| JP | 63-165906 | U | 10/1988 |
| JP | 044761/1993 | | 6/1993 |
| JP | 6-61592 | U | 8/1994 |
| JP | 9-58525 | A | 3/1997 |
| JP | 2003-017916 | | 1/2003 |
| JP | 2003-335180 | A | 11/2003 |
| JP | 2006-188118 | A | 7/2006 |
| JP | 2007-022455 | | 2/2007 |
| JP | 2008-081048 | | 4/2008 |
| JP | 2009-240183 | | 10/2009 |
| JP | 2009-245002 | | 10/2009 |
| JP | 2010-121270 | | 6/2010 |
| JP | 2010-121270 | A | 6/2010 |
| JP | 2013/196040 | | 9/2013 |
| JP | 2014-197821 | A | 10/2014 |
| JP | 2015-020674 | | 2/2015 |
| JP | 2016-002874 | | 1/2016 |
| JP | 2016002874 | A * | 1/2016 |
| JP | 2016-40159 | A | 3/2016 |
| JP | 2016-094093 | | 5/2016 |
| JP | 2016-095660 | | 5/2016 |
| JP | 2016-095661 | | 5/2016 |
| JP | 2016-168883 | | 9/2016 |
| KR | 10-2007-0117774 | A | 12/2007 |
| WO | 2018/135234 | A1 | 7/2018 |

OTHER PUBLICATIONS

Office Action issued from Japanese Patent Application No. 2020-030671 dated Dec. 22, 2020, and along with English Translation thereof.
Extended European Search Report issued in European Patent Application No. 17892932.9 dated Sep. 29, 2020.
International Search Report dated Apr. 3, 2018 in International Application No. PCT/JP2017/046013.
Office Action in JP Application 2017-087496, dated Oct. 2, 2019, and English language translation thereof.
Office Action in JP Application 2017-008347, dated Oct. 2, 2019, and English language translation thereof.
Office Action in JP Application No. 2017-008351, dated (drafted) Mar. 10, 2020, and English translation thereof.
Office Action in JP Application No. 2017-087496, dated (drafted) Feb. 6, 2020, and English translation thereof.

* cited by examiner

WORK VEHICLE

TECHNICAL FIELD

The present invention relates to a work vehicle such as a tractor.

BACKGROUND ART

Background Art 1

Some work vehicles are provided with an automatic driving electronic control system for automatically driving a vehicle body, and a cabin in which a boarding space is formed.

In a work vehicle disclosed in Patent Document 1, an antenna unit for satellite navigation (a moving GPS antenna) is attached to the roof of the cabin in order to improve its sensitivity when receiving radio waves from a GPS satellite.

Background Art 2

Some work vehicles are provided with an automatic driving electronic control system for automatically driving a vehicle body, and a cabin in which a boarding space is formed.

Regarding the tractor disclosed in Patent Document 2 (an example of a work vehicle), a remote-control device that can wirelessly communicate with an electronic control unit of an electronic control system is provided. The tractor is configured such that, upon a first switch of the remote control device being manually operated while the tractor has stopped, the electronic control unit starts or resumes automatic travel of the tractor, and upon a second switch being manually operated while the tractor automatically travels, the electronic control unit stops or terminates automatic travel of the tractor.

Background Art 3

Some work vehicles are provided with a cabin that is provided in a rear portion of a vehicle body, and an automatic driving electronic control system for automatically driving the vehicle body.

In the work vehicle disclosed in the Patent Document 3, an antenna unit for satellite navigation, in which an inertial measurement unit (IMU), an antenna for satellite navigation (a moving GPS antenna), and so on are integrally provided is attached to the upper surface of a rear portion of the roof of the cabin such that the antenna unit can be easily detachable and thus the attachment position of thereof is adjustable.

Background Art 4

Some work vehicles are provided with an automatic driving electronic control system for automatically driving a vehicle body.

The work vehicle disclosed in Patent Document 4 is provided with a GPS display light (a display lamp), which is constituted by lamps of three colors that are layered in the top-bottom direction such that a green display lamp is turned on upon a GPS position information calculation means switching to an appropriate reception mode, a yellow display lamp is turned on upon the GPS position information calculation means switching to an unstable reception mode, and a red display lamp is turned on upon the GPS position information calculation means switching to an unreceivable mode, and the display light is provided so as to stand on an upper portion of the cabin that covers the driver part of the vehicle body.

PRIOR ART DOCUMENTS

Patent Documents

Patent Document 1: JP 2016-095661A
Patent Document 2: JP 2016-168883A
Patent Document 3: JP 2016-094093A
Patent Document 4: JP 2009-245002A

SUMMARY OF THE INVENTION

Problems to be Solved by the Invention

Problem 1

A problem corresponding to Background Art 1 is as follows.

If the antenna unit is attached to the roof of the cabin, there is the risk of rain water or washing water that has fallen on the upper surface of the roof flowing to the antenna unit and causing harmful effects on the antenna unit.

A typical antenna unit is provided with a plurality of through holes for bolting, formed in the coupling portion thereof. Therefore, it is envisaged that the antenna unit is attached to the roof of the cabin by forming a plurality of through holes for bolting in the upper surface of the roof, and bolting the antenna unit to the upper surface of the roof.

However, if the antenna unit is simply bolted to the upper surface of the roof, when rain water or washing water falls on the upper surface of the roof, there is the risk of rain water or washing water flowing to the through holes in the upper surface of the roof and entering the inside of the roof from the through holes in the upper surface of the roof.

Considering such a risk, it is possible to prevent rain water or washing water that has fallen on the upper surface of the roof from flowing to the antenna unit by forming a seat that bulges upward on an area of the upper surface of the roof to which the antenna unit is to be attached, and bolting the antenna unit to the upper surface of the seat. However, if this is the case, the total height of the vehicle body including the antenna unit increases because the antenna unit is attached to the upper surface of the seat that bulges upward. Therefore, if the height of the entrance of a barn or the like in which the work vehicle is to be stored is small, there is the risk of the antenna unit coming into contact with the frame or the like of the entrance and being damage when the work vehicle is moved into or out of the barn or the like.

In other words, it is desirable to avoid the risk of rain water or washing water causing harmful effects on the antenna unit, and the risk of rain water or washing water entering the inside of the roof from the area to which the antenna unit is attached, while suppressing an increase in the total height of the vehicle body including the antenna unit.

Problem 2

A problem corresponding to Background Art 2 is as follows.

As with the tractor disclosed in Patent Document 2, in a case where a remote-control device that can wirelessly communicate with an electronic control unit is provided, it is necessary that a tractor is provided with a communication antenna for the remote-control device. In order to improve the performance of communication with the remote-control device, it is desirable to provide a large-sized communication antenna on an upper end portion of the cabin.

However, if a large-sized communication antenna is provided on an upper end portion of the cabin, the total height of the vehicle body including the communication antenna increases. Therefore, if the height of the entrance of a barn or the like in which the work vehicle is to be stored is small, there is the risk of the communication antenna coming into contact with the frame or the like of the entrance and being damage when the tractor is moved into or out of the barn or the like. If a small-sized communication antenna is provided on the upper end portion of the cabin in order to prevent the communication antenna from being damaged, there is the risk of the communication performance of the communication antenna degrading.

Considering such a risk, it is possible to employ a communication antenna that is configured to be switchable to a usage state and a retracted state. However, such a configuration is costly, and if the user fails to switch the communication antenna to the usage state, there is the risk of communication performance degrading. If the user fails to switch the communication antenna to the retracted state, there is the risk of communication antenna being damaged.

In other words, it is desirable to improve the communication performance of the communication antenna while suppressing an increase in the total height of the vehicle body including the communication antenna.

Problem 3

A problem corresponding to Background Art 3 is as follows.

In the case of measuring the position and orientation of a vehicle body using a global navigation satellite system (GNSS) such as a global positioning system (GPS) or the like, the measured position and orientation of the vehicle body include positioning errors due to displacement of an antenna for satellite navigation, resulting from yawing, pitching, or rolling of the vehicle body. In order to enable correction for removing such positioning errors, it is necessary to provide the vehicle body with an inertial measurement unit that measure the yaw angle, pitch angle, roll angle, and so on of the vehicle body, and calculate the amount of displacement of the antenna for satellite navigation resulting from yawing, pitching, or rolling of the vehicle body, based on the results of measurement performed by the inertial measurement unit. In order to make it easier to obtain the amount of displacement of the antenna, it is envisaged that the antenna for satellite navigation and the inertial measurement unit are integrated into an antenna unit.

When such an antenna unit is to be used, it is preferable that the antenna for satellite navigation is provided on the uppermost portion of the vehicle body in order to improve its sensitivity when receiving radio waves from a satellite. Also, in order to make it easier to perform correction when measuring the yaw angle, pitch angle, roll angle, and so on of the vehicle body, it is preferable that the inertial measurement unit is located at the center of gravity of the vehicle body. As a result, there are difficulties in positioning the antenna unit.

In the work vehicle disclosed in Patent Document 3, the antenna unit is provided on the upper surface of the roof of the cabin, and therefore the antenna for satellite navigation achieves high sensitivity when receiving radio waves from a satellite.

However, in this work vehicle, the antenna unit is attached to the upper surface of a rear portion of the roof of the cabin that is provided in a rear portion of the vehicle body, and therefore at least the inertial measurement unit is located far away from the center of gravity of the vehicle body in an upward direction and a rearward direction. Therefore, it is necessary to perform complex calculations to appropriately correct the yaw angle and so on, measured by the inertial measurement unit, based on the amount of displacement of the inertial measurement unit from the center of gravity of the vehicle body, and it is difficult to swiftly and appropriately correct the results of measurement performed by the inertial measurement unit.

Also, if the position at which the antenna unit is attached is adjusted, the position at which the inertial measurement unit is attached is accordingly changed, and the amount of displacement of the inertial measurement unit from the center of gravity of the vehicle body changes as well. Therefore, in order to appropriately correct the results of measurement performed by the inertial measurement unit based on the amount of displacement of the inertial measurement unit described above, it is necessary to calculate the above-described amount of displacement of the inertial measurement unit according to the adjustment of the position of the antenna unit. As a result, there are significant difficulties in appropriately correcting the results of measurement performed by the inertial measurement unit, based on the amount of displacement described above.

Furthermore, since the position of the antenna unit can be easily adjusted, there is the risk of the attachment position of the antenna unit being easily changed by the user or the like. If the attachment position is easily changed in such a manner, the amount of displacement of the inertial measurement unit from the center of gravity of the vehicle body cannot be easily calculated, and accordingly the results of measurement performed by the inertial measurement unit cannot be appropriately corrected.

In other words, it is desirable to make it possible to more easily and accurately measure the position and orientation of the vehicle body using a GNSS.

Problem 4

A problem corresponding to Background Art 4 is as follows.

With the configuration disclosed in Patent Document 4, when a work vehicle is automatically driven using a GPS, which is an example of a global navigation satellite system (GNSS), an administrator outside the work vehicle can easily grasp the reception state of the GPS position information calculation means from the outside based on the color of the display light provided so as to stand on the upper portion of the cabin.

However, the display light displays the reception state of the GPS position information calculation means, and does not display the driving state of the vehicle body. Therefore, the administrator outside the work vehicle, watching the operation of the work vehicle, cannot grasp the driving state of the vehicle body of the work vehicle that is automatically driven, based on the action of the display light.

Also, with the above-described configuration, the entire display light is located upward of the upper end of the cabin relative to the vehicle body, and the height of the vehicle body including the display light is large. As a result, if the height of the entrance of a barn or the like in which the work vehicle is to be stored is small, it is difficult to move the work vehicle into or out of the barn or the like.

Considering the above problem, it is desirable to enable an administrator outside the vehicle to easily grasp the driving state of the vehicle body of the work vehicle that is automatically driven, based on the action of the display light, without making it difficult to move the work vehicle into or out of the barn or the like.

Means for Solving Problems

1. In view of Problem 1, the following work vehicle is proposed.

A work vehicle comprising:

an electronic control system for automatic driving through which a vehicle body is automatically driven; and a cabin with which a boarding space is formed, wherein the electronic control system includes an antenna unit for satellite navigation, and the antenna unit is attached to a central area of a roof of the cabin in a left-right direction, an upper surface of an area of the roof around the antenna unit is formed so as to be an inclined surface that is inclined in a front-rear direction, and left and right end portions of the roof are provided with left and right bulging edge portions that bulge upward from the left and right end portions and have a length that spans between front and rear ends of the roof, and water drain grooves that guide water on the roof toward the left and right bulging edge portions such that water detours the antenna unit.

With this configuration, rain water or washing water that has fallen on the upper surface of the roof is likely to flow toward the left and right bulging edge portions, detouring the antenna unit, due to the guiding effect of the water drain grooves. Rain water or washing water that has flowed toward the left and right bulging edge portions is likely to flow downward of the inclined surface along the bulging edge portions at the left and right ends that are away from the antenna unit at the center in the left-right direction, due to the guiding effect of the inclined surface, and accordingly flows downward of the roof from one edge of the roof in the front-rear direction located downward of the inclined surface.

Thus, it is possible to prevent rain water or washing water that has fallen on the upper surface of the roof from flowing toward the antenna unit located at the center of the roof in the left-right direction, without forming a bulging seat for attaching the antenna unit thereto on the upper surface of the roof.

In other words, it is possible to avoid the risk of rain water or washing water causing harmful effects on the antenna unit, and the risk of rain water or washing water entering the inside of the roof from the area to which the antenna unit is attached, while suppressing an increase in the total height of the vehicle body including the antenna unit.

Also, during work travel in rainy weather, a large portion of the rain water that has fallen on the upper surface of the roof flows downward of the inclined surface along the left and right bulging portions formed at the left and right end portions of the roof, and thereafter falls downward of the roof from the left and right ends of one edge of the roof in the front-rear direction. Therefore, it is possible to prevent visibility in the forward direction from degrading due to rain water falling from the roof.

In a preferable embodiment, the water drain grooves include a first groove portion that is provided in the inclined surface at a position on a higher-side area that is higher than the antenna unit and extends in the left-right direction so as to span between the left and right bulging edge portions, and left and right second groove portions that respectively extend from left and right ends of the first groove portion toward left and right ends of a front edge of the roof across the left and right bulging edge portions.

With this configuration, rain water or washing water that has fallen on the upper surface of the roof flows into the first groove portion and is subjected to the guiding effect of the first groove portion in the course of flowing toward the antenna unit due to the guiding effect of the inclined surface, and is likely to flow toward the left and right bulging edge portions due to this guiding effect. A large portion of the rain water or washing water that has flowed toward the left and right bulging edge portions flows toward the left and right ends of one edge of the roof in the front-rear direction across the left and bulging edge portions under the guiding effect of the left and right second groove portions, and thereafter flows downward of the roof from the left and right ends of one edge in the front-rear direction, which are located laterally outward of the left and right bulging edge portions, with respect to the vehicle body.

Thus, it is possible to more reliably prevent rain water or washing water that has fallen on the upper surface of the roof from flowing toward the antenna unit located at the center of the roof in the left-right direction. As a result, it is possible to more reliably avoid the risk of rain water or washing water causing harmful effects on the antenna unit, and the risk of rain water or washing water entering the inside of the roof from the area to which the antenna unit is attached.

Also, during work travel in rainy weather, a large portion of the rain water that has fallen on the upper surface of the roof falls downward of the roof from the left and right ends of one edge of the roof in the front-rear direction, located laterally outward of the left and right bulging edge portions, with respect to the vehicle body. Therefore, it is possible to more effectively prevent visibility in the forward direction from degrading due to rain water falling from the roof.

In one preferable embodiment, the roof is provided with a recessed portion for connecting a connector for the antenna unit thereto, at a position on a higher-side area of the inclined surface that is adjacent to the antenna unit.

With this configuration, while the inclined surface is formed on the roof around the antenna unit to improve drainage around the antenna unit, the connector can be easily connected to the antenna unit without forming a bulging seat for attaching an antenna unit thereto on the upper surface of the roof.

In one preferable embodiment, the roof is provided with a communication antenna that is attached to an area that is adjacent to the antenna unit, the roof is provided with left and right guide grooves that respectively position and guide a cable that is connected to the antenna unit and a cable that is connected to the communication antenna, to positions below the roof, and the left and right guide grooves include first guide portions that are formed in the inclined surface and second guide portions that are formed in the left and right bulging edge portions.

With the above-described configuration, the cable for the antenna unit and the cable for the communication antenna can be routed along the left and right guide grooves from the upper surface of the roof toward positions below the roof so as not to protrude upward from the upper surface of the roof. Thus, it is possible to avoid the risk of the cable for the antenna unit and the cable for the communication antenna protruding upward from the upper surface of the roof and getting caught on another object.

Also, it is unnecessary to form through holes for inserting cables therethrough in the upper surface of the roof, and therefore it is unnecessary to provide a waterproof member to prevent water from entering from the through holes for inserting cables therethrough. As a result, it is possible to simplify the configuration by reducing the number of parts, for example.

2. In view of Problem 2, the following work vehicle is proposed.

A work vehicle comprising:

an electronic control system for automatic driving through which a vehicle body is automatically driven; and a cabin with which a boarding space is formed, wherein the electronic control system includes a communication module that wirelessly communicates with a remote-control tool, the communication module includes a communication antenna that is attached to a roof of the cabin, and an element that improves communication sensitivity of the communication antenna, and the element is housed in an internal space of the roof.

With this structure, the element can increase the radio wave gain of the communication antenna. Therefore, the communication antenna can be downsized. Due to such downsizing, even if the communication antenna is attached to the roof of the cabin to improve the communication sensitivity of the communication antenna, the total height of the vehicle body including the communication antenna can be kept small. Also, as a result of the element being housed in the internal space of the roof, and therefore the communication antenna and the element can be compactly provided in the roof of the cabin compared to when the element is provided outside the roof.

As a result, it is possible to improve the communication performance of the communication antenna while avoiding an increase in the total height of the vehicle body including the communication antenna.

In one preferable embodiment, the element is coupled to a roof frame of the roof, and supports the communication antenna, using an outer roof of the roof.

With this configuration, the element can also be used as a support member that supports the outer roof of the roof and the communication antenna.

As a result, it is possible to simplify the configuration by reducing the number of parts, for example.

In one preferable embodiment, the roof is provided with a coupling portion to which a support tool that supports the communication antenna and the element are bolted, the coupling portion is provided with a plurality of through holes for bolting and a plurality of rubber sleeves that are fitted into the through holes, the rubber sleeves each include an upper flange portion and a lower flange portion, and when the support tool and the element are bolted to the coupling portion, the upper flange portion is in close contact with an upper surface of the roof and a bottom surface of the support tool, and the lower flange portion is in close contact with an inner surface of the roof and an upper surface of the element.

With this configuration, in a state where the support tool and the element are bolted to the coupling portion of the roof, the upper flange portions of the rubber sleeves are in close contact with the upper surface of the roof and the bottom surface of the support tool, and the lower flange portions of the rubber sleeves are in close contact with the inner surface of the roof and the upper surface of the element, and thus rain water or washing water is prevented from entering the inside of the cabin through the through holes of the coupling portion.

That is to say, the plurality of rubber sleeves that each include the upper and lower flange portions also serve as waterproof members, and therefore it is possible to prevent water from entering the inside of the cabin while simplifying the configuration by reducing the number of parts.

3. In view of Problem 3, the following work vehicle is proposed.

A work vehicle comprising:

a cabin that is provided in a rear portion of a vehicle body; and an electronic control system for automatic driving through which the vehicle body is automatically driven, wherein the electronic control system includes an antenna unit for satellite navigation that includes an inertial measurement unit, and the antenna unit is attached to a central area, in a left-right direction, of an upper surface of a front portion of a roof of the cabin such that the antenna unit is located at a midpoint of a track and a midpoint of a wheelbase of the vehicle body.

With this configuration, the antenna unit is attached to the upper surface of the roof of the cabin, and therefore the antenna unit achieves high sensitivity when receiving radio waves from a satellite. Also, as described above, the attachment position of the inertial measurement unit is determined depending on the attachment position of the antenna unit. Therefore, it is unnecessary to calculate the amount of displacement of the inertial measurement unit from the position of the center of gravity of the vehicle body according to the adjustment of the position of the inertial measurement unit. In addition, there is no risk of the attachment position of the inertial measurement unit from being easily changed by a user or the like.

Also, the inertial measurement unit is located at a midpoint of a track and a midpoint of a wheelbase of the vehicle body, and therefore, at least in a plan view, the attachment position of the inertial measurement unit is close to the position of the center of gravity of the vehicle body. As a result, it is possible to easily perform calculation for correcting the yaw angle and so on measured by the inertial measurement unit, based on the amount of displacement of the inertial measurement unit, and thus it is possible to swiftly and correctly correct the result of measurement performed by the inertial measurement unit. That is to say, the inertial measurement unit can swiftly and accurately measure the yaw angle and so on of the vehicle body.

As a result, when the position and orientation of the vehicle body are to be measured using a GNSS, if the antenna unit is displaced due to yawing, pitching, or rolling of the vehicle body, it is possible to swiftly and accurately obtain the amount of displacement of the antenna unit in such a case based on, for example, the yaw angle, pitch angle, and roll angle of the vehicle body measured by the inertial measurement unit. Then, positioning errors included in the position and orientation of the vehicle body measured using the GNSS, resulting from displacement of the antenna unit, can be obtained swiftly and accurately, based on the amount of displacement of the antenna unit that can be obtained from the result of measurement performed by the inertial measurement unit, and it is possible to swiftly and appropriately perform correction to eliminate the positioning errors from the result of measurement.

As a result, it is possible to easily, swiftly, and accurately measure the position and orientation of the vehicle body using a GNSS.

In one preferable embodiment, the roof is provided with a coupling portion to which the antenna unit is bolted, the coupling portion is provided with a plurality of through holes for bolting and a plurality of rubber sleeves that are fitted into the through holes, the rubber sleeves respectively include flange portions, and when the antenna unit is bolted to the coupling portion of the roof, the flange portion is in close contact with an upper surface of the roof and a bottom surface of the antenna unit.

With this configuration, in a state where the antenna unit is bolted to the coupling portion of the roof, the flange portions of the rubber sleeves are located between the upper surface of the roof and the bottom surface of the antenna unit, and thus vibrations of the vehicle body are unlikely to be transmitted to the antenna unit. Also, the flange portions of the rubber sleeves are in close contact with the upper surface of the roof and the bottom surface of the antenna unit, and thus rain water or washing water is prevented from entering the inside of the cabin through the through holes of the coupling portion.

That is to say, the plurality of rubber sleeves that each include a flange portion serve as vibration-proof members and waterproof members, and thus it is possible to support the antenna unit in a vibration-proof manner, and prevent water from entering the inside of the cabin, while simplifying the configuration.

In one preferable embodiment, an upper surface of a front portion of the roof is formed so as to be inclined downward in a forward direction, and a seat for attaching the antenna unit thereto is formed on a central area of the front portion of the roof in the left-right direction so as to bulge upward.

With this configuration, rain water or washing water that has fallen on the upper surface of the roof swiftly flows to a front portion of the roof and flows downward from the front edge of the roof, without being retained around the antenna unit. Thus, while drainage around the antenna unit is improved, the seating surface of the seat, to which the antenna unit is to be attached, can be formed as a flat surface or the like that is suitable for attaching the antenna unit thereto, unlike the upper surface of a front portion of the roof.

As a result, the antenna unit can be attached in an appropriate orientation, while rain water or washing water is prevented from being retained around the antenna unit and causing harmful effects on the antenna unit and so on.

Also, the upper surface of a front portion of the roof, to which the antenna unit is to be attached, is formed so as to be inclined downward in the forward direction, and is lower than the upper surface of a rear portion of the roof. Therefore, the height of the vehicle including the antenna unit is smaller than when the antenna unit is attached to the upper surface of the rear portion of the roof. Such a configuration makes it easier to move the tractor into or out of a barn or the like to which the tractor is to be stored, via the entrance thereof.

In one preferable embodiment, the roof is provided with water drain grooves formed in an upper surface thereof so as to extend from an area to which the antenna unit is attached to left and right ends of a front edge of the roof.

With this configuration, rain water or washing water that has fallen on an area around the antenna unit is likely to flow from the area round the antenna unit toward the left and right ends of the front edge of the roof along the water drain grooves. Rain water or washing water that has reached the left and right ends of the front edge of the roof flows downward from the left and right ends of the front edge of the roof.

As a result, rain water or washing water is prevented from being retained around the antenna unit and causing harmful effects on the antenna unit and so on. Also, during work travel in rainy weather, a large portion of the rain water that has fallen on the upper surface of the roof flows downward from the left and right ends of the front edge of the roof. Therefore, it is possible to effectively prevent visibility in the forward direction from degrading due to rain water falling from the roof.

4. In view of Problem 4, the following work vehicle is proposed.

A work vehicle comprising:

an electronic control system for automatic driving through which a vehicle body is automatically driven, wherein the electronic control system includes an external display unit that displays a driving state of the vehicle body during automatic driving so as to be externally visible, and the external display unit includes left and right display lights that are provided on left and right-side portions of the vehicle body, and an external display control unit configured to control actions of the display lights according to the driving state of the vehicle body during automatic driving.

With this configuration, the left and right display lights are provided on left and right-side portions of the vehicle body. Therefore, even if the display lights are provided such that the entirety of each display light does not to protrude upward from the upper end of the vehicle body in order to prevent the height of the vehicle from increasing, the administrator outside the work vehicle that is automatically driven can easily visually check the state of action of one of the left and right display lights. Through such a visual check, the administrator can easily grasp the driving state of the vehicle body of the work vehicle during automatic driving.

As a result, it is possible to enable the administrator outside the vehicle to easily grasp the driving state of the vehicle body of the work vehicle that is automatically driven, based on the action of the left and right display lights, without making it difficult to move the work vehicle into or out of a barn or the like.

In one preferable embodiment, the display lights include layered display lights in each of which a plurality of display units of different display colors are layered, and the layered display lights are provided on left and right-side portions of the vehicle body in a vertical orientation in which the plurality of display units are arranged in a top-bottom direction.

With this configuration, it is possible to change the display unit that operates, as well as to change the state of action of the display lights, depending on the driving state of the vehicle body that is automatically driven. Thus, it is possible to enable an administrator outside the vehicle to grasp more information regarding the driving state of the vehicle body of a work vehicle that is automatically driven.

Also, it is possible to provide the left and right layered display lights on the vehicle body such that the state of action of the display units can be easily visually checked from the outside of the work vehicle, while reducing the amount of bulging of the left and right layered display lights from the vehicle body, compared to a configuration in which the plurality of display units arranged in a left-right direction are provided on left and right side portions of the vehicle body in a horizontal orientation.

As a result, it is possible to enable an administrator outside the vehicle to grasp more information regarding the driving state of the vehicle body of the work vehicle that is automatically driven, based on the action of the left and right display lights, while suppressing an increase in the size of the vehicle body.

In one preferable embodiment, a cabin with which a boarding space is formed is mounted on the vehicle body, and the layered display lights are provided laterally outside of left and right rear pillars of the cabin.

With this configuration, even if the work vehicle is provided with a cabin, an administrator outside the vehicle can visually check the state of action of one of the left and right layered display lights, without being interfered with by the cabin. That is to say, although a cabin is provided, it is possible to enable administrator outside the vehicle to easily grasp the driving state of the vehicle body of the work vehicle that is automatically driven, based on the action of the left and right layered display lights.

In one preferable embodiment, the layered display lights are located at positions that are inward of lateral outer ends of left and right travel apparatuses, with respect to the vehicle body, and that are downward of a roof of the cabin, with respect the vehicle body.

With this configuration, the left and right layered display lights are located at positions that are downward of the roof of the cabin with respect to the vehicle body, within the length of the vehicle body in the front-rear direction, and within the width of the vehicle body in the left-right direction. With this configuration, although the left and right layered display lights are provided laterally outward of the left and right rear pillars, where they can be easily visually checked by an administrator outside the vehicle, it is possible to avoid the risk of the left and right layered display lights coming into contact with a barn or the like when the work vehicle is moved into or out of the barn or the like.

In one preferable embodiment, the cabin is provided with support members that respectively support combination lamps that each include a brake lamp and a blinker lamp, and the layered display lights are respectively supported by the support members so as to be located laterally outside the combination lamps.

With this configuration, while the support members are used to support the layered display lights, the layered display lights can be provided laterally outward of the left and right rear pillars such that an administrator is not prevented from visually checking the combination lamps from the front side or rear side of the vehicle body. Thus, it is possible to desirably provide the left and right layered display lights laterally outside the left and right rear pillars that can be easily visually checked from an administrator outside the vehicle, while simplifying the configuration through parts sharing.

In one preferable embodiment, the display lights include blinker lamps, and the external display control unit is configured to control actions of the blinker lights according to the driving state of the vehicle body during automatic driving.

With this configuration, the left and right blinker lamps that are not particularly required to be operated during travel in a farm field can be effectively used as display lights for enabling the administrator outside the vehicle to grasp the driving state of the vehicle body during automatic driving. Also, the left and right blinker lamps are provided at positions that can be more easily visually checked by a person outside the vehicle compared to the original state. Thus, it is possible to enable an administrator or the like outside the vehicle to easily grasp the state of action of each blinker lamp. That is to say, it is possible to enable an administrator or the like outside the vehicle to grasp the driving state of the vehicle body of the tractor during automatic driving, while simplifying the configuration through parts sharing.

Also, if the blinker lamps are effectively used as display lights, and other display lights are additionally provided, it is possible to enable an administrator or the like outside the vehicle to easily grasp more information regarding the driving state of the vehicle body of the work vehicle during automatic driving, while suppressing an increase in costs.

5. Other characteristic components and advantageous effects thereof will be apparent from the following description.

BRIEF DESCRIPTION OF THE DRAWINGS

FIG. 4 is a perspective view of an upper portion of a cabin, showing the shape of a roof, and so on.

FIG. 5 is a perspective view of a main portion, showing a frame structure for the cabin, a structure for supporting a ground plane, and so on.

FIG. 6 is a vertical rear view of a main portion, showing the shape of the roof, a structure for attaching the ground plane, and so on.

FIG. 8 is a vertical left side view of a main portion, showing the shape of a main portion of the roof, a structure for attaching the antenna unit, and so on.

FIG. 9 is a left side view of a tractor according to a second embodiment (the same applies up to FIG. 24), showing the positions of display lights, and so on.

FIG. 10 is a plan view of the tractor, showing the positions of the display lights, and so on.

FIG. 11 is a perspective view of the tractor, showing the positions of the display lights, and so on.

FIG. 16 is a front view of an upper portion of a cabin, showing the positions of display lights, and so on.

FIG. 17 is a rear view of the upper portion of the cabin, showing the positions of display lights, and so on.

FIG. 18 is a left side view of the upper portion of the cabin, showing the positions of display lights, and so on.

BEST MODE FOR CARRYING OUT THE INVENTION

In the following description, the arrow with a reference sign F in FIG. 1 indicates the front side of the tractor, and the arrow with a reference sign U indicates the upper side of the tractor.

Figure 2:
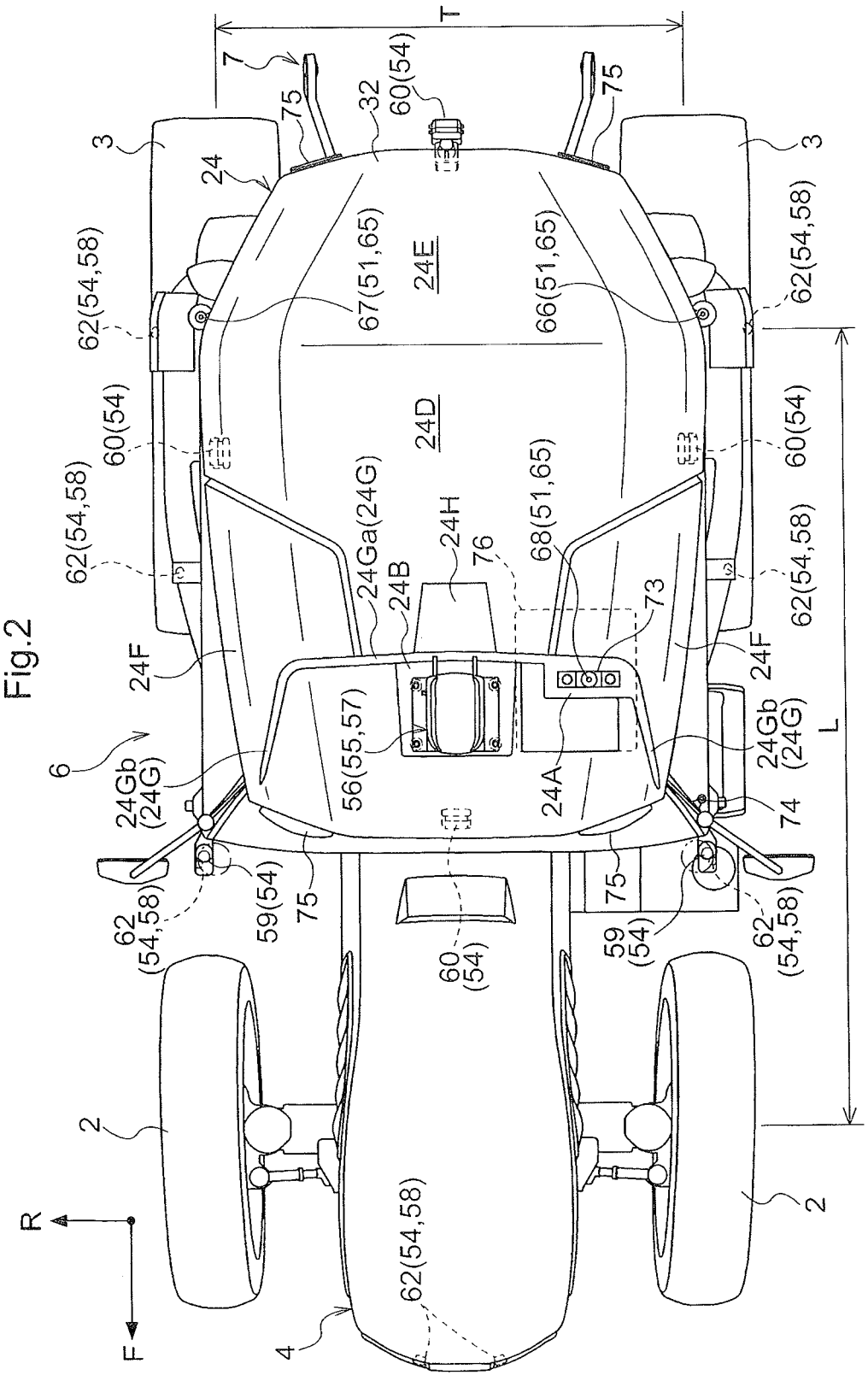
FIG. 2 is a plan view of the tractor.

The arrow with a reference sign F in FIG. 2 indicates the front side of the tractor, and the arrow with a reference sign R indicates the right side of the tractor.

First Embodiment

Figure 1:
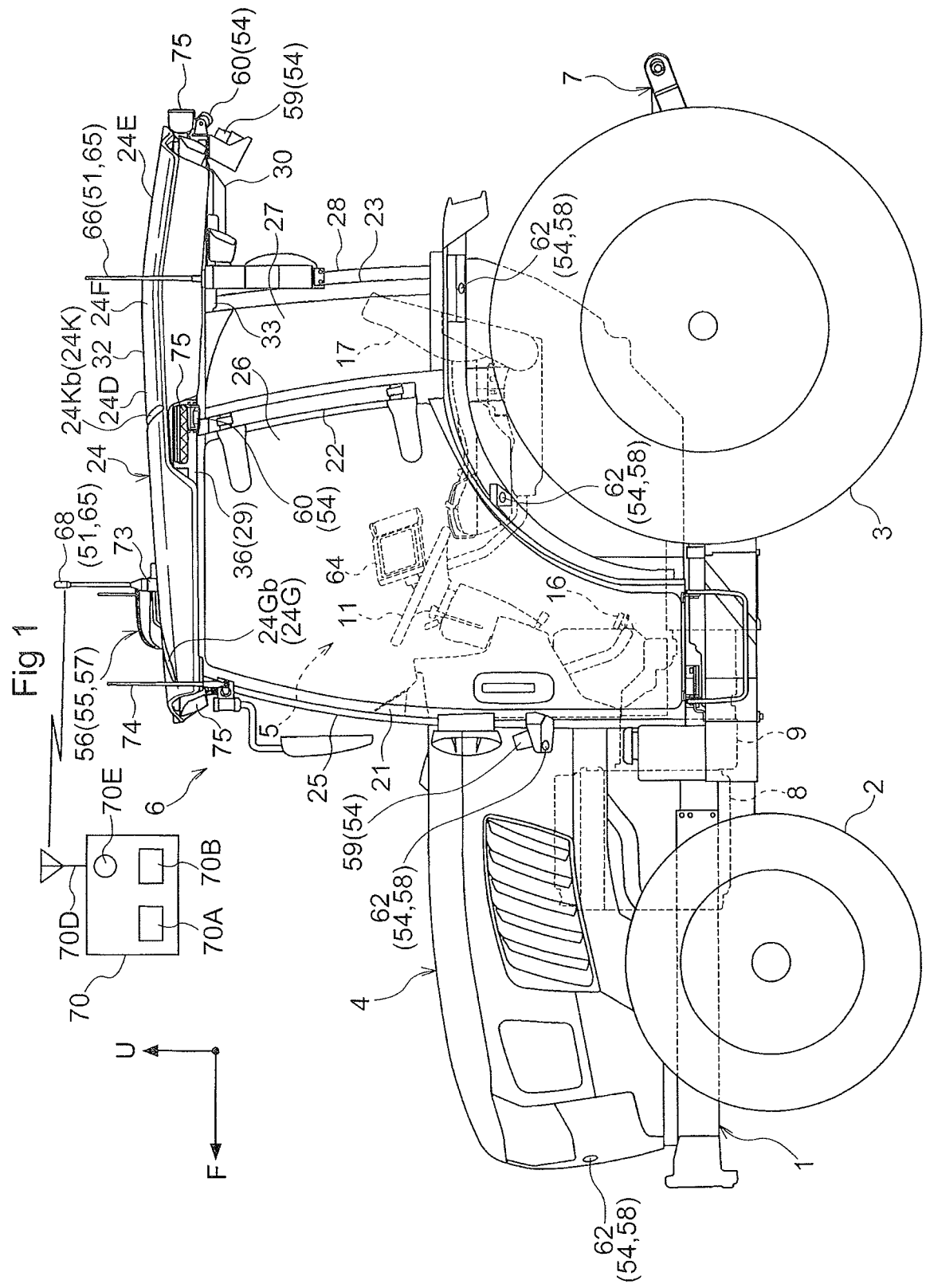
FIG. 1 is a left side view of a tractor according to a first embodiment (the same applies up to FIG. 8).
Figure 3:
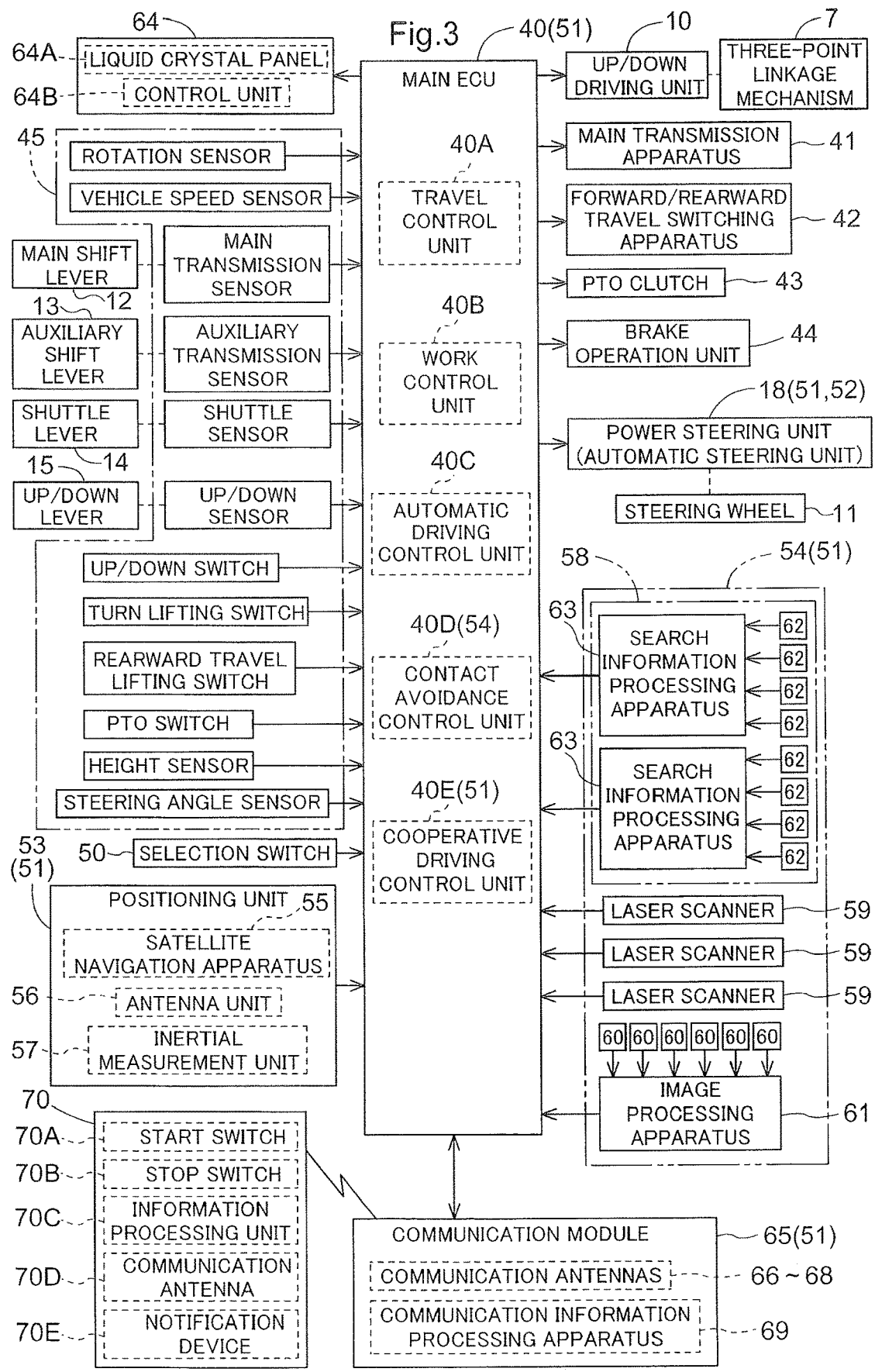
FIG. 3 is a block diagram showing a schematic configuration of a control system.

As shown in FIGS. 1 to 3, a tractor illustrated in the present embodiment (an example of a work vehicle) includes, for example: a vehicle body frame 1 that spans between front and rear ends of a vehicle body; left and right front wheels 2 that function as drivable steering wheels; left and right rear wheels 3 that function as drive wheels; a prime mover part 4 that is provided over a front portion of the vehicle body frame 1; a cabin 6 with which a boarding space and a driver part 5 are formed over a rear side portion of the vehicle body frame 1; a three-point linkage mechanism 7 that is used to couple a work apparatus thereto and is attached to a rear end portion of the vehicle body frame 1 so as to be able to swing up and down.

As shown in FIG. 1, the tractor includes, for example: an engine 8 provided in the prime mover part 4; a pedal-operation type main clutch 9 that connects and disconnects power from the engine 8; a speed change power transmission unit (not shown) that splits power transmitted via the main clutch 9 into travel power and work power, and performs speed change; and left and right side brakes (not shown) that affect the left and right rear wheels 3. An electronic control type diesel engine that is provided with a common rail system is employed as the engine 8.

As shown in FIG. 3, the three-point linkage mechanism 7 is driven to swing in the top-bottom direction as a result of action of an electronic hydraulic control type up/down driving unit 10 provided in the vehicle body. Although not shown in the drawings, a work apparatus such as a rotary cultivating apparatus, a plow, a disc harrow, a cultivator, a subsoiler, a sowing apparatus, a spraying apparatus, or the like can be coupled to the three-point linkage mechanism 7. If a work apparatus coupled to the three-point linkage mechanism 7 is driven type work apparatus such as a rotary cultivating apparatus, work power taken from a rear portion of the vehicle body is transmitted to the work apparatus via an external power transmission shaft or the like.

As shown in FIGS. 1 and 3, the driver part 5 includes, for example: various manual operation tools such as a steering wheel 11 for manual steering that enables manual steering of the left and right front wheels 2, a main shift lever 12, an auxiliary shift lever 13, a shuttle lever 14 for switching to forward travel and rearward travel, an up/down lever 15 for setting the height position of the work apparatus, an up/down switch for making an instruction to move the work apparatus up and down, a turn lifting switch, a rearward travel lifting switch, a PTO switch, a clutch pedal 16 that enables operation of the main clutch 9, and left and right brake pedals (not shown) that enable operation of the left and right side brakes; and a driver's seat 17. The steering wheel 11 is linked to the left and right front wheels 2 via a full hydraulic type power steering unit (hereinafter referred to as "a PS unit") 18.

As shown in FIGS. 1, 2, 4, and 5, the cabin 6 includes, for example: left and right front pillars 21; left and right center pillars 22; left and right rear pillars 23; a roof 24 supported by the pillars 21 to 23; a front panel 25 that constitutes the front face of the cabin 6; left and right door panels 26 that are supported by the left and right center pillars 22 so as to be able to swing to open and close; left and right side panels 27 that constitute rear side faces of the cabin 6; and a rear panel 28 that constitutes the rear face of the cabin 6.

As shown in FIGS. 1, 2, and 4 to 6, the roof 24 includes, for example: a roof frame 29 that is connected to the pillars 21 to 23; a rear cover 30 that extends rearward from the roof frame 29; an inner roof 31 that is made of resin and is attached to a lower portion of the roof frame 29; an outer roof 32 that is made of resin and is attached to an upper portion of the roof frame 29 and an upper portion of the rear cover 30; and an auxiliary frame 33 that is attached to a rear portion of the roof frame 29 so as to surround the rear cover 30 from the rear side. The roof 24 provides an internal space 34 that is surrounded by the rear cover 30, the inner roof 31, and the outer roof 32. An air conditioning unit (not shown) that performs air conditioning in the boarding space, a radio (not shown), and so on are stored in the internal space 34.

The roof frame 29 includes, for example: a front beam 35 that spans between the left and right front pillars 21; left and right side beams 36 that respectively span between the left and right front pillars 21 and the left and right rear pillars 23; and a rear beam 37 that spans between the left and right rear pillars 23, and the roof frame 29 has a substantially rectangular shape in plan view.

The left and right front pillars 21 are provided in the vehicle body at positions that are forward of a central portion of a wheelbase L of the vehicle body. Upper halves of the left and right front pillars 21 are curved such that, in a front view, they are located closer to a central portion of the vehicle body in the left-right direction at a higher position, and in a side view, they are located closer to a central portion of the vehicle body in the front-rear direction at a higher position. The left and right center pillars 22 are curved such that, in a front view, they are located closer to a central portion of the vehicle body in the left-right direction at a higher position, and in a side view, they are located closer to a central portion of the vehicle body in the front-rear direction at a higher position. The left and right rear pillars 23 are curved such that, in a front view, they are located closer to a central portion of the vehicle body in the left-right direction at a higher position, and in a side view, they are in a substantially vertical orientation. Curved panels that are made of glass, a light-transmitting acrylic resin, or the like and curve along the pillars 21 to 23 and so on corresponding thereto are employed as the panels 25 to 28.

With the above-described configuration, in a lower half portion of the cabin 6, a large space is secured, in which the driver sitting on the driver's seat 17 can easily perform various operations using his or her hands or feet, whereas, in an upper half portion of the cabin 6 the width in the front-rear direction and the width in the left-right direction of the roof frame 29 be narrowed to the extent that riding comfort is not degraded. As a result, it is possible to improve the stability of the vehicle body by reducing the weight and size of an upper portion of the cabin without degrading the operability and riding comfort in the boarding space.

As shown in FIG. 3, a main electronic control unit (hereinafter referred to as "a main ECU") 40 that includes a travel control unit 40A that performs control regarding travel of the vehicle body, a work control unit 40B that performs control regarding the work apparatus, and so on is mounted on the vehicle body. The main ECU 40 is connected to the above-described electronic hydraulic control type up-down driving unit 10, an electronic control unit for the engine (not shown), an electronic control type main transmission apparatus 41, an electronic control type forward/rearward travel switching apparatus 42, an electronic control type PTO clutch 43, an electronic hydraulic type brake operation unit 44 that enables automatic operation of the left and right side brakes, an in-vehicle information acquisition unit 45 that acquires in-vehicle information including the vehicle speed, and so on via an in-vehicle LAN such as a CAN (Controller Area Network) or a communication line, so as to be able to communicate with them. Electronic control units such as the main ECU 40 include a microprocessor that includes a CPU, an EEPROM, and so on. The travel control unit 40A includes, for example, various control programs that realize control regarding the travel of the vehicle body. The work control unit 40B includes, for example, various control programs that realize control regarding the work apparatus.

The main transmission apparatus 41, the forward/rearward travel switching apparatus 42, and the PTO clutch 43 are provided in the speed change power transmission unit together with an auxiliary transmission apparatus (not shown) that performs stepwise speed change on travel power, a PTO transmission apparatus (not shown) that performs stepwise speed change on work power, and so on. A hydraulic static continuously variable transmission apparatus that performs continuous speed change on travel power is employed as the main transmission apparatus 41. The forward/rearward travel switching apparatus 42 also serves as a travel clutch that connects or disconnects travel power.

The in-vehicle information acquisition unit 45 includes various sensors such as the up/down switch, the turn lifting switch, the rearward travel lifting switch, and the PTO switch described above, and various sensors such as: a rotation sensor that detects the output speed of the engine 8; a vehicle speed sensor that detects the output speed of the auxiliary transmission apparatus as the vehicle speed; a main transmission sensor that detects the operation position of the main shift lever 12; an auxiliary transmission sensor that detects the operation position of an auxiliary shift lever 13; a shuttle sensor that detects the operation position of the shuttle lever 14; an up/down sensor that detects the operation position of the up/down lever 15; a height sensor that detects the angle of up/down swing of left and right lift arms (not shown) of the up/down driving unit 10 as the height position of the work apparatus; and a steering angle sensor that detects the steering angle of the front wheels 2.

The travel control unit 40A performs vehicle speed control to operate a trunnion shaft (not shown) of the main transmission apparatus 41 based on the output from the rotation sensor, the output from the vehicle speed sensor, the output from the main transmission sensor, and the output from the auxiliary transmission sensor such that the vehicle speed reaches a control target vehicle speed obtained based on the engine output speed, the operation position of the main shift lever 12, and the operation position of the auxiliary shift lever 13. Thus, the driver can change the vehicle speed to any speed by operating the main shift lever 12 to a certain operation position.

The travel control unit 40A performs forward/rearward travel switching control to switch the forward/rearward travel switching apparatus 42 to a power transmission state corresponding to the operation position of the shuttle lever 14, based on the output from the shuttle sensor. Thus, the driver can set the travel direction of the vehicle body to the forward direction by operating the shuttle lever 14 to a forward travel position. Also, the driver can set the travel direction of the vehicle body to the rearward direction by operating the shuttle lever 14 to a rearward travel position.

The work control unit 40B performs position control to control the action of the up/down driving unit 10 based on the output from the up/down sensor and the output from the height sensor, such that the work apparatus is located at the height position that corresponds to the operation position of the up/down lever 15. Thus, the driver can change the height position of the work apparatus to any height position by operating the up/down lever 15 to a certain operation position.

Upon the up/down switch being switched to a lifting instruction state in response to the up/down switch being manually operated, the work control unit 40B performs lifting control to control the action of the up/down driving unit 10 based on a lifting instruction from the up/down switch and the output from the height sensor such that the work apparatus is lifted to an upper limit position that has been determined in advance. Thus, the driver can make the work apparatus be automatically lifted to the upper limit position by switching the up/down switch to the lifting instruction state.

Upon the up/down switch being switched to a lowering instruction state in response to the up/down switch being manually operated, the work control unit 40B performs lowering control to control the action of the up/down driving unit 10 based on a lowering instruction from the up/down switch, the output from the up/down sensor, and the output from the height sensor such that the work apparatus is lowered to a work height position that has been set using the up/down lever 15. Thus, the driver can make the work apparatus be automatically lowered to the work height position by switching the up/down switch to the lowering instruction state.

When execution of turn-conjunctive lifting control is selected in response to the turn lifting switch being manually operated, the work control unit 40B automatically performs the above-described lifting control upon detecting that the steering angle of the front wheels 2 has reached a set angle for a ridge edge turn based on the output from the steering angle sensor that detects the steering angle of the front wheels 2. Thus, by selecting execution of turn-conjunctive lifting control in advance, the driver can make the work apparatus be automatically lifted to the upper limit position in conjunction with the start of a ridge edge turn.

When execution of rearward travel-conjunctive lifting control is selected in response to the rearward travel lifting switch being manually operated, the work control unit 40B automatically performs the above-described lifting control upon detecting that the shuttle lever 14 has been manually operated to the rearward travel position based on the output from the shuttle sensor. Thus, by selecting execution of rearward travel-conjunctive lifting control in advance, the driver can make the work apparatus be automatically lifted to the upper limit position in conjunction with switching to rearward travel.

Upon the PTO switch being manually operated and switched to an ON position, the work control unit 40B performs clutch ON control to switch the PTO clutch 43 to an ON position based on the switching of the PTO switch to the ON position so that work power is transmitted to the work apparatus. Thus, the driver can activate the work apparatus by operating the PTO switch to the ON position.

Upon the PTO switch being manually operated and switched to an OFF position, the work control unit 40B performs clutch OFF control to switch the PTO clutch 43 to an OFF position based on the switching of the PTO switch to the OFF position so that work power is not transmitted to the work apparatus. Thus, the driver can stop the work apparatus by operating the PTO switch to the OFF position.

Upon the PTO switch being manually operated and switched to an automatic position, the work control unit 40B automatically performs the above-described clutch OFF control in conjunction with execution of the above-described lifting control, or automatically performs the above-described clutch ON control in conjunction with execution of the above-described lowering control. Thus, by operating the PTO switch to the automatic position in advance, the driver can stop the work apparatus in conjunction with the automatic lifting of the work apparatus to the upper limit position, or activate the work apparatus in conjunction with the automatic lowering of the work apparatus to the work height position.

As shown in FIGS. 1 to 3, the tractor includes a selection switch 50 that enables the driver to select a driving mode, and an electronic control system 51 for automatic driving through which the vehicle body is automatically driven. The tractor is provided with a manual driving mode and an automatic driving mode and a cooperative driving mode as driving modes. The electronic control system 51 includes, for example: the above-described main ECU 40; an automatic steering unit 52 that realizes automatic steering of the left and right front wheels 2; a positioning unit 53 that measures the position and orientation of the vehicle body; and a monitoring unit 54 that monitors the surroundings of the vehicle body.

As shown in FIG. 3, the automatic steering unit 52 is constituted by the above-described PS unit 18. When the manual driving mode is selected, the PS unit 18 steers the left and right front wheels 2 based on an operation performed to rotate the steering wheel 11. When the automatic driving mode or the cooperative driving mode is selected, the PS unit 18 steers the left and right front wheels 2 based on a control instruction from the main ECU 40.

With the above-described configuration, it is possible to automatically steer the left and right front wheels 2 without providing a steering unit that is dedicated to automatic steering. Also, if a failure occurs in the electrical system of the PS unit 18, the occupant can easily switch to manual steering and continue driving the vehicle body.

As shown in FIGS. 1 to 4 and 6, the positioning unit 53 includes a satellite navigation apparatus 55 that measures the position and orientation of the vehicle body using a well-known GPS (Global Positioning System), which is an example of a GNSS (Global Navigation Satellite System). Positioning methods using a GPS include a DGPS (Differential GPS) method and an RTK-GPS (Real Time Kinematic GPS) method, for example. In the present embodiment, an RTK-GPS method, which is suitable for positioning a moving object, is employed.

The satellite navigation apparatus 55 includes an antenna unit 56 for satellite navigation that receives radio waves transmitted from a GPS satellite (not shown) and positioning data transmitted from a reference station (not shown) located at a known position. The reference station transmits positioning data obtained by receiving radio waves from a GPS satellite, to the satellite navigation apparatus 55. The satellite navigation apparatus 55 obtains the position and orientation of the vehicle body based on positioning data obtained by receiving radio waves from the GPS satellite, and positioning data from the reference station.

The antenna unit 56 is attached to the roof 24 of the cabin 6, which is located at the top of the vehicle body so as to increase sensitivity when receiving radio waves from the GPS satellite. Therefore, the position and the orientation of the vehicle body measured using the GPS include positioning errors due to displacement of the antenna unit 56 resulting from yawing, pitching, or rolling of the vehicle body.

Therefore, the vehicle body is provided with an IMU (Inertial Measurement Unit) 57 that includes a three-axis gyroscope (not shown) and a three-direction acceleration sensor (not shown), and measures the yaw angle, pitch angle, and roll angle of the vehicle body so that correction can be performed to eliminate the above-described positioning errors. The IMU 57 is provided inside the antenna unit 56 so that the amount of displacement of the above-described antenna unit 56 can be easily obtained. The antenna unit 56 is attached to a central area, in the left-right direction, of the upper surface of a front portion of the roof 24 of the cabin 6 such that the antenna unit 56 is located at a midpoint of a track T and a midpoint of a wheelbase L of the vehicle body in plan view (see FIG. 2).

With the above-described configuration, at least in plan view, the position at which the IMU 57 is attached is close to the position of the center of gravity of the vehicle body. As a result, it is possible to easily perform calculation for correcting the yaw angle and so on measured by the IMU 57, based on the amount of displacement of the IMU 57 from the position of the center of gravity of the vehicle body, and thus it is possible to swiftly and correctly correct the result of measurement performed by the IMU 57. That is to say, the IMU 57 can swiftly and accurately measure the yaw angle and so on of the vehicle body.

As a result, when the satellite navigation apparatus 55 measures the position and orientation of the vehicle body, if the antenna unit 56 is displaced due to yawing, pitching, or rolling of the vehicle body, it is possible to swiftly and accurately obtain the amount of displacement of the antenna unit 56 in such a case based on, for example, the yaw angle, pitch angle, and roll angle of the vehicle body measured by the IMU 57. Then, positioning errors included in the position and orientation of the vehicle body measured by the satellite navigation apparatus 55, resulting from displacement of the antenna unit 56, can be obtained swiftly and accurately, based on the amount of displacement of the antenna unit 56 that can be obtained from the result of measurement performed by the IMU 57, and it is possible to swiftly and appropriately perform correction to eliminate the positioning errors from the result of measurement performed by the satellite navigation apparatus 55.

As a result, it is possible to easily, swiftly, and accurately measure the position and orientation of the vehicle body using a GNSS.

As shown in FIG. 3, the main ECU 40 includes an automatic driving control unit 40C that includes various control programs that realize automatic driving of the vehicle body. The automatic driving control unit 40C performs automatic driving control to automatically drive the vehicle body when the automatic driving mode or the cooperative driving mode is selected by manually operating the selection switch 50. When performing automatic driving control in the automatic driving mode, the automatic driving control unit 40C transmits various control instructions to the travel control unit 40A, the work control unit 40B, and so on at appropriate points in time so that the vehicle body appropriately performs work while automatically travelling along a preset target travel path in a farm field at a set speed, based on, for example, the target travel path and the result of positioning performed by the positioning unit 53. The travel control unit 40A controls the operations of the main transmission apparatus 41, the forward/rearward travel switching apparatus 42, and so on by transmitting various control instructions to the main transmission apparatus 41, the forward/rearward travel switching apparatus 42, and so on at appropriate points in time, based on various control instructions from the automatic driving control unit 40C, various pieces of information acquired by the in-vehicle information acquisition unit 45, and so on. The work control unit 40B controls the operations of the up/down driving unit 10, the PTO clutch 43, and so on by transmitting various control instructions to the up/down driving unit 10, the PTO clutch 43, and so on at appropriate points in time, based on various control instructions from the automatic driving control unit 40C, various pieces of information acquired by the in-vehicle information acquisition unit 45, and so on.

The target travel path may be a travel path along which the vehicle travelled during task travel while being manually driven in a farm field, the start point of a ridge edge turn, and so on that have been converted into data based on, for example, the result of positioning performed by the positioning unit 53. Alternatively, the target travel path may be a travel path along which the vehicle travelled during teaching travel through manual driving in a farm field, the start point of a ridge edge turn, and so on that have been converted into data based on, for example, the result of positioning performed by the positioning unit 53.

As shown in FIGS. 1 to 5, the monitoring unit 54 includes, for example: an obstacle detection module 58 that detects an approaching obstacle within an immediate range (e.g. within 1 meter) of the vehicle body; three front and rear laser scanners 59 that detect an approaching obstacle within a short range (e.g. within 10 meter) of the vehicle body; a contact avoidance control unit 40D that performs contact avoidance control to avoid coming into contact with an obstacle; four monitoring cameras 60 that capture the surroundings of the vehicle body; and an image processing apparatus 61 that processes images captured by the monitoring cameras 60.

As shown in FIGS. 1 to 3 and 5, the obstacle detection module 58 includes eight sonar devices 62 that search for an obstacle within the immediate range of the vehicle body, and two search information processing apparatuses 63 that perform determination processing regarding whether or not an obstacle has approached and entered the immediate range of the vehicle body based on search information from each of the sonar devices 62. The eight sonar devices 62 are distributed on the front-end portion and the left and right end portions of the vehicle body such that the front side and the left and right sides of the vehicle body are search-target areas. Each sonar device 62 transmits search information obtained by performing a search to the search information processing apparatus 63 corresponding thereto. Each search information processing apparatus 63 performs determination processing to determine whether or not an obstacle has approached and entered the immediate range of the vehicle body based on the period from transmission to reception of an ultrasonic wave from the sonar device 62 corresponding to the search information processing apparatus 63, and outputs the result of determination to the contact avoidance control unit 40D.

As a result, when an obstacle has unexpectedly approached and entered the immediate range of the vehicle body from the front side or the left or right sides of the vehicle body that is automatically driven, the obstacle detection module 58 detects the approaching obstacle. Also, a sonar device 62 is not provided at a rear end portion of the vehicle body, and therefore the obstacle detection module 58 is prevented from misdetecting the work apparatus attached to the rear end of the vehicle body so as to be able to move up and down, as an obstacle.

When the vehicle body is travelling toward a ridge through automatic driving, or when the vehicle body is travelling along a ridge at a ridge edge through automatic driving, if the ridge has unexpectedly entered the immediate range, the obstacle detection module 58 detects the ridge as an obstacle. Also, when a moving object has unexpectedly approached and entered the immediate range of the vehicle body, the obstacle detection module 58 detects the moving object as an obstacle.

Although not shown in the drawings, each laser scanner 59 includes a search unit that has a maximum detection angle of approximately 270 degrees and searches for an obstacle, a processing unit that processes search information from the search unit, and so on. The search unit irradiates a search-target area with a laser beam and receives the reflected light. The processing unit determines whether or not an obstacle has approached and entered a short range of the vehicle body, for example, based on the period from irradiation to reception of the laser beam, and outputs the result of determination to the contact avoidance control unit 40D. The search-target areas of the left and right laser scanners 59 on the front side are set to be an area that is forward of the vehicle body and areas to the left and right of the vehicle body. The search-target area of the single laser scanner 59 on the rear side is set to be an area that is rearward of the vehicle body.

As shown in FIG. 3, the contact avoidance control unit 40D includes, for example, a control program that realizes execution of contact avoidance control, and is provided in the main ECU 40. Upon detecting that an obstacle has approached and entered the short range of the vehicle body based on the result of determination performed by each laser scanner 59, the contact avoidance control unit 40D preferentially performs the above-described contact avoidance control based on the results of determination performed by each laser scanner 59 and the search information processing apparatus 63, compared to control operations performed by the automatic driving control unit 40C. Thereafter, the contact avoidance control unit 40D performs contact avoidance control, to avoid the risk of the vehicle body coming into contact with an obstacle. During the execution of contact avoidance control, upon confirming that there is no obstacle in the short range of the vehicle body based on the result of determination performed by each laser scanner 59, the contact avoidance control unit 40D terminates contact avoidance control and resumes automatic driving mode based on control operations performed by the automatic driving control unit 40C.

As shown in FIGS. 1 to 5, a wide-angle CCD camera for visible light is employed as each monitoring camera 60. In order to capture images of the entire surroundings of the vehicle body, the monitoring cameras 60 are distributed on the left and right end portions of the roof 24 of the cabin 6.

The image processing apparatus 61 processes video signals from the monitoring cameras 60, generates an image of objects on the front side of the vehicle body, an image of objects on the right side of the vehicle body, an image of objects on the left side of the vehicle body, an image of objects on the rear side of the vehicle body, a bird's eye image seen from right above the vehicle body, and so on, and transmits the images to a display unit 64 in the boarding space, and so on. The display unit 64 includes, for example, a control unit 64B that changes an image and so on displayed on a liquid crystal panel 64A, based on, for example, a manual operation with various operation switches (not shown) displayed on the liquid crystal panel 64A.

With the above-described configuration, in the manual driving mode, displaying images from the image processing apparatus 61 on the liquid crystal panel 64A makes it easier for the driver to visually check the state of the surroundings of the vehicle body and the state of work. Thus, the driver can easily drive the vehicle body in a preferable manner according to the type of work, and so on. Also, in the automatic driving mode or the cooperative driving mode, when an administrator rides in the vehicle body, displaying images from the image processing apparatus 61 on the liquid crystal panel 64A makes it easier for the administrator to visually check the state of the surroundings of the vehicle body and the state of work during automatic driving or cooperative driving. If the administrator visually recognizes an abnormality in the surroundings of the vehicle body, the state of work, or the like during automatic driving or cooperative driving, the administrator can swiftly and appropriately address the abnormality according to the type of abnormality, the degree of the abnormality, and so on.

As shown in FIGS. 1 to 6, the electronic control system 51 includes a communication module 65 that wirelessly communicates with another vehicle or the like to exchange various kinds of information with each other, and a cooperative driving control unit 40E that performs cooperative driving control based on information from another vehicle, and so on. The cooperative driving control unit 40E includes, for example, a control program that realizes execution of cooperative driving control, and is provided in the main ECU 40.

When performing automatic driving control in the cooperative driving mode, the automatic driving control unit 40C transmits various control instructions to the travel control unit 40A, the work control unit 40B, and so on at appropriate points in time so that the vehicle body appropriately performs work while automatically travelling along a preset target travel path for side-by-side travel at a set speed, based on, for example, the target travel path for side-by-side travel and the result of positioning performed by the positioning unit 53.

The cooperative driving control unit 40E performs inter-vehicular distance determination processing and inter-vehicular distance optimization processing through cooperative driving control. In inter-vehicular distance determination processing, the cooperative driving control unit 40E determines whether or not the distance between the vehicle and another preceding vehicle in the forward travel direction, the distance between the vehicle and the other preceding vehicle in the side-by-side direction, and so on are appropriate, based on the target travel path for side-by-side travel of the vehicle, the result of positioning performed by the positioning unit 53, the target travel path for side-by-side travel of the other vehicle, position information regarding the other vehicle, and so on. If any of the distances between the vehicles is inappropriate, the cooperative driving control unit 40E preferentially performs inter-vehicular distance optimization processing compared to the control operation made by the automatic driving control unit 40C, so that the distance between the vehicles is appropriate.

In inter-vehicular distance optimization processing, if the distance between the vehicles in the forward travel direction is shorter than an appropriate distance, the cooperative driving control unit 40E outputs a deceleration instruction to the travel control unit 40A, thereby causing the main transmission apparatus 41 to perform a deceleration operation through a control operation performed by the travel control unit 40A to return the distance between the vehicles in the forward travel direction to the appropriate distance. Upon the distance between the vehicles in the forward travel direction returning to the appropriate distance, the cooperative driving control unit 40E restarts automatic driving that is based on a control operation performed by the automatic driving control unit 40C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 40E outputs an acceleration instruction to the travel control unit 40A, thereby causing the main transmission apparatus 41 to perform an acceleration operation through a control operation performed by the travel control unit 40A, and returning the distance between the vehicles in the forward travel direction to the appropriate distance. Upon the distance between the vehicles in the forward travel direction returning to the appropriate distance, the cooperative driving control unit 40E restarts automatic driving that is based on a control operation performed by the automatic driving control unit 40C, thereby reducing the vehicle speed to the set speed for normal travel and keeping the distance between the vehicles in the forward travel direction at the appropriate distance.

If the distance between the vehicles in the side-by-side direction is longer than the appropriate distance, the cooperative driving control unit 40E outputs a steering instruction to the travel control unit 40A to travel toward the other vehicle, thereby causing the left and right front wheels 2 to steer toward the other vehicle, and returning the distance between the vehicles in the side-by-side direction to the appropriate distance. Upon the distance between the vehicles in the side-by-side direction returning to the appropriate distance, the cooperative driving control unit 40E restarts automatic driving that is based on a control operation performed by the automatic driving control unit 40C, thereby returning the travel direction of the vehicle body to the travel direction for normal travel and keeping the distance between the vehicles in the side-by-side direction at the appropriate distance.

If the distance between the vehicles in the side-by-side travel direction is shorter than the appropriate distance, the cooperative driving control unit 40E outputs a steering instruction to the travel control unit 40A to travel away from the other vehicle, thereby causing the left and right front wheels 2 to steer away from the other vehicle through a control operation performed by the travel control unit 40A, and returning the distance between the vehicles in the side-by-side direction to the appropriate distance. Upon the distance between the vehicles in the side-by-side direction returning to the appropriate distance, the cooperative driving control unit 40E restarts automatic driving that is based on a control operation performed by the automatic driving control unit 40C, thereby returning the travel direction of the vehicle body to the travel direction for normal travel and keeping the distance between the vehicles in the side-by-side direction at the appropriate distance.

Thus, it is possible to automatically and appropriately drive the vehicle side-by-side with another preceding vehicle while keeping the distances between the vehicles in the forward travel direction and the side-by-side direction at appropriate distances.

As shown in FIGS. 1 to 6, the communication module 65 includes three communication antennas 66 to 68 that have different frequency bands, and a communication information processing apparatus 69. The communication antennas 66 to 68 are provided on a top end portion of the cabin 6 to improve communication sensitivity. The communication information processing apparatus 69 is provided in the internal space 34 of the roof 24 to improve waterproof properties and dust proof properties.

The first communication antenna 66 of the three communication antennas 66 to 68, which has the highest frequency band, wirelessly communicates image information, which has a large amount of information, with the communication module 65 of another vehicle, for example. The second communication antenna 67, which has the second highest frequency band, wirelessly communicates in-vehicle information other than image information, such as the vehicle speed, with the communication module 65 of another vehicle, for example. The third communication antenna 68, which has the lowest frequency band, wirelessly communicates various kinds of information, such as an instruction to start work travel and an instruction to stop work travel, with a remote-control tool 70.

The first communication antenna 66 is attached to a left front-end portion of the auxiliary frame 33 of the roof 24, using a first support tool 71. The second communication antenna 67 is attached to a right front-end portion of the auxiliary frame 33, using a second support tool 72. The third communication antenna 68 is attached to a left front portion of the upper surface of the roof 24, using a third support tool 73. A reception antenna 74 for a radio is attached to an upper end portion of the left front pillar 21 of the cabin 6.

As shown in FIG. 3, the in-vehicle information acquisition unit 45, the laser scanners 59, the image processing apparatus 61, the search information processing apparatuses 63, and so on are connected to the communication information processing apparatus 69 so as to be able to communicate with each other via the main ECU 40.

As a result, in-vehicle information such as the vehicle speed acquired by the in-vehicle information acquisition unit 45, monitored information from the laser scanners 59 and the search information processing apparatuses 63, monitored image information from the image processing apparatus 61, and so on can be desirably communicated with another vehicle or the like, via the respective dedicated antennas 66 to 68, and can be shared with another vehicle that performs cooperative travel. By effectively using the shared in-vehicle information, monitored information, and monitored image information, it is easier to perform vehicle speed adjustment in conjunction with the other vehicle that is carrying out cooperative travel, avoid contact with an obstacle in conjunction with the other vehicle that is carrying out cooperative travel, and so on. As a result, it is possible to more reliably avoid contact with another vehicle that is carrying out cooperative travel, for example.

Specifically, in the above-described cooperative driving mode, if one of the laser scanners 59 detects that an obstacle has approached and entered the short range of the vehicle body, the contact avoidance control unit 40D starts contact avoidance control, and outputs a deceleration instruction to the cooperative driving control unit 40E in addition to the travel control unit 40A. The cooperative driving control unit 40E transmits this deceleration instruction to the other vehicle via the communication module 65. Thereafter, in a decelerating travel state that is based on the deceleration instruction, the cooperative driving control unit 40E reads the vehicle speed detected by the vehicle speed sensor, and transmits the read vehicle speed to the other vehicle via the communication module 65. Also, in a low-speed travel state that is based on the deceleration instruction, if the obstacle detection module 58 detects that an obstacle has approached and entered the immediate range of the vehicle body, the contact avoidance control unit 40D outputs an emergency stop instruction to the cooperative driving control unit 40E in addition to the travel control unit 40A and the work control unit 40B. The cooperative driving control unit 40E transmits this emergency stop instruction to the other vehicle via the communication module 65. In a decelerating travel state based on a deceleration instruction, if the laser scanners 59 no longer detect that an obstacle has approached and entered the short range of the vehicle body, the contact avoidance control unit 40D outputs an acceleration instruction to the cooperative driving control unit 40E in addition to the travel control unit 40A. The cooperative driving control unit 40E transmits this acceleration instruction to the other vehicle via the communication module 65. Thereafter, in a decelerating travel state that is based on the acceleration instruction, the cooperative driving control unit 40E reads the vehicle speed detected by the vehicle speed sensor, and transmits the read vehicle speed to the other vehicle via the communication module 65.

On the other hand, in the above-described cooperative driving mode, if a deceleration instruction and the vehicle speed of the other vehicle are transmitted from the other vehicle, the communication module 65 receives the deceleration instruction and the vehicle speed, and outputs them to the cooperative driving control unit 40E. The cooperative driving control unit 40E outputs the deceleration instruction and the vehicle speed to the travel control unit 40A, and causes the travel control unit 40A to perform deceleration control through which the vehicle speed is lowered from the set speed for normal travel to the vehicle speed of the other vehicle. In a decelerating travel state initiated by this deceleration control, if an emergency stop instruction is transmitted from the other vehicle, the communication module 65 receives the emergency stop instruction and outputs it to the cooperative driving control unit 40E. The cooperative driving control unit 40E outputs the emergency stop instruction to the travel control unit 40A and the work control unit 40B, and causes the travel control unit 40A and the work control unit 40B to perform emergency stop control through which the vehicle body and the work apparatus are caused to make an emergency stop. In a decelerating travel state initiated by deceleration control, if an acceleration instruction and the vehicle speed of the other vehicle are transmitted from the other vehicle, the communication module 65 receives the acceleration instruction and the vehicle speed, and outputs them to the cooperative driving control unit 40E. The cooperative driving control unit 40E outputs the acceleration instruction and the vehicle speed to the travel control unit 40A, and causes the travel control unit 40A to perform acceleration control through which the vehicle speed is increased to the set speed for normal travel according to the acceleration of the other vehicle.

As a result, in the above-described cooperative driving mode, for example, upon the cooperative driving control unit 40E of the succeeding vehicle receiving the deceleration instruction and the vehicle speed of the preceding vehicle from the preceding vehicle through wireless communication performed by the communication module 65, the cooperative driving control unit 40E outputs these pieces of received information to the travel control unit 40A of the vehicle (the succeeding vehicle). Thus, it is possible to reduce the vehicle speed of the succeeding vehicle to be the same as the vehicle speed of the decelerated preceding vehicle through deceleration control performed by the travel control unit 40A based on the pieces of output information. In this cooperative low-speed state, upon the cooperative driving control unit 40E of the succeeding vehicle receiving an acceleration instruction and the vehicle speed of the preceding vehicle through wireless communication performed by the communication module 65, the cooperative driving control unit 40E outputs these pieces of received information to the travel control unit 40A of the vehicle. Thus, it is possible to increase the vehicle speed of the succeeding vehicle to be the same as the vehicle speed of the accelerated preceding vehicle through acceleration control performed by the travel control unit 40A based on the pieces of output information. Also, in a cooperative low-speed state, upon the cooperative driving control unit 40E of the succeeding vehicle receiving an emergency stop instruction from the preceding vehicle through wireless communication performed by the communication module 65, the cooperative driving control unit 40E outputs these pieces of received information to the travel control unit 40A of the vehicle. Thus, it is possible to cause the succeeding vehicle to make an emergency stop in conjunction with the preceding vehicle through emergency stop control performed by the travel control unit 40A and the work control unit 40B based on the pieces of output information. As a result, it is possible to prevent the preceding vehicle from colliding with an obstacle, and avoid the risk of the succeeding vehicle colliding with the preceding vehicle due to the preceding vehicle making an emergency stop.

Furthermore, in the above-described cooperative driving mode, if information regarding another vehicle, such as the vehicle speed of the other vehicle and an image of the surroundings of the other vehicle, is transmitted from the other vehicle, the communication module 65 receives this information regarding the other vehicle and outputs it to the cooperative driving control unit 40E, and the cooperative driving control unit 40E outputs the information regarding the other vehicle to the display unit 64. If an operation switch (not shown) for displaying information regarding another vehicle on the liquid crystal panel 64A has been operated and a selection has been made to display information regarding another vehicle, the display unit 64 displays information regarding the other vehicle, such as the vehicle speed of the other vehicle and an image of the surroundings of the other vehicle, on the liquid crystal panel 64A.

As a result, for example, if an administrator who manages the operations of the tractors that is travelling in cooperation with each other is on board and drives the preceding vehicle, the administrator can easily monitor and grasp the state of operation of another vehicle that is travelling in cooperation with the preceding tractor and the state of the surroundings of the other vehicle while driving the preceding vehicle, by operating the operation switch in the preceding vehicle for displaying information regarding another vehicle and making a selection to display information regarding the other vehicle.

As shown in FIGS. 1, 2, 4, and 5, the monitoring unit 54 includes six lights 75 that each have many LEDs and illuminate areas that are to be captured by the monitoring cameras 60. As a result, it is possible to desirably capture images of the surroundings of the vehicle body using the monitoring cameras 60 even during night work. By sharing the images of the surroundings with another vehicle that is carrying out cooperative travel, and effectively using the images, it is easier to adjust the vehicle speed relative to the vehicle speed of the other vehicle that is carrying out cooperative travel, and avoid contact with an obstacle in conjunction with the other vehicle that is carrying out cooperative travel, even during night work in which visibility is low.

As shown in FIGS. 1 and 3, the remote control tool 70 includes a start switch 70A that outputs an instruction to start work travel through automatic driving upon being manually operated, a stop switch 70B that outputs an instruction to stop work travel through automatic driving upon being manually operated, an information processing unit 70C that processes various kinds of information such as the start instruction and the stop instruction, a communication antenna 70D that wirelessly communicates with the third communication antenna 68, a notification device 70E that is constituted by a lamp or a buzzer, and so on.

Upon receiving a start instruction from the start switch 70A of the remote control tool 70 via the communication module 65 when the vehicle body has stopped travelling in a state where the automatic driving mode or the cooperative driving mode has been selected, the automatic driving control unit 40C determines whether or not the contact avoidance control unit 40D is currently executing contact avoidance control. If contact avoidance control is currently being executed, the automatic driving control unit 40C transmits a notification instruction, which indicates that it is impossible to start driving the vehicle body, to the remote-control tool 70 via the communication module 65. Upon the remote-control tool 70 receiving the notification instruction from the automatic driving control unit 40C, the information processing unit 70C activates the notification device 70E based on the notification instruction, and notifies the administrator of the fact that it is impossible to start driving the vehicle body. If contact avoidance control is not currently being executed, the automatic driving control unit 40C transmits various control instructions regarding the start of work travel to the travel control unit 40A, the work control unit 40B, and so on at appropriate points in time, based on the start instruction, to start work travel of the vehicle body.

Upon receiving a stop instruction from the stop switch 70B of the remote control tool 70 via the communication module 65 when the vehicle body is performing work travel of the vehicle body through automatic driving, the automatic driving control unit 40C transmits various control instructions regarding the stop of work travel to the travel control unit 40A, the work control unit 40B, and so on at appropriate points in time, based on the stop instruction, to cause the vehicle body to make an emergency stop.

With the above-described configuration, when the administrator starts work travel of the vehicle body through automatic driving without riding in the vehicle body, the administrator can start work travel of the vehicle body through automatic driving without riding in the vehicle body, by operating the start switch 70A of the remote control tool 70. Also, when the administrator stops work travel of the vehicle body through automatic driving without riding in the vehicle body, the administrator can stop work travel of the vehicle body through automatic driving without riding in the vehicle body, by operating the stop switch 70B of the remote-control tool 70.

Figure 5:
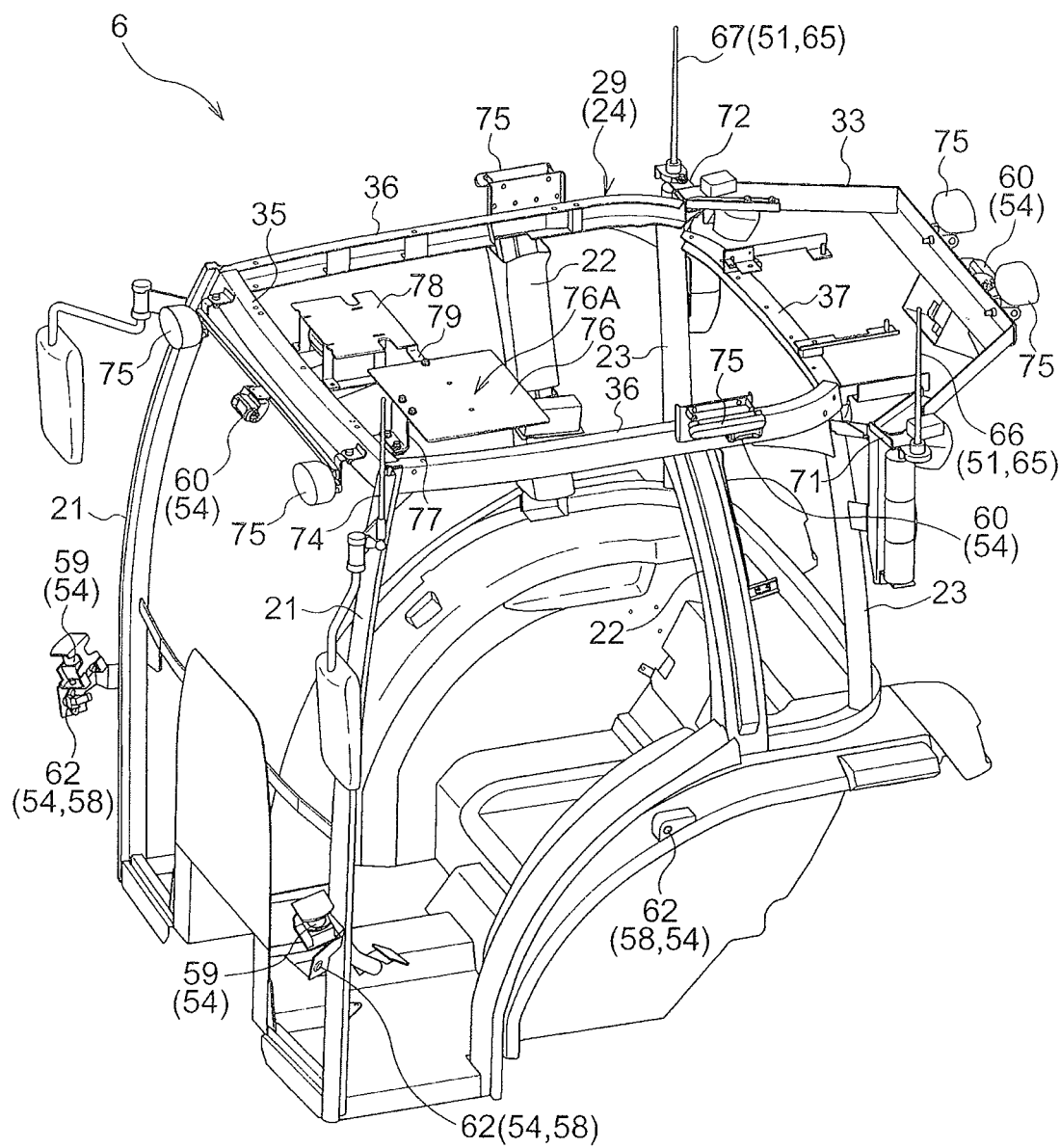
Figure 6:
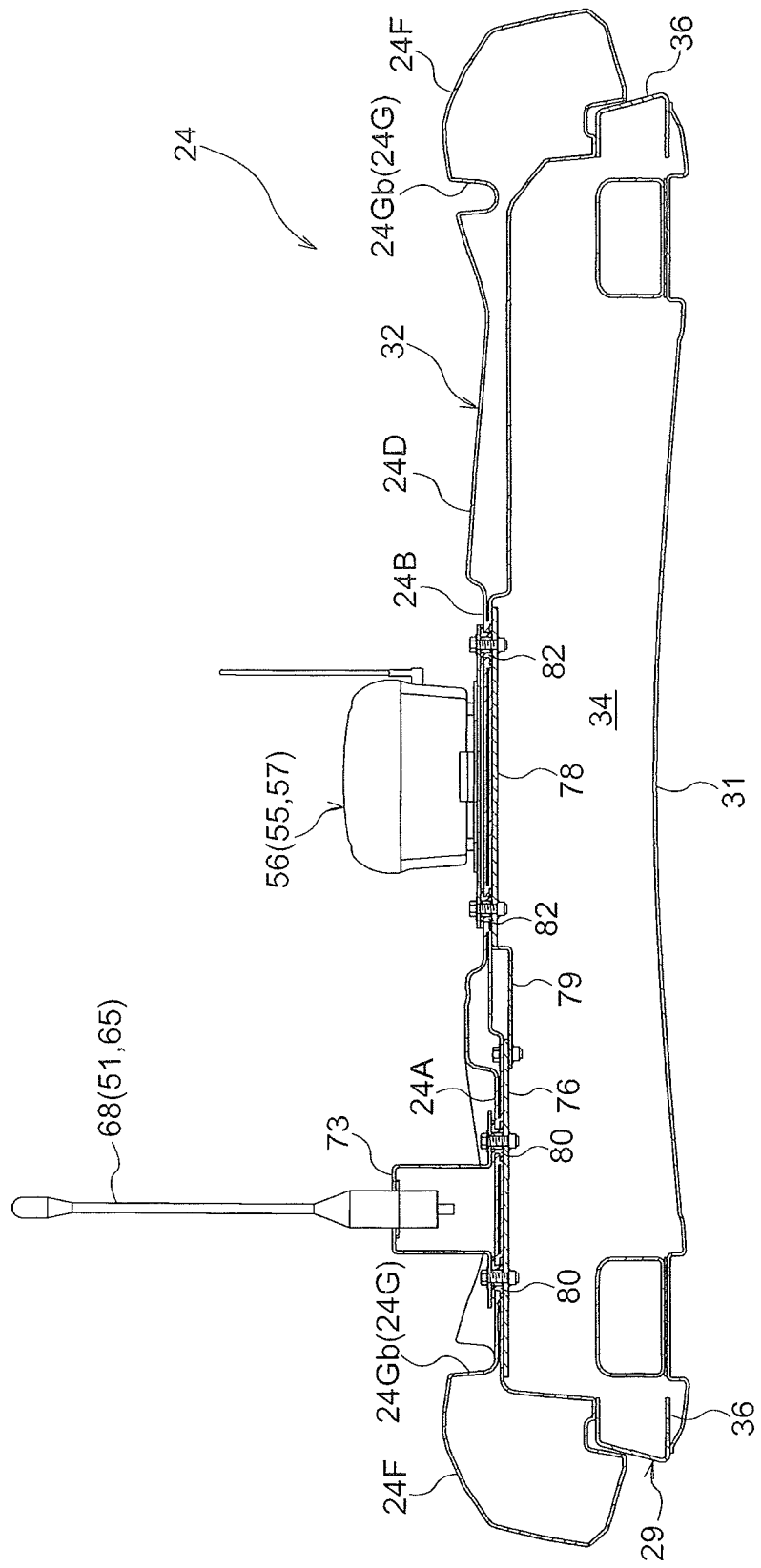

As shown in FIGS. 2, 5, and 6, a ground plane 76 (an example of an element) that improves the communication performance of the third communication antenna 68, is provided below the third communication antenna 68. The ground plane 76 is housed in the internal space 34 of the roof 24. The third communication antenna 68 is located above the center of the ground plane 76.

With this configuration, the ground plane 76 can increase the radio wave gain of the third communication antenna 68. Therefore, the third communication antenna 68 can be downsized. Due to such downsizing, even if the third communication antenna 68 is attached to the upper surface of the roof 24 of the cabin 6 to improve the communication sensitivity of the third communication antenna 68, the total height of the vehicle body including the third communication antenna 68 can be kept small. Also, as a result of the ground plane 76 being housed in the internal space 34 of the roof 24, the third communication antenna 68 and the ground plane 76 can be compactly provided in the roof 24 of the cabin 6 compared to when the ground plane 76 is provided outside the roof 24.

As a result, it is possible to improve the communication performance of the third communication antenna 68 while avoiding an increase in the total height of the vehicle body including the third communication antenna 68.

As shown in FIGS. 2 and 5 to 7, the ground plane 76 is formed using a metal plate that has a rectangular shape in plan view and has a preferable surface for improving the radio wave gain thereof. A front-end portion of the ground plane 76 is coupled to the front beam 35 of the roof frame 29 of the roof 24, with a support plate 77 being interposed therebetween. Also, a right end portion of the ground plane 76 is coupled to a support base 78 of the roof frame 29, which supports the antenna unit 56, via a coupling tool 79 being interposed therebetween. The outer roof 32 of the roof 24 and a support portion 76A that supports a third support tool 73 for the third communication antenna are provided in a central area of the ground plane 76.

That is to say, the ground plane 76 is coupled to the front beam 35 of the roof frame 29, and supports the third communication antenna 68, using the outer roof 32 and the third support tool 73. With this configuration, the ground plane 76 can also be used as a support member that supports the outer roof 32 and the third communication antenna 68. As a result, it is possible to simplify the configuration by reducing the number of parts, for example.

As shown in FIGS. 2, 4, 6, and 7, the roof 24 includes a first coupling portion 24A to which the third support tool 73 and the support portion 76A of the ground plane 76 are bolted at a left front portion of the upper surface of the outer roof 32. There are formed left and right first through holes 24a for bolting in the first coupling portion 24A, and rubber sleeves 80 are fitted into the left and right first through holes 24a. Each rubber sleeve 80 includes an upper flange portion 80A and a lower flange portion 80B. When the third support tool 73 and the support portion 76A of the ground plane 76 are bolted to the first coupling portion 24A, the upper flange portion 80A is in close contact with the upper surface of the outer roof 32 and the bottom surface of the third support tool 73, and the lower flange portion 80B is in close contact with the inner surface of the outer roof 32 and the upper surface of the ground plane 76.

With the above-described configuration, in a state where the third support tool 73 and the ground plane 76 are bolted to the first coupling portion 24A of the outer roof 32, the upper flange portions 80A of the rubber sleeves 80 are in close contact with the upper surface of the outer roof 32 and the bottom surface of the third support tool 73, and the lower flange portions 80B of the rubber sleeves 80 are in close contact with the inner surface of the outer roof 32 and the upper surface of the ground plane 76. Thus, rain water or washing water is prevented from entering the inside of the cabin 6 through the first through holes 24a of the first coupling portion 24A.

That is to say, the left and right rubber sleeves 80 that each include the upper and lower flange portions 80A and 80B also serve as waterproof members, and therefore it is possible to prevent water from entering the inside of the cabin 6 while simplifying the configuration by reducing the number of parts.

Figure 7:
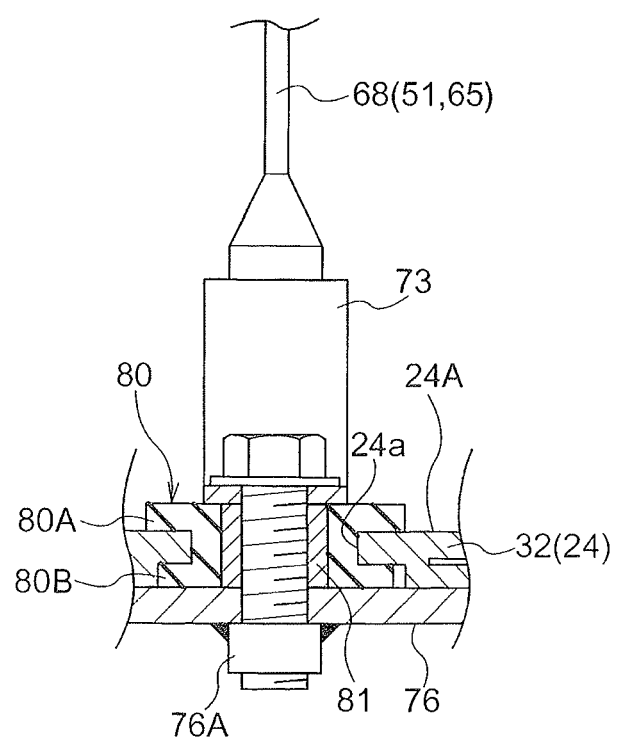
FIG. 7 is a vertical side view of a main portion, showing a communication antenna and the structure for attaching the ground plane.

As shown in FIG. 7, lower portions of the left and right first through holes 24a in the first coupling portion 24A of the roof 24 have an increased diameter such that the lower flange portions 80B are allowed to be fitted thereinto. A spacer 81 that allows a rubber sleeve 80 to appropriately deform and restricts the amount of screwing of a bolt at the time of bolting is fitted into each first through hole 24a together with the rubber sleeve 82. Due to the effects of the rubber sleeves 80 and the spacers 81, the bolting portion is prevented from becoming loose.

As shown in FIGS. 2, 4, 6, and 8, there is formed a second coupling portion 24B for the antenna unit, in a central area, in a left-right direction, of a front portion of the upper surface of the outer roof 32 in the roof 24 of the cabin 6. The upper surface of the second coupling portion 24B is formed so as to be horizontal. Four second through holes 24b for bolting are formed in the second coupling portion 24B, and rubber sleeves 82 are respectively fitted into the second through holes 24b. Each rubber sleeve 82 includes an upper flange portion 82A. When the antenna unit 56 is bolted to the second coupling portion 24B, the upper flange portion 82A is in close contact with the upper surface of the outer roof 32 and the bottom surface of the antenna unit 56.

With the above-described configuration, in a state where the antenna unit 56 is bolted to the second coupling portion 24B of the outer roof 32, the upper flange portions 82A of the rubber sleeves 82 are located between the upper surface of the outer roof 32 and the bottom surface of the antenna unit 56, and thus vibrations of the vehicle body are unlikely to be transmitted to the antenna unit 56. Also, the upper flange portions 82A of the rubber sleeves 82 are in close contact with the upper surface of the outer roof 32 and the bottom surface of the antenna unit 56, and thus rain water or washing water is prevented from entering the inside of the cabin 6 through the second through holes 24b of the second coupling portion 24B.

That is to say, the four rubber sleeves 82 that each include an upper flange portion 82A serve as vibration-proof members and waterproof members, and thus it is possible to support the antenna unit 56 in a vibration-proof manner, and prevent water from entering the inside of the cabin 6, while simplifying the configuration by reducing the number of parts.

Figure 8:
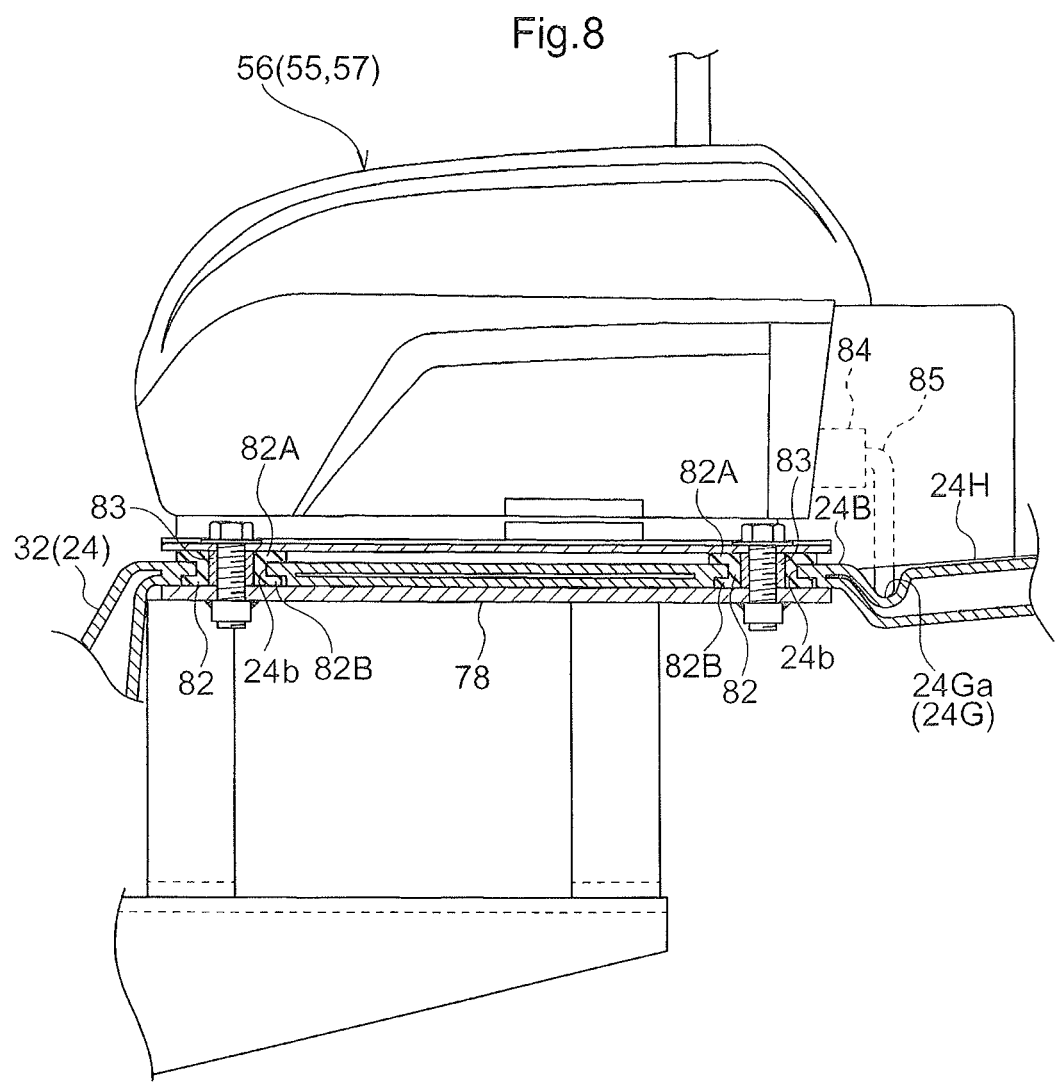

As shown in FIGS. 6 and 8, the second coupling portion 24B of the outer roof 32 also serves as a coupling portion that is to be bolted to the support base 78 of the roof frame 29. That is to say, the antenna unit 56 is coupled to the support base 78 in a state of being fastened together with the outer roof 32. Thus, assemblability is improved by reducing man-hour required for assembly.

As shown in FIG. 8, each rubber sleeve 82 includes a lower flange portion 82B that is in close contact with the upper surface of the support base 78 and the inner surface of the outer roof 32 when the outer roof 32 and the antenna unit 56 are bolted to the support base 78. Lower surface-side portions of the second through holes 24b in the second coupling portion 24B of the roof 24 have an increased diameter such that the lower flange portions 82B can be fitted thereinto. A spacer 83 that allows a rubber sleeve 82 to appropriately deform and restricts the amount of screwing of a bolt at the time of bolting is fitted into each second through hole 24b together with the rubber sleeve 82.

With the above-described configuration, it is possible to improve the vibration-proof properties of the antenna unit 56, and more reliably prevent water from entering the inside of the cabin 6. Also, due to the effects of the rubber sleeves 82 and the spacers 83, the bolting portion is prevented from becoming loose.

As shown in FIGS. 1, 2, 4, and 6, the upper surface of a front portion of the outer roof 32 included in the roof 24, which is located around the antenna unit 56, is formed as a first inclined surface 24D that is inclined downward in the forward direction. The upper surface of a rear portion of the outer roof 32 included in the roof 24 is formed as a second inclined surface 24E that is inclined downward in the rearward direction. The roof 24 is provided with left and right bulging edge portions 24F at left and right end portions of the outer roof 32, which have a length spanning between the front and rear ends of the roof 24 and bulge upward. The upper surface of a front portion of the outer roof 32 included in the roof 24 is provided with water drain grooves 24G that guides water on the roof to the left and right bulging edge portions 24F such that water on the roof detours the antenna unit 56. The water drain grooves 24G include a first groove portion 24Ga that is provided in the first inclined surface 24D at a position on a higher-side area that is higher than the antenna unit 56 and extends in the left-right direction so as to span between the left and right bulging edge portions 24F, and left and right second groove portions 24Gb that respectively extend from the left and right ends of the first groove portion 24Ga toward the left and right ends of the front edge of the roof 24 across the left and right bulging edge portions 24F.

With the above-described configuration, rain water or washing water that has fallen on the upper surface of a front portion of the outer roof 32 flows into the first groove portion 24Ga and is subjected to the guiding effect of the first groove portion 24Ga in the course of flowing toward the antenna unit due to the guiding effect of the first inclined surface 24D, and is likely to flow toward the left and right bulging edge portions 24F due to this guiding effect. A large portion of the rain water or washing water that has flowed toward the left and right bulging edge portions 24F flows toward the left and right ends of the front edge of the roof 24 across the left and bulging edge portions 24F under the guiding effect of the left and right second groove portions 24Gb, and thereafter flows downward of the roof 24 from the left and right ends of the front edge, which are located laterally outward of the left and right bulging edge portions 24F, with respect to the vehicle body.

Also, rain water or washing water that has fallen on the upper surface of a rear portion of the outer roof 32 flows toward the rear edge of the roof 24 under the guiding effect of the second inclined surface 24E, and thereafter flows downward from the rear edge of the roof 24.

Thus, it is possible to prevent rain water or washing water that has fallen on the upper surface of the roof 24 from flowing toward the antenna unit 56 located at the center of the roof 24 in the left-right direction. As a result, it is possible to avoid the risk of rain water or washing water causing harmful effects on the antenna unit 56, and the risk of rain water or washing water entering the inside of the roof from the area to which the antenna unit 56 is attached.

Also, during work travel in rainy weather, a large portion of the rain water that has fallen on the upper surface of the roof 24 flows downward of the roof 24 from the left and right ends of the front edge of the roof 24 or the rear edge of the roof 24. Therefore, it is possible to effectively prevent visibility in the forward direction from degrading due to rain water falling from the roof 24.

Figure 4:
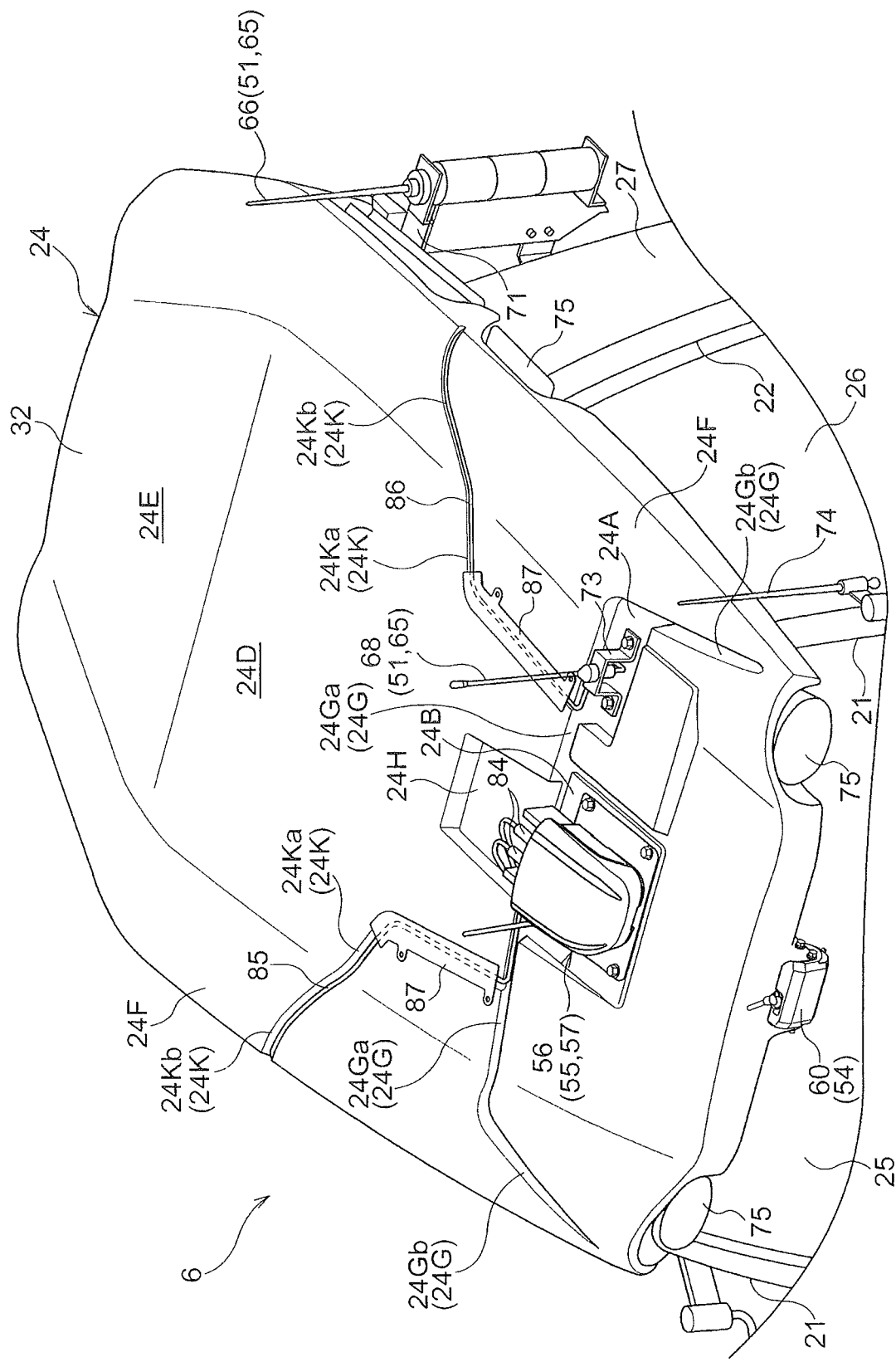

As shown in FIGS. 4 and 6, in the area of the upper surface of the outer roof 32 between the left and right bulging edge portions 24F, the roof 24 is curved such that a position closer to the center in the left-right direction is located higher. Thus, it is possible to further prevent rain water or washing water that has fallen on the upper surface of the roof 24 from flowing toward the antenna unit 56 located at the center of the roof 24 in the left-right direction. As a result, it is possible to more effectively avoid the risk of rain water or washing water causing harmful effects on the antenna unit 56, and the risk of rain water or washing water entering the inside of the roof from the area to which the antenna unit 56 is attached.

As shown in FIGS. 2, 4, and 8, the roof 24 is provided with a recessed portion 24H for connecting a connector for the antenna unit 56 thereto, at a position on a higher-side area of the first inclined surface 24D that is adjacent to the antenna unit 56.

With this configuration, while the first inclined surface 24D is formed on the roof 24 around the antenna unit 56 to improve drainage around the antenna unit 56, the connector 84 can be easily connected to the antenna unit 56 without forming a bulging seat for attaching an antenna unit thereto on the upper surface of the roof 24.

As shown in FIGS. 1, 2, 4, and 8, the roof 24 is provided with left and right guide grooves 24K that respectively position and guide a cable 85 that is connected to the antenna unit 56 and a cable 86 that is connected to the third communication antenna 68, to positions below the roof 24. The left and right guide grooves 24K include first guide portions 24Ka that are formed in the first inclined surface 24D and second guide portions 24Kb that are formed in the left and right bulging edge portions 24F.

With the above-described configuration, the cable 85 for the antenna unit and the cable 86 for the third communication antenna can be routed along the left and right guide grooves 24K from the upper surface of the roof 24 toward positions below the roof 24 so as not to protrude upward from the upper surface of the roof 24. Thus, it is possible to avoid the risk of the cable 85 for the antenna unit and the cable 86 for the third communication antenna protruding upward from the upper surface of the roof 24 and getting caught on another object.

Also, it is unnecessary to form through holes for inserting cables therethrough in the upper surface of the roof 24, and therefore it is unnecessary to provide a waterproof member to prevent water from entering from the through holes for inserting cables therethrough. As a result, it is possible to simplify the configuration by reducing the number of parts, for example.

As shown in FIG. 4, the upper surface of the roof 24 is provided with left and right retainer plates 87 that are detachable and prevent the cables 85 and 86 from protruding upward from the guide grooves 24K. Thus, it is possible to more reliably avoid the risk of the cable 85 for the antenna unit and the cable 86 for the third communication antenna protruding upward from the upper surface of the roof 24 and getting caught on another object.

As shown in FIGS. 4 and 8, the water drain grooves 24G are formed so as to be deeper than the recessed portion 24H for connecting a connector thereto and the guide grooves 24K for cables in order to improve its ability to guide water.

Also, the left and right guide grooves 24K are connected to the left and right end portions of the first groove portion 24Ga of the water drain grooves 24G, and thus the central portion of the first groove portion 24Ga in the left-right direction also serves as a guide groove for a cable.

Other Embodiments Modified from First Embodiment

The present invention is not limited to the configuration illustrated in the above-described embodiment. The following illustrates other representative embodiments of the present invention.

1. The work vehicle may employ the configurations illustrated below.

For example, the work vehicle may have a semi-crawler type configuration that is provided with left and right crawlers instead of the left and right rear wheels 3.

For example, the work vehicle may have a full-crawler type configuration that is provided with left and right crawlers instead of the left and right front wheels 2 and the left and right rear wheels 3.

For example, the work vehicle may have an electric type configuration that is provided with an electric motor instead of the engine 8.

For example, the work vehicle may have a hybrid type configuration that is provided with the engine 8 and an electric motor.

For example, the work vehicle may not be provided with either one of or both the manual driving mode and the cooperative driving mode, provided that the work vehicle is provided with an automatic driving mode as a driving mode.

2. The roof 24 of the cabin 6 may have a configuration in which the rear cover 30 is not provided and the internal space 34 is formed between the inner roof 31 and the outer roof 32.

3. The roof 24 of the cabin 6 may be configured such that the entire upper surface thereof is inclined downward in the forward direction or inclined downward in the rearward direction.

4. The antenna unit 56 may be provided on a rear portion of the roof 24 that is inclined downward in a rearward direction, and may be configured such that the upper surface of an area of the roof 24 around the antenna unit serves as the second inclined surface 24E that is inclined downward in the rearward direction. In this configuration, the water drain grooves 24G are formed in the second inclined surface 24E, and thus it is possible to avoid the risk of rain water or washing water causing harmful effects on the antenna unit 56.

5. The water drain grooves 24G may be formed only between the left and right bulging edge portions 24F such that water on the roof subjected to the guiding effect thereof flows toward the left and right bulging edge portions 24F, detouring the antenna unit 56.

6. A wire mesh may be employed for the element (ground plane) 76 instead of a metal plate. Alternatively, a plurality of metal rods that radially extend from a bottom portion of the third communication antenna 68 may be employed.

7. Each rubber sleeve 80 may only include the upper flange portion 80A that is in close contact with the upper surface of the outer roof 32 and the bottom surface of the third support tool 73 when the third support tool 73 and the support portion 76A of the element (the ground plane) 76 are bolted to the first coupling portion 24A of the roof 24.

8. The present invention is applicable to work vehicles other than the tractor illustrated in the above-described embodiments. That is to say, the present invention is applicable to another work vehicle that is provided with an automatic driving electronic control system for automatically driving a vehicle body, and a cabin in which a boarding space is formed, such as a rice transplanter, a combine, a mower, or the like.

Second Embodiment

The following describes, as an example of a mode for carrying out the present invention, an embodiment, in which the present invention is applied to a tractor, which is an example of a work vehicle, with reference to the drawings.

In the following description, the arrow with a reference sign F in FIG. 9 indicates the front side of the tractor, and the arrow with a reference sign U indicates the upper side of the tractor.

Figure 10:
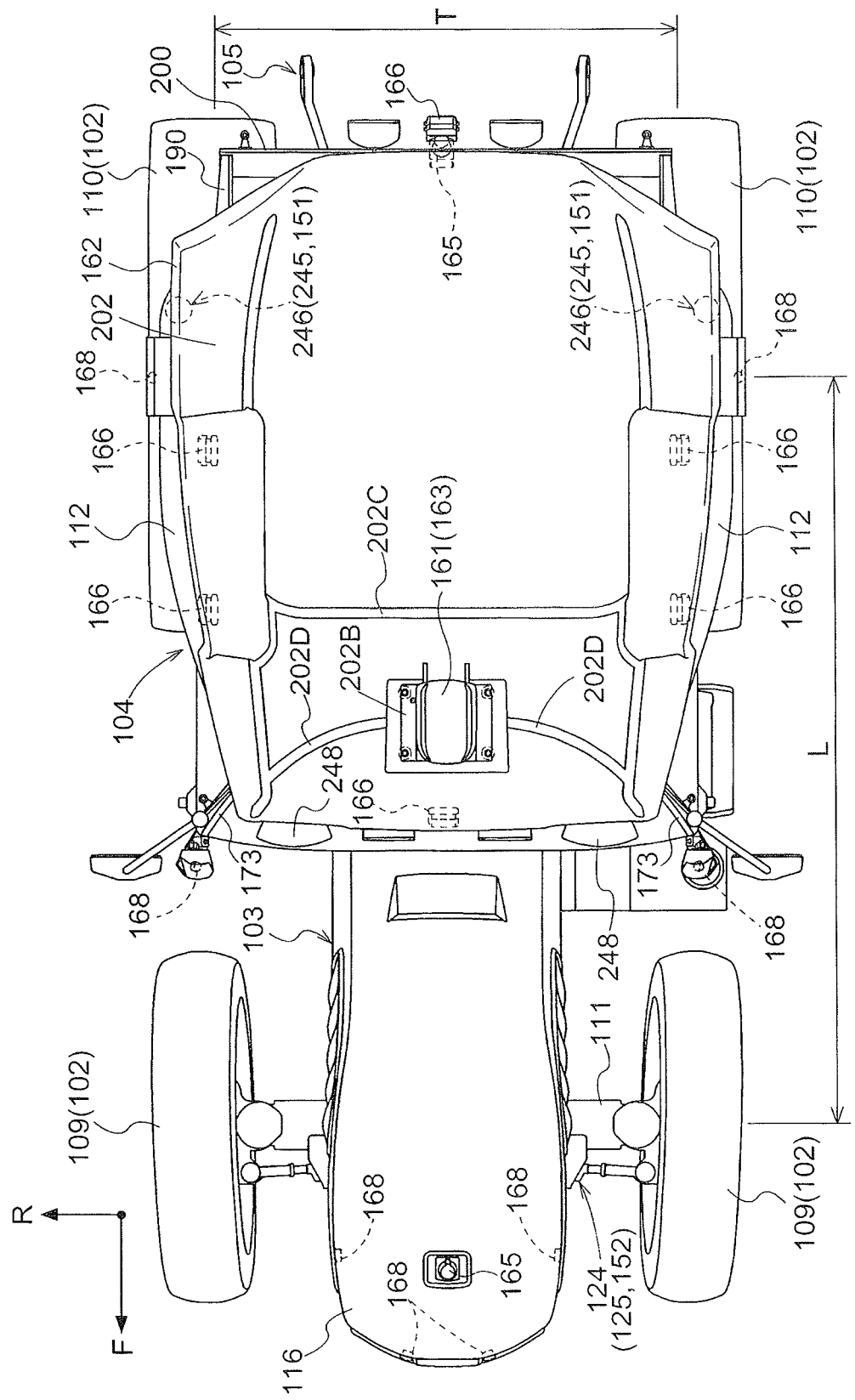

The arrow with a reference sign F in FIG. 10 indicates the front side of the tractor, and the arrow with a reference sign R indicates the right side of the tractor.

Figure 9:
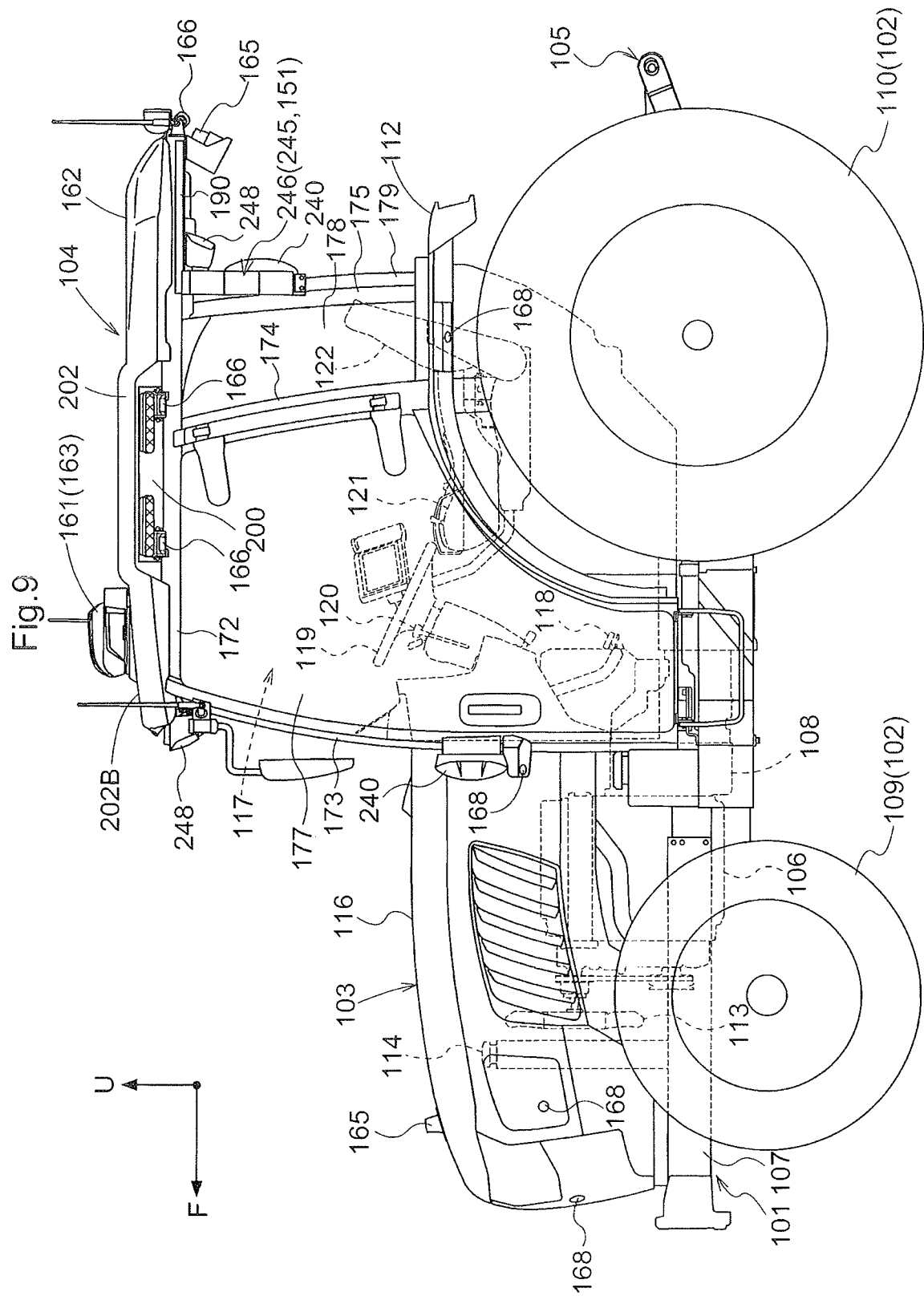
Figure 11:
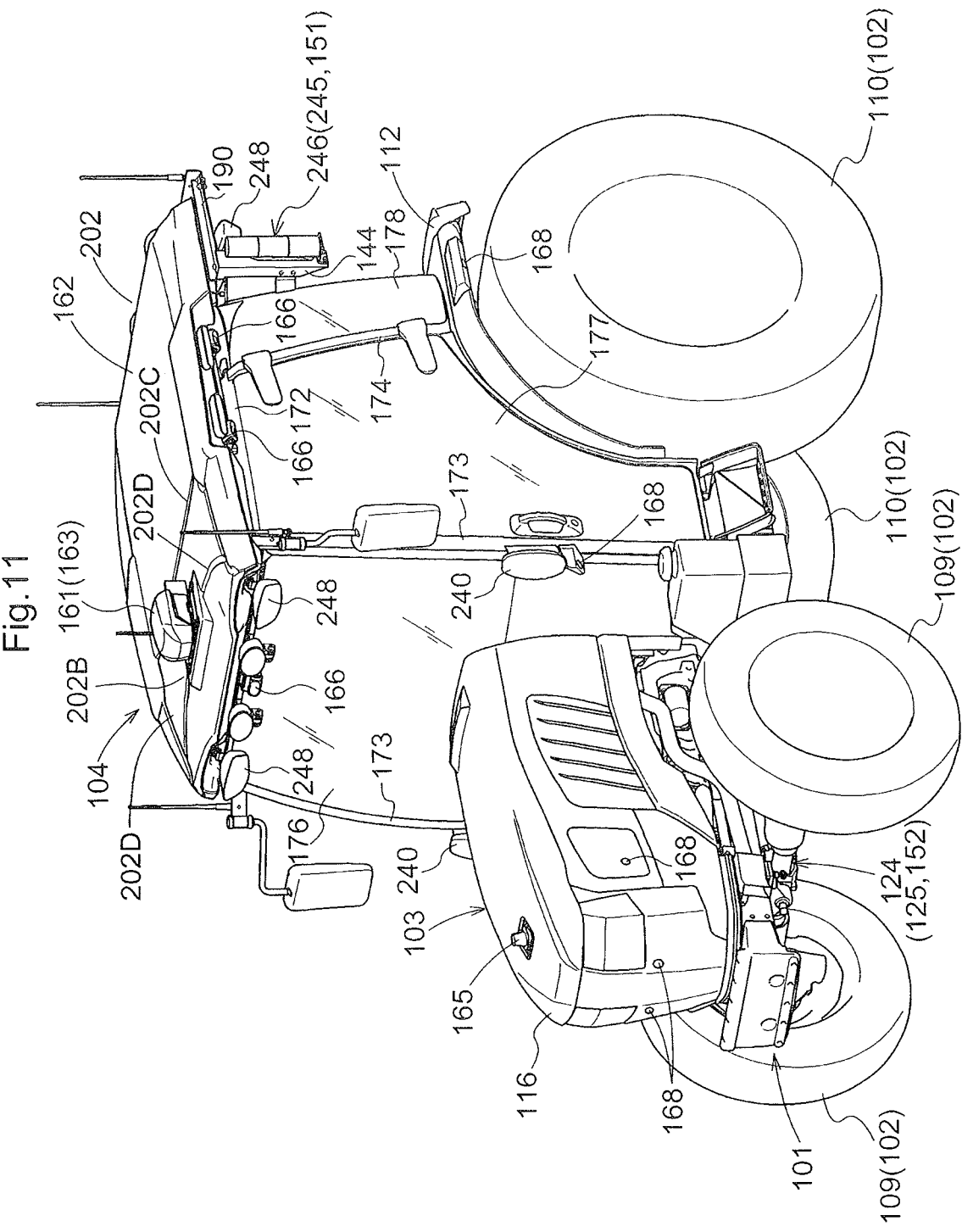
Figure 12:
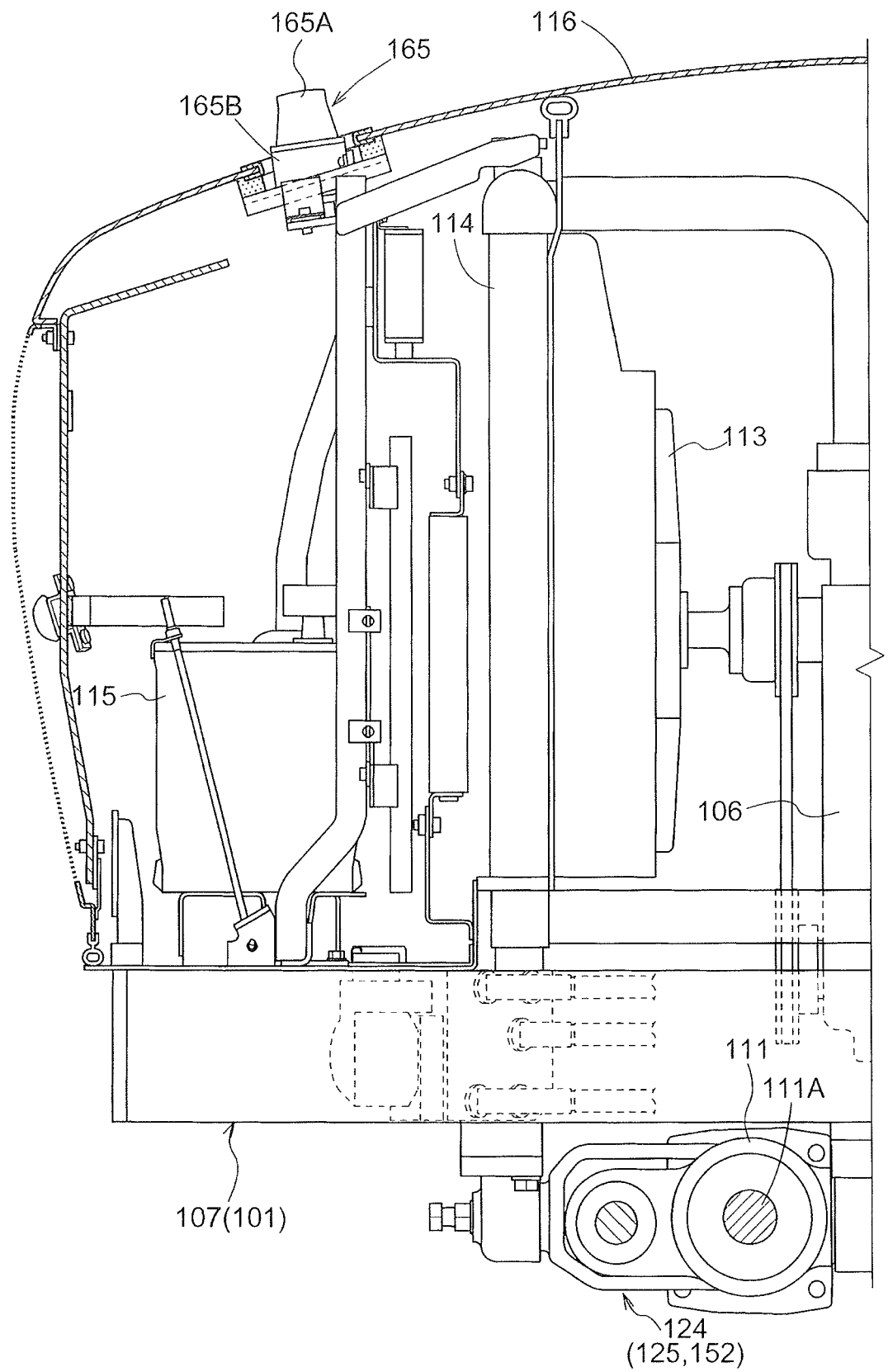
FIG. 12 is a vertical left side view of a main portion, showing a configuration of a front-end portion of the tractor.
Figure 13:
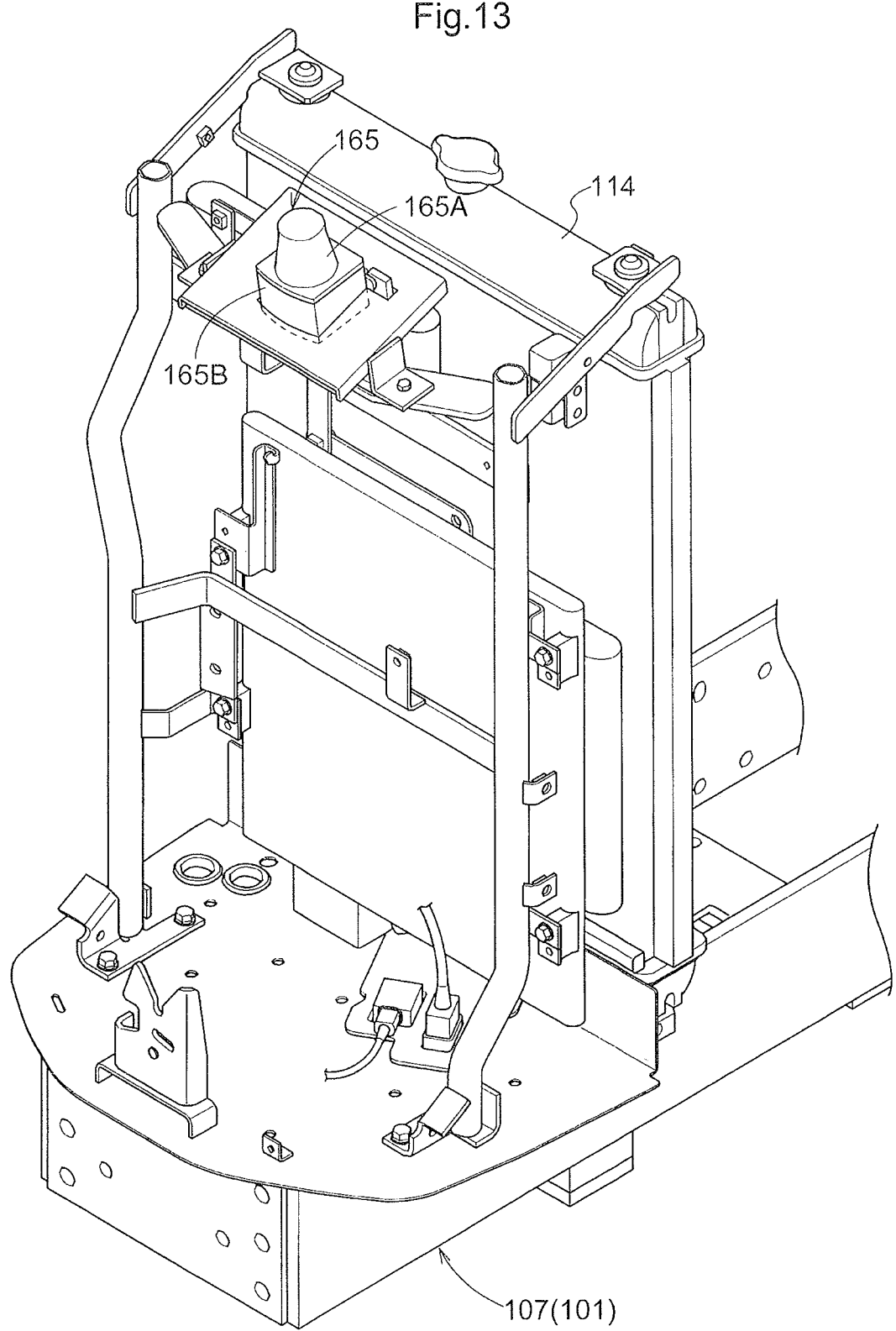
FIG. 13 is a perspective view of a main portion, showing the configuration of the front-end portion of the tractor.
Figure 14:
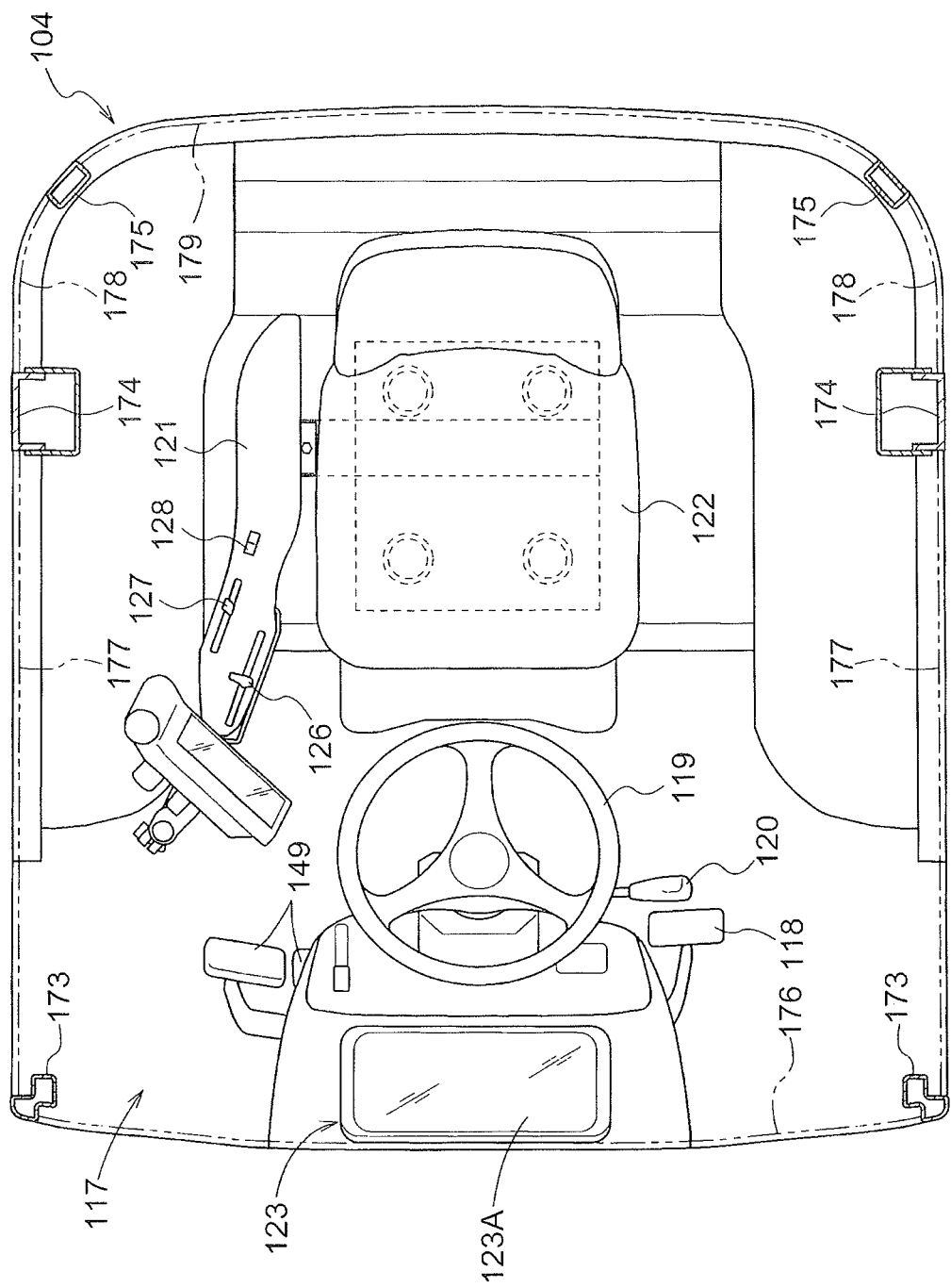
FIG. 14 is a horizontal plan view of a main portion showing a configuration of a driver part.

As shown in FIGS. 9 to 11, the tractor illustrated in the present embodiment includes, for example: a vehicle body frame 101 that spans between the front and rear ends of the vehicle body; left and right travel apparatuses 102 provided on the left and right of the vehicle body frame 101; a prime mover part 103 that is provided at a front portion of the vehicle body frame 101; a cabin 104 provided at a rear portion of the vehicle body frame 101; and a three-point linkage mechanism 105 that is used to couple a work apparatus thereto and is attached to a rear end portion of the vehicle body frame 101 so as to be able to swing up and down.

As shown in FIGS. 9 to 13, the vehicle body frame 101 includes, for example; a front frame 107 that extends from a position below an engine 106 provided in the prime mover part 103 to the front side of the vehicle body; and a case unit 108 that also serves as a rear frame and extends from a position below the rear end of the engine 106 to the rear side of the vehicle body. Although not shown in the drawings, the case unit 108 houses, for example: a pedal-operation type main clutch that connects or disconnects power from the engine 106; a speed change power transmission unit that splits power transmitted via the main clutch into travel power and work power, and performs speed change; and left and right side brakes that affect the left and right travel apparatuses 102.

The left and right travel apparatuses 102 include left and right front wheels 109 that function as drivable and steerable wheels, and left and right rear wheels 110 that function as driving wheels. The left and right front wheels 109 are supported at the left and right ends of a wheel supporting member 111 that is rotatably supported by the front frame 107, so as to be drivable in a steerable state. The wheel supporting member 111 is a front wheel shaft case that houses, for example, a power transmission shaft 111A for driving the front wheels. The left and right rear wheels 110 are drivably supported by the case unit 108, and upper portions of the rear wheels 110 are covered by left and right rear fenders 112 that are provided in a rear portion of the vehicle body.

The prime mover part 103 includes, for example: the water-cooled engine 106 provided in a rear portion of the prime mover part 103 relative to the vehicle body, which is a downstream portion of the prime mover part 103 in a cooling direction; a cooling fan 113 provided in a front portion of the vehicle body, which is provided upstream of the engine 106 in the cooling direction; a radiator 114 that is provided forward of the cooling fan 113 in the vehicle body; a battery 115 that is provided forward of the radiator 114 in the vehicle body; an exhaust processing apparatus (not shown) that is provided above a rear portion of the engine 106; an air cleaner (not shown) that is provided above a front portion of the engine 106; and a bonnet 116 that is swung open and closed and covers the engine 106, the radiator 114, and so on from above. An electronic control type diesel engine that is provided with a common rail system is employed as the engine 106. A DOC (Diesel Oxidation Catalyst) and a DPF (Diesel particulate filter) are provided in the exhaust processing apparatus.

As shown in FIGS. 9 to 12 and 14, the cabin 104 is provided with a driver part 117 and a boarding space in a rear portion of the vehicle body. The driver part 117 includes, for example: a clutch pedal 118 that enables operation of the main clutch; left and right brake pedals 149 that enable operation of the left and right side brakes; a steering wheel 119 for manual steering that enables manual steering of the left and right front wheels 109; a shuttle lever 120 for switching to forward travel and rearward travel; a driver's seat 122 that has an armrest 121 for the right arm; and a display unit 123 that includes, for example, a liquid crystal panel 123A that accepts touch operations. The steering wheel 119 is linked to the left and right front wheels 109 via a steering mechanism 125 that includes a full hydraulic type power steering unit 124. The armrest 121 is provided with a main shift lever 126, an up/down lever 127 for setting the height position of the work apparatus, and an up/down switch 128 for making an instruction to move the work apparatus up and down.

Figure 15:
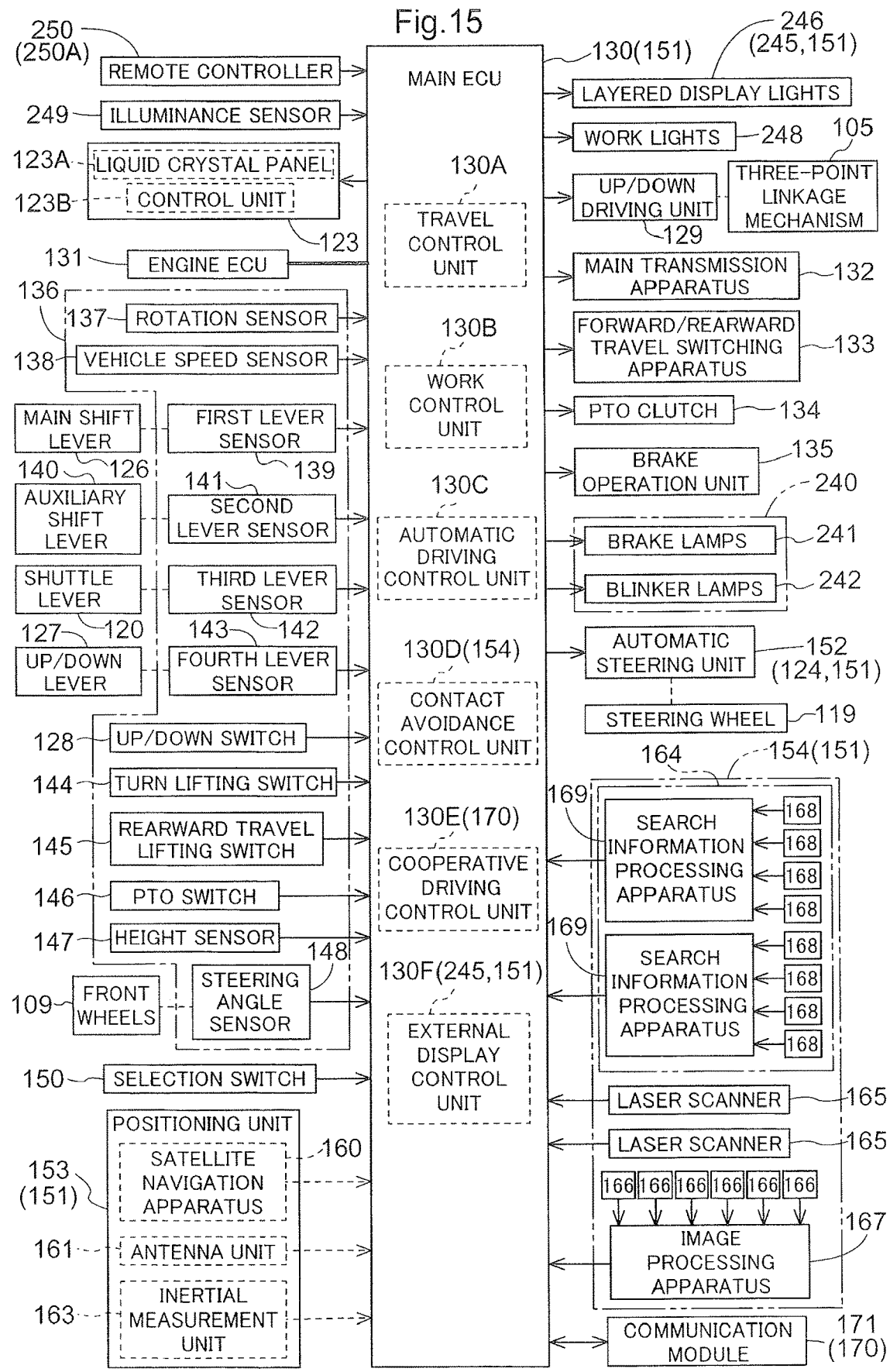
FIG. 15 is a block diagram showing a schematic configuration of a control system.
Figure 16:
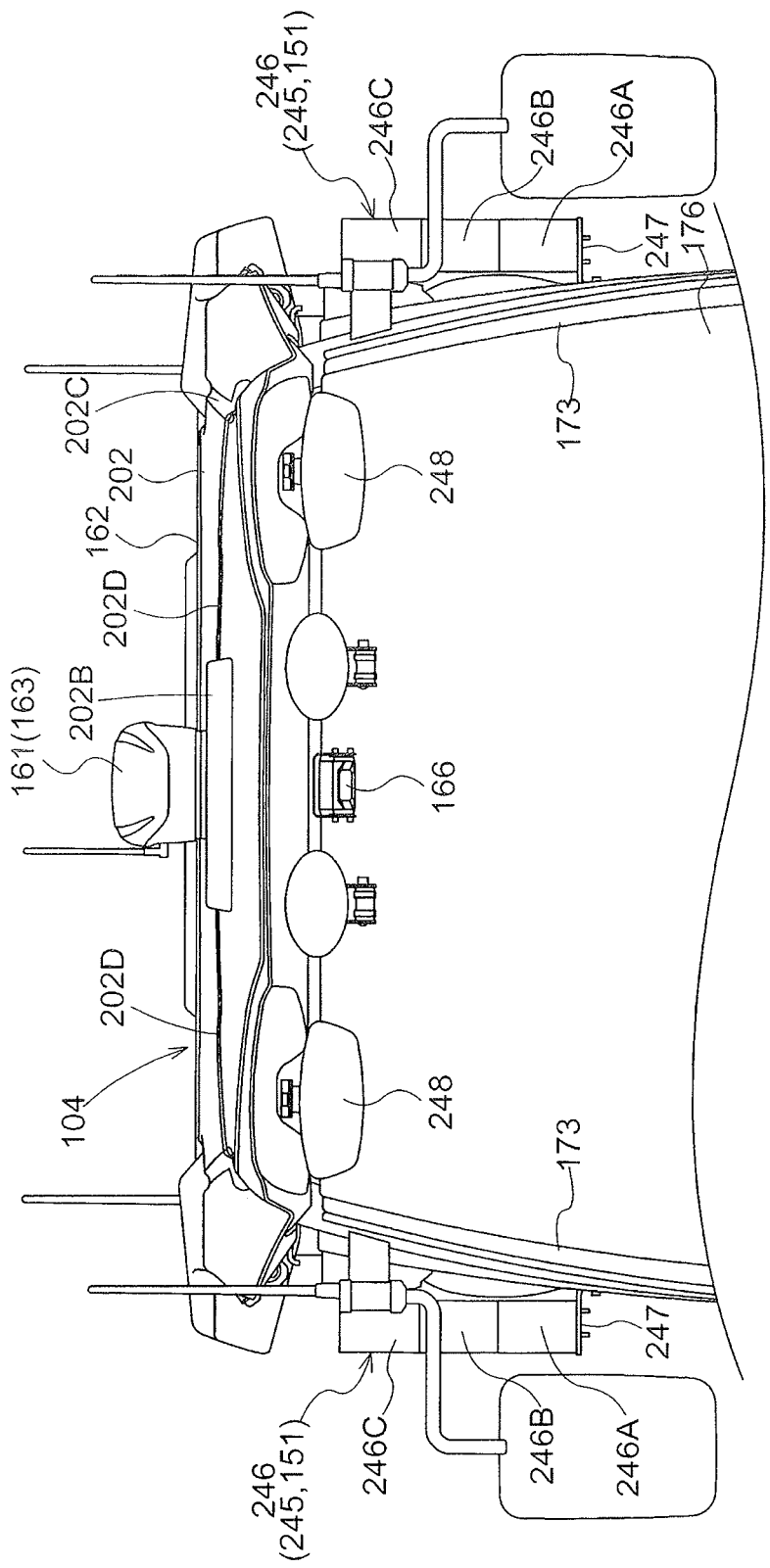
Figure 17:
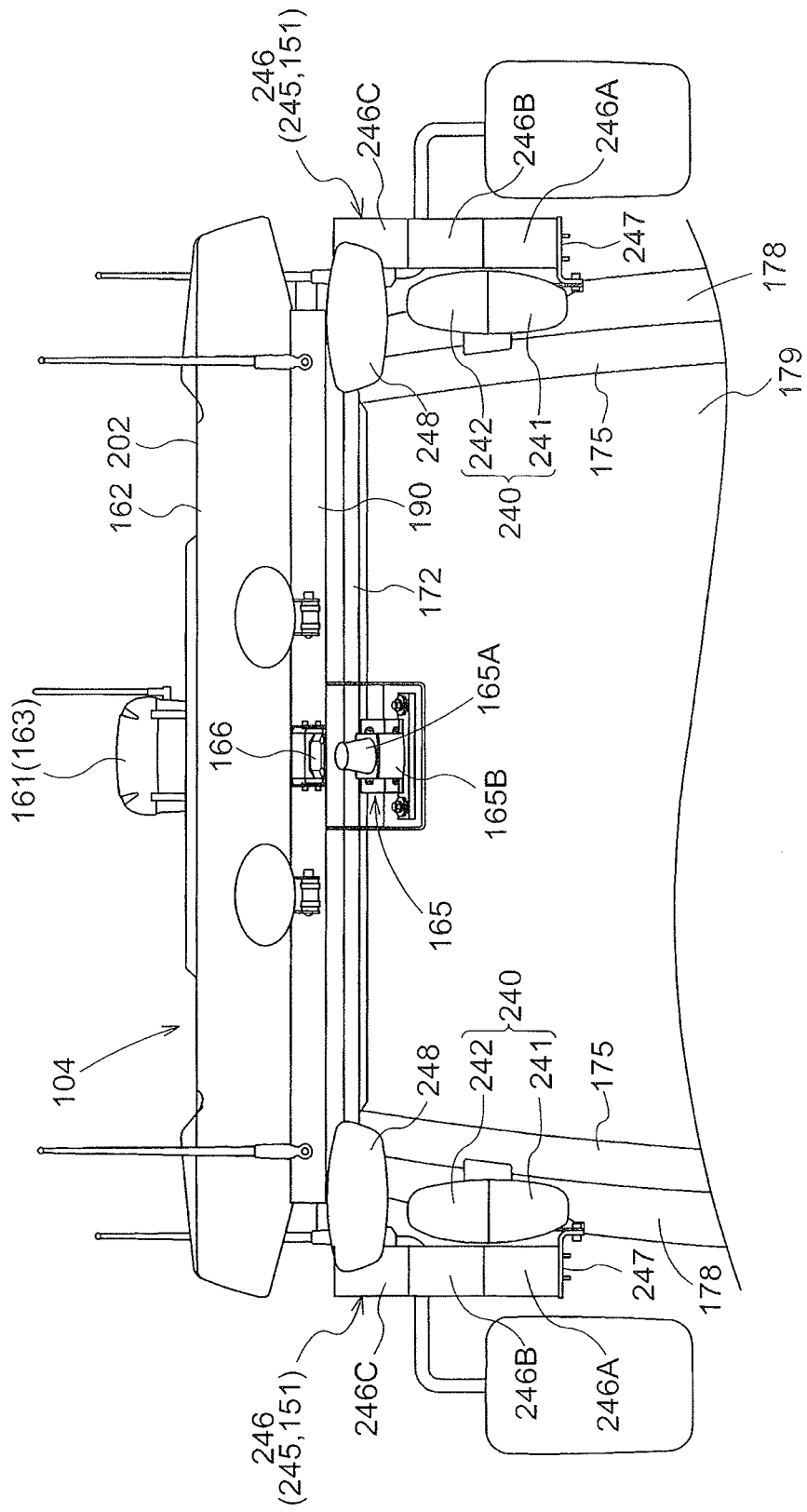

As shown in FIG. 15, the three-point linkage mechanism 105 is driven to swing in the top-bottom direction as a result of action of an electronic hydraulic control type up/down driving unit 129 provided in the vehicle body Although not shown in the drawings, a work apparatus such as a rotary cultivating apparatus, a plow, a disc harrow, a cultivator, a subsoiler, a sowing apparatus, a spraying apparatus, or the like can be coupled to the three-point linkage mechanism 105. If a work apparatus coupled to the three-point linkage mechanism 105 is a rotary cultivating apparatus or the like that is driven by power from the vehicle body, work power taken from the shift unit is transmitted thereto via an external power transmission shaft.

A main electronic control unit (hereinafter referred to as "a main ECU") 130 that includes a travel control unit 130A that performs control regarding travel of the vehicle body, a work control unit 130B that performs control regarding the work apparatus, and so on is mounted on the vehicle body. The main ECU 130 is connected to the above-described electronic hydraulic control type up-down driving unit 129, an electronic control unit for the engine (hereinafter referred to as "an engine ECU") 131, an electronic control type main transmission apparatus 132, a forward/rearward travel switching apparatus 133, a PTO clutch 134 provided in the speed change power transmission unit, an electronic hydraulic type brake operation unit 135 that enables automatic operation of the left and right side brakes, an in-vehicle information acquisition unit 136 that acquires in-vehicle information including the vehicle speed, and so on via an in-vehicle LAN (Local Area Network) such as a CAN (Controller Area Network) or a communication line, so as to be able to communicate with them. The main ECU 130 and the engine ECU 131 include a microprocessor that includes a CPU (Central Processing Unit), an EEPROM (Electrically Erasable Programmable Read-Only Memory), and so on. The travel control unit 130A includes, for example, various control programs that realize control regarding the travel of the vehicle body. The work control unit 130B includes, for example, various control programs that realize control regarding the work apparatus.

A hydraulic static continuously variable transmission apparatus that performs continuous speed change on travel power is employed as the main transmission apparatus 132. The forward/rearward travel switching apparatus 133 also serves as a travel clutch that connects or disconnects travel power. Although not shown in the drawings, the speed change power transmission unit includes, in addition to the main transmission apparatus 132 and so on, an auxiliary transmission apparatus that performs stepwise speed change on travel power, a PTO transmission apparatus that performs stepwise speed change on work power, and so on.

The in-vehicle information acquisition unit 136 includes various sensors and switches such as: a rotation sensor 137 that detects the output speed of the engine 106; a vehicle speed sensor 138 that detects the output speed of the auxiliary transmission apparatus as the vehicle speed; a first lever sensor 139 that detects the operation position of the main shift lever 126; a second lever sensor 141 that detects the operation position of an auxiliary shift lever 140 that is provided in the driver part 117; a third lever sensor 142 that detects the operation position of the shuttle lever 120; a fourth lever sensor 143 that detects the operation position of the up/down lever 127; the above-described up/down switch 128; a turn lifting switch 144, a rearward travel lifting switch 145, and a PTO switch 146 that are included in the driver part 117; a height sensor 147 that detects the angle of up/down swing of left and right lift arms (not shown) of the up/down driving unit 129 as the height position of the work apparatus; and a steering angle sensor 148 that detects the steering angle of the front wheels 109.

The travel control unit 130A performs vehicle speed control to operate a trunnion shaft (not shown) of the main transmission apparatus 132 based on the output from the rotation sensor 137, the output from the vehicle speed sensor 138, the output from the first lever sensor 139, and the output from the second lever sensor 141 such that the vehicle speed reaches a control target vehicle speed obtained based on the engine output speed, the operation position of the main shift lever 126, and the operation position of the auxiliary shift lever 140. Thus, the driver can change the vehicle speed to any speed by operating the main shift lever 126 to a certain operation position.

The travel control unit 130A performs forward/rearward travel switching control to switch the forward/rearward travel switching apparatus 133 to a power transmission state corresponding to the operation position of the shuttle lever 120, based on the output from the third lever sensor 142. Thus, the driver can set the travel direction of the vehicle body to the forward direction by operating the shuttle lever 120 to a forward travel position. Also, the driver can set the travel direction of the vehicle body to the rearward direction by operating the shuttle lever 120 to a rearward travel position.

The work control unit 130B performs position control to control the action of the up/down driving unit 129 based on the output from the fourth lever sensor 143 and the output from the height sensor 147, such that the work apparatus is located at the height position that corresponds to the operation position of the up/down lever 127. Thus, the driver can change the height position of the work apparatus to any height position by operating the up/down lever 127 to a certain operation position.

Upon the up/down switch 128 being switched to a lifting instruction state in response to the up/down switch 128 being manually operated, the work control unit 130B performs lifting control to control the action of the up/down driving unit 129 based on a lifting instruction from the up/down switch 128 and the output from the height sensor 147 such that the work apparatus is lifted to an upper limit position that has been determined in advance. Thus, the driver can make the work apparatus be automatically lifted to the upper limit position by switching the up/down switch 128 to the lifting instruction state.

Upon the up/down switch 128 being switched to a lowering instruction state in response to the up/down switch 128 being manually operated, the work control unit 130B performs lowering control to control the action of the up/down driving unit 129 based on a lowering instruction from the up/down switch 128, the output from the fourth lever sensor 143, and the output from the height sensor 147 such that the work apparatus is lowered to a work height position that has been set using the up/down lever 127. Thus, the driver can make the work apparatus be automatically lowered to the work height position by switching the up/down switch 128 to the lowering instruction state.

When execution of turn-conjunctive lifting control is selected in response to the turn lifting switch 144 being manually operated, the work control unit 130B automatically performs the above-described lifting control upon detecting that the steering angle of the front wheels 109 has reached a set angle for a ridge edge turn based on the output from the steering angle sensor 148 that detects the steering angle of the front wheels 109. Thus, by selecting execution of turn-conjunctive lifting control in advance, the driver can make the work apparatus be automatically lifted to the upper limit position in conjunction with the start of a ridge edge turn.

When execution of rearward travel-conjunctive lifting control is selected in response to the rearward travel lifting switch 145 being manually operated, the work control unit 130B automatically performs the above-described lifting control upon detecting that the shuttle lever 120 has been manually operated to the rearward travel position based on the output from the third lever sensor 142. Thus, by selecting execution of rearward travel-conjunctive lifting control in advance, the driver can make the work apparatus be automatically lifted to the upper limit position in conjunction with switching to rearward travel.

Upon the PTO switch 146 being manually operated and switched to an ON position, the work control unit 130B performs clutch ON control to switch the PTO clutch 134 to an ON position based on the switching of the PTO switch 146 to the ON position so that work power is transmitted to the work apparatus. Thus, the driver can activate the work apparatus by operating the PTO switch 146 to the ON position.

Upon the PTO switch 146 being manually operated and switched to an OFF position, the work control unit 130B performs clutch OFF control to switch the PTO clutch 134 to an OFF position based on the switching of the PTO switch 146 to the OFF position so that work power is not transmitted to the work apparatus. Thus, the driver can stop the work apparatus by operating the PTO switch 146 to the OFF position.

Upon the PTO switch 146 being manually operated and switched to an automatic position, the work control unit 130B automatically performs the above-described clutch OFF control in conjunction with execution of the above-described lifting control, or automatically performs the above-described clutch ON control in conjunction with execution of the above-described lowering control. Thus, by operating the PTO switch 146 to the automatic position in advance, the driver can stop the work apparatus in conjunction with the automatic lifting of the work apparatus to the upper limit position, or activate the work apparatus in conjunction with the automatic lowering of the work apparatus to the work height position.

As shown in FIGS. 9 to 13 and 15, the tractor includes a selection switch 150 that enables the driver to select a manual driving mode or an automatic driving mode as a driving mode, and an electronic control system 151 for automatic driving through which the vehicle body is automatically driven when the automatic driving mode is selected. The electronic control system 151 includes, for example: the above-described main ECU 130; an automatic steering unit 152 that realizes automatic steering of the left and right front wheels 109; a positioning unit 153 that measures the position and orientation of the vehicle body; and a monitoring unit 154 that monitors the surroundings of the vehicle body.

As shown in FIGS. 10 to 12 and 15, the automatic steering unit 152 is constituted by the above-described power steering unit 124. When the manual driving mode is selected, the power steering unit 124 steers the left and right front wheels 109 based on an operation performed to rotate the steering wheel 119. When the automatic driving mode is selected, the power steering unit 124 steers the left and right front wheels 109 based on a control instruction from the main ECU 130.

That is to say, it is possible to automatically steer the left and right front wheels 109 without providing a steering unit that is dedicated to automatic steering. Also, if a failure occurs in the electrical system of the power steering unit 124, the occupant can easily switch to manual steering and continue driving the vehicle body.

As shown in FIGS. 9 to 11 and 15 to 18, the positioning unit 153 includes a satellite navigation apparatus 160 that measures the position and orientation of the vehicle body using a well-known GPS (Global Positioning System), which is an example of a GNSS (Global Navigation Satellite System). Positioning methods using a GPS include a DGPS (Differential GPS) method and an RTK-GPS (Real Time Kinematic GPS) method, for example. In the present embodiment, an RTK-GPS method, which is suitable for positioning a moving object, is employed.

The satellite navigation apparatus 160 includes an antenna unit 161 for satellite navigation that receives radio waves transmitted from a GPS satellite (not shown) and positioning data transmitted from a reference station (not shown) located at a known position. The reference station transmits positioning data obtained by receiving radio waves from a GPS satellite, to the satellite navigation apparatus 160. The satellite navigation apparatus 160 obtains the position and orientation of the vehicle body based on positioning data obtained by receiving radio waves from the GPS satellite, and positioning data from the reference station.

The antenna unit 161 is attached to a roof 162 of the cabin 104, which is located at the top of the vehicle body so as to increase sensitivity when receiving radio waves from the GPS satellite. Therefore, the position and the orientation of the vehicle body measured using the GPS include positioning errors due to displacement of the antenna unit 161 resulting from yawing, pitching, or rolling of the vehicle body.

Therefore, the vehicle body is provided with an IMU (Inertial Measurement Unit) 63 that includes a three-axis gyroscope (not shown) and a three-direction acceleration sensor (not shown), and measures the yaw angle, pitch angle, and roll angle of the vehicle body so that correction can be performed to eliminate the above-described positioning errors. The IMU 163 is provided inside the antenna unit 161 so that the amount of displacement of the above-described antenna unit 161 can be easily obtained. The antenna unit 161 is attached to a central area, in the left-right direction, of the upper surface of a front portion of the roof 162 of the cabin 104 such that the antenna unit 161 is located at a midpoint of a track T and a midpoint of a wheelbase L of the vehicle body in plan view (see FIG. 10).

With the above-described configuration, at least in plan view, the position at which the IMU 163 is attached is close to the position of the center of gravity of the vehicle body. As a result, it is possible to easily perform calculation for correcting the yaw angle and so on measured by the IMU 163, based on the amount of displacement of the IMU 163 from the position of the center of gravity of the vehicle body, and thus it is possible to swiftly and correctly correct the result of measurement performed by the IMU 163. That is to say, the IMU 163 can swiftly and accurately measure the yaw angle and so on of the vehicle body.

As a result, when the satellite navigation apparatus 160 measures the position and orientation of the vehicle body, if the antenna unit 161 is displaced due to yawing, pitching, or rolling of the vehicle body, it is possible to swiftly and accurately obtain the amount of displacement of the antenna unit 161 in such a case based on, for example, the yaw angle, pitch angle, and roll angle of the vehicle body measured by the IMU 163. Then, positioning errors included in the position and orientation of the vehicle body measured by the satellite navigation apparatus 160, resulting from displacement of the antenna unit 161, can be obtained swiftly and accurately, based on the amount of displacement of the antenna unit 16 that can be obtained from the result of measurement performed by the IMU 163, and it is possible to swiftly and appropriately perform correction to eliminate the positioning errors from the result of measurement performed by the satellite navigation apparatus 160.

As a result, it is possible to easily, swiftly, and accurately measure the position and orientation of the vehicle body using a GNSS.

As shown in FIG. 15, the main ECU 130 includes an automatic driving control unit 130C that includes various control programs that realize automatic driving of the vehicle body. The automatic driving control unit 130C transmits various control instructions to the travel control unit 130A, the work control unit 130B, and so on at appropriate points in time so that the vehicle body automatically travels along a preset target travel path on a farm field at a set speed while appropriately performing work, based on, for example, the target travel path and the result of positioning performed by the positioning unit 153. The travel control unit 130A controls the operations of the main transmission apparatus 132, the forward/rearward travel switching apparatus 133, and so on by transmitting various control instructions to the main transmission apparatus 132, the forward/rearward travel switching apparatus 133, and so on at appropriate points in time, based on various control instructions from the automatic driving control unit 130C, various pieces of information acquired by the in-vehicle information acquisition unit 136, and so on. The work control unit 130B controls the operations of the up/down driving unit 129, the PTO clutch 134, and so on by transmitting various control instructions to the up/down driving unit 129, the PTO clutch 134, and so on at appropriate points in time, based on various control instructions from the automatic driving control unit 130C, various pieces of information acquired by the in-vehicle information acquisition unit 136, and so on.

The target travel path may be a travel path along which the vehicle travelled during task travel while being manually driven in a farm field, the start point of a ridge edge turn, and so on that have been converted into data based on, for example, the result of positioning performed by the positioning unit 153. Alternatively, the target travel path may be a travel path along which the vehicle travelled during teaching travel while being manually driven in a farm field, the start point of a ridge edge turn, and so on that have been converted into data based on, for example, the result of positioning performed by the positioning unit 153.

As shown in FIGS. 9 to 13 and 15 to 18, the monitoring unit. 154 includes, for example: an obstacle detection module 164 that detects the presence or absence of an obstacle within an immediate range (e.g. within 1 m) of the vehicle body; front and rear obstacle detectors (described below) that detect an approaching obstacle within a short range (e.g. within 10 m) of the vehicle body; a contact avoidance control unit 130D that performs contact avoidance control to avoid coming into contact with an obstacle; six monitoring cameras 166 that capture the surroundings of the vehicle body; and an image processing apparatus 167 that processes images captured by the monitoring cameras 166.

The obstacle detection module 164 includes eight obstacle searchers (described below) that search for an obstacle within the immediate range of the vehicle body, and two search information processing apparatuses 169 that perform determination processing regarding whether or not an obstacle has approached and entered the immediate range of the vehicle body based on search information from each of the obstacle searcher.

A sonar device 168 that uses ultrasonic waves to measure a distance, which is an example of a range sensor, is employed in each obstacle searcher. Eight sonar devices 168 are distributed on the front-end portion and the left and right end portions of the vehicle body such that the front side and the left and right sides of the vehicle body are search-target areas. Each sonar device 168 transmits search information obtained by performing a search to the search information processing apparatus 169 corresponding thereto.

Each search information processing apparatus 169 performs determination processing to determine whether or not an obstacle has approached and entered the immediate range of the vehicle body based on the period from transmission to reception of an ultrasonic wave from the sonar device 168 corresponding to the search information processing apparatus 169, and outputs the result of determination to the contact avoidance control unit 130D.

As a result, when an obstacle has approached and entered the immediate range of the vehicle body from the front side or the left or right sides of the vehicle body during automatic driving, the obstacle detection module 164 detects the approaching obstacle. Also, a sonar device 168 is not provided at a rear end portion of the vehicle body, and therefore the obstacle detection module 164 is prevented from misdetecting the work apparatus attached to the rear end of the vehicle body so as to be able to move up and down, as an obstacle.

When the vehicle body is travelling toward a ridge during automatic driving, or when the vehicle body is travelling along a ridge at a ridge edge, if the ridge has unexpectedly entered the immediate range, the obstacle detection module 164 detects the ridge as an obstacle. Also, when a moving object has unexpectedly approached and entered the immediate range of the vehicle body, the obstacle detection module 164 detects the moving object as an obstacle.

A laser scanner 165 that has a detection angle of approximately 270 degrees is employed as each obstacle detector 165. Each laser scanner 165 includes a search unit 165A that searches for an obstacle and a processing unit 165B that processes search information from the search unit 165A. The search unit 165A irradiates a search-target area with a laser beam and receives the reflected light. The processing unit 165B determines whether or not an obstacle has approached and entered a short range of the vehicle body, for example, based on the period from irradiation to reception of the laser beam, and outputs the result of determination to the contact avoidance control unit 130D. The search-target area of the laser scanner 165 on the front side is set to be an area that is forward of the vehicle body. The search-target area of the laser scanner 165 on the rear side is set to be an area that is rearward of the vehicle body.

The contact avoidance control unit 130D includes, for example, a control program that realizes execution of contact avoidance control, and is provided in the main ECU 130. Upon detecting that an obstacle has approached and entered the short range of the vehicle body based on the result of determination performed by each laser scanner 165, the contact avoidance control unit 130D preferentially performs contact avoidance control compared to automatic driving that is based on control operations performed by the automatic driving control unit 130C. Thereafter, the contact avoidance control unit 130D performs contact avoidance control based on the result of determination performed by each laser scanner 165 and each search information processing apparatus 169.

In contact avoidance control, the contact avoidance control unit 130D outputs a deceleration instruction to the travel control unit 130A upon contact avoidance control starting. Thus, the contact avoidance control unit 130D causes the main transmission apparatus 132 to perform a deceleration operation through a control operation performed by the travel control unit 130A, thereby reducing the vehicle speed from a set speed for normal travel to a set speed for contact avoidance. In this low-speed travel state, if the contact avoidance control unit 130D confirms that an obstacle has approached and entered the immediate range of the vehicle body based on the result of determination by any of the search information processing apparatuses 169, the contact avoidance control unit 130D outputs an emergency stop instruction to the travel control unit 130A and the work control unit 130B. As a result, the contact avoidance control unit 130D switches the forward/rearward travel switching apparatus 133 to the neutral state through a control operation performed by the travel control unit 130A, while causing the brake operation unit 135 to activate the left and right brakes to brake the left and right front wheels 109 and the left and right rear wheels 110. Also, the contact avoidance control unit 130D causes the work control unit 130B to switch the PTO clutch 134 to an OFF state to stop the action of the work apparatus. As a result, it is possible to swiftly stop the vehicle body from travelling and the work apparatus from operating, based on the fact that an obstacle has approached and entered the immediate range of the vehicle body and it is possible to avoid the risk of the vehicle body coming into contact with an obstacle. In this low-speed travel state, upon confirming that there is no obstacle within the short range of the vehicle body based on the result of determination by each laser scanner 165, the contact avoidance control unit 130D outputs an acceleration instruction to the travel control unit 130A, and thereafter ends contact avoidance control.

Thus, the contact avoidance control unit 130D causes the main transmission apparatus 132 to perform an acceleration operation through a control operation performed by the travel control unit 130A so that the vehicle speed is increased from the set speed for contact avoidance to the preset speed for normal travel, and thereafter restarts automatic driving that is based on a control operation performed by the automatic driving control unit 130C.

As shown in FIGS. 9 to 11 and 15 to 18, a wide-angle CCD camera for visible light is employed as each monitoring camera 166. One of the six monitoring cameras 166 is for capturing an image of objects on the front side of the vehicle body. This monitoring camera 166 is provided at the front end of the upper end portion of the cabin 104 at a central position in the left-right direction, in an inclined orientation so as to capture an image forward and downward thereof. Two of the six monitoring cameras 166 are for capturing an image of objects that are located to the right of the vehicle body. These monitoring cameras 166 are provided at the right end of the upper end portion of the cabin 104 with a predetermined interval in the front-rear direction, in an inclined orientation so as to capture an image downward and to the right thereof. Two of the six monitoring cameras 166 are for capturing an image of objects that are located to the left of the vehicle body. These monitoring cameras 166 are provided at the left end of the upper end portion of the cabin 104 with a predetermined interval in the front-rear direction, in an inclined orientation so as to capture an image downward and to the left thereof. One of the six monitoring cameras 166 is for capturing an image of objects on the rear side of the vehicle body. This monitoring camera 166 is provided at the rear end of the upper end portion of the cabin 104 at a central position in the left-right direction, in an inclined orientation so as to capture an image rearward and downward thereof. As a result, it is possible to capture images of the entire surroundings of the vehicle body.

Note that only one right monitoring camera 166 and only one left monitoring camera 166 may be provided at appropriate positions on the left and right end of the upper end portion of the cabin 104.

The image processing apparatus 167 processes video signals from the monitoring cameras 166, generates an image of objects on the front side of the vehicle body, an image of objects located to the right of the vehicle body, an image of objects located to the left of the vehicle body, an image of objects on the rear side of the vehicle body, a bird's eye image seen from right above the vehicle body, and so on, and transmits the images to the display unit 123 and so on. The display unit 123 includes, for example, a control unit 123B that changes an image displayed on the liquid crystal panel 123A, based on, for example, a manual operation made with various operation switches (not shown) displayed on the liquid crystal panel 123A.

With the above-described configuration, during manual driving, displaying images from the image processing apparatus 167 on the liquid crystal panel 123A makes it easier for the driver to visually check the state of the surroundings of the vehicle body and the state of work. Thus, the driver can easily drive the vehicle body in a preferable manner according to the type of work, and so on. Also, during automatic driving, when an administrator rides in the vehicle body, displaying images from the image processing apparatus 167 on the liquid crystal panel 123A makes it easier for the administrator to visually check the state of the surroundings of the vehicle body and the state of work during automatic driving. If the administrator visually recognizes an abnormality in the surroundings of the vehicle body, the state of work, or the like during automatic driving, the administrator can swiftly and appropriately address the abnormality according to the type of abnormality, the degree of the abnormality, and so on.

As shown in FIG. 15, the electronic control system 151 includes a cooperation control unit 170 that, when a cooperative driving mode is selected by manually operating the selection switch 150, causes the vehicle body to automatically drive in cooperation with another vehicle that has the same specifications. The cooperation control unit 170 includes a communication module 171 that wirelessly communicates with another vehicle to exchange information regarding cooperative travel with the other vehicle, including information regarding the positions of the vehicle bodies, with each other, and a cooperative driving control unit 130E that performs cooperative driving control based on information from the other vehicle. The cooperative driving control unit 130E includes, for example, a control program that realizes execution of cooperative driving control, and is provided in the main ECU 130.

In the cooperative driving mode, the automatic driving control unit 130C transmits various control instructions to the travel control unit 130A, the work control unit 130B, and so on at appropriate points in time so that the vehicle body automatically travels along a preset target travel path for side-by-side travel at a set speed while appropriately performing work, based on, for example, the target travel path for side-by-side travel and the result of positioning performed by the positioning unit 153. The cooperative driving control unit 130E determines whether or not the distance between the vehicle and another preceding vehicle in the forward travel direction, the distance between the vehicle and the other preceding vehicle in the side-by-side direction, and so on are appropriate, based on the target travel path for side-by-side travel of the vehicle, the result of positioning performed by the positioning unit 153, the target travel path for side-by-side travel of the other vehicle, position information regarding the other vehicle, and so on. If any of the distances between the vehicles is inappropriate, the cooperative driving control unit 130E preferentially restarts cooperative driving control compared to automatic driving that is based on the control operation made by the automatic driving control unit 130C, so that the distance between the vehicles is appropriate.

In cooperative driving control, if the distance between the vehicles in the forward travel direction is shorter than an appropriate distance, the cooperative driving control unit 130E outputs a deceleration instruction to the travel control unit 130A. Thus, the cooperative driving control unit 130E causes the main transmission apparatus 132 to perform a deceleration operation through a control operation performed by the travel control unit 130A, thereby returning the distance between the vehicles in the forward travel direction to the appropriate distance. Upon the distance between the vehicles in the forward travel direction returning to the appropriate distance, the cooperative driving control unit 130E restarts automatic driving that is based on a control operation performed by the automatic driving control unit 130C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 130E outputs an acceleration instruction to the travel control unit 130A. Thus, the cooperative driving control unit 130E causes the main transmission apparatus 132 to perform an acceleration operation through a control operation performed by the travel control unit 130A, thereby returning the distance between the vehicles in the forward travel direction to the appropriate distance. Upon the distance between the vehicles in the forward travel direction returning to the appropriate distance, the cooperative driving control unit 130E restarts automatic driving that is based on a control operation performed by the automatic driving control unit 130C, thereby reducing the vehicle speed to the set speed for normal travel and keeping the distance between the vehicles in the forward travel direction at the appropriate distance.

If the distance between the vehicles in the side-by-side direction is longer than the appropriate distance, the cooperative driving control unit 130E outputs a steering instruction to the travel control unit 130A. Thus, the cooperative driving control unit 130E causes the left and right front wheels 109 to steer toward the other vehicle through a control operation performed by the travel control unit 130A, thereby returning the distance between the vehicles in the side-by-side direction to the appropriate distance. Upon the distance between the vehicles in the side-by-side direction returning to the appropriate distance, the cooperative driving control unit 130E restarts automatic driving that is based on a control operation performed by the automatic driving control unit 130C, thereby returning the travel direction of the vehicle body to the travel direction for normal travel and keeping the distance between the vehicles in the side-by-side direction at the appropriate, distance.

If the distance between the vehicles in the side-by-side travel direction is shorter than the appropriate distance, the cooperative driving control unit 130E outputs a steering instruction to the travel control unit 130A to travel away from the other vehicle. Thus, the cooperative driving control unit 130E causes the left and right front wheels 109 to steer away from the other vehicle through a control operation performed by the travel control unit 130A, thereby returning the distance between the vehicles in the side-by-side direction to the appropriate distance. Upon the distance between the vehicles in the side-by-side direction returning to the appropriate distance, the cooperative driving control unit 130E restarts automatic driving that is based on a control operation performed by the automatic driving control unit 130C; thereby returning the travel direction of the vehicle body to the travel direction for normal travel and keeping the distance between the vehicles in the side-by-side direction at the appropriate distance.

Thus, it is possible to automatically and appropriately drive the vehicle side-by-side with another preceding vehicle while keeping the distances between the vehicles in the forward travel direction and the side-by-side direction at appropriate distances.

As shown in FIGS. 9 to 11, 14, and 16 to 19, the cabin 104 is provided with, for example: a roof frame 172 that supports the roof 162 and so on; left and right front pillars 173 that support a front end portion of the roof frame 172; left and right center pillars 174 that support an intermediate portion of the roof frame 172 in the front-rear direction; left and right rear pillars 175 that support a rear end portion of the roof frame 172; a front panel 176 that constitutes the front face of the cabin 104; left and right door panels 177 that are supported by the left and right center pillars 174 so as to be able to be swung open and closed; left and right side panels 178 that constitute rear side faces of the cabin 104; and a rear panel 179 that is supported by the roof frame 172 so as to be able to be swung open and closed.

The roof frame 172 includes, for example: a front beam 198 that spans between the left and right front pillars 173; left and right side beams 199 that respectively span between the left and right front pillars 173 and the left and right rear pillars 175; and a rear beam 200 that spans between the left and right rear pillars 175, and has a substantially rectangular shape in plan view.

The left and right front pillars 173 are provided in the vehicle body at positions that are forward of a central portion of the wheelbase L of the vehicle body. Upper halves of the left and right front pillars 173 are curved such that, in a front view, they are located closer to a central portion of the vehicle body in the left-right direction at a higher position, and in a side view, they are located closer to a central portion of the vehicle body in the front-rear direction at a higher position.

The left and right center pillars 174 and the left and right rear pillars 175 are located between the left and right rear fenders 112 on the left and fright sides of the driver's seat 122 and the roof frame 172. The left and right center pillars 174 are curved such that, in a front view, they are located closer to a central portion of the vehicle body in the left-right direction at a higher position, and in a side view, they are located closer to a central portion of the vehicle body in the front-rear direction at a higher position. The left and right rear pillars 175 are curved such that, in a front view, they are located closer to a central portion of the vehicle body in the left-right direction at a higher position, and in a side view, they are in a substantially vertical orientation.

Curved panels that are made of glass, a light-transmitting acrylic resin, or the like and curve along the pillars 173 to 175 and so on corresponding thereto are employed as the panels 176 to 179.

With the above-described configuration, in a lower half portion of the cabin 104, a large space in which the driver sitting on the driver's seat 122 can easily perform various operations using his or her hands or feet, whereas, in an upper half portion of the cabin 104, the width in the front-rear direction and the width in the left-right direction of the roof frame 172 can be narrowed to the extent that riding comfort is not degraded. As a result, it is possible to improve the stability of the vehicle body by reducing the weight and size of an upper portion of the cabin without degrading the operability and riding comfort in the boarding space.

As shown in FIGS. 9 to 11 and 17 to 19, the cabin 104 is provided with an auxiliary frame 190 that extends rearward from upper end portions of the left and right rear pillars 175. The auxiliary frame 190 supports the laser scanner 165 on the rear side, the monitoring camera 166 for capturing an image of objects on the rear side, and so on.

As shown in FIGS. 9 to 11 and 16 to 19, the cabin 104 is provided with left and right combination lamps 240 at both the front-end portion and the rear end portion thereof. Each combination lamp 240 includes a brake lamp 241 and a blinker lamp 242 (an example of a display light). The left and right combination lamps 240 on the front side are attached to central portions of the left and right front pillars 173 in the top-bottom direction. The left and right combination lamps 240 on the rear side are supported by left and right support members 244 that are each supported by the auxiliary frame 190 of the cabin 104 and either one of the left and right rear pillars 175 in a vertical orientation.

As shown in FIGS. 9 to 11 and 16 to 21, the electronic control system 151 includes an external display unit 245 that displays the driving state of the vehicle body during automatic driving so as to be externally visible. The external display unit 245 includes left and right layered display lights 246 (examples of display lights) that are each constituted by three lamps 246A to 246C of different display colors that are layered, and an external display control unit 130F that controls operations of each layered display light 246 according to the driving state of the vehicle body during automatic driving, for example. The external display control unit 130F includes, for example, a control program that realizes control of the action of each layered display light 246 according to the driving state of the vehicle body during automatic driving, for example, and is provided in the main ECU 130.

The layered display lights 246 are provided laterally outward of the left and right rear pillars 175 of the cabin 104, with respect to the vehicle body, at positions that are inward of the lateral outer ends of the left and right rear wheels 110, with respect to the vehicle body, and that are downward of the roof 162 of the cabin 104, with respect to the vehicle body, in a vertical orientation in which the display units 246A to 246C are arranged in the top-bottom direction.

With the above-described configuration, the layered display lights 246 are arranged so as not to protrude from the upper end and the left and right ends of the vehicle body, but the administrator outside the tractor that is automatically driven can easily check the state of action of one of the left and right, layered display lights 246 visually, without being interfered with by the cabin 104. Through such a visual check, the administrator can easily grasp the driving state of the vehicle body of the tractor during automatic driving.

As a result, it is possible to enable the administrator outside the vehicle to easily grasp the driving state of the vehicle body of the tractor that is automatically driven, based on the action of the left and right layered display lights 246, without making it difficult to move the tractor into or out of the barn or the like.

The external display control unit 130F monitors the driving state of the vehicle body during automatic driving and the reception state of GPS signals. The external display control unit 130F controls the actions of the three display units 246A to 246C of each layered display light 246 based on the driving state of the vehicle body during automatic driving and the reception state of GPS signals. For example, if the vehicle body is travelling through automatic driving, the green display unit 246A of the three display units 246A to 246C is turned on. If the vehicle body has temporarily stopped through automatic driving, the yellow display unit 246B of the three display units 246A to 246C is turned on. If the vehicle body has made an emergency stop through automatic driving, the red display unit 246C of the three display units 246A to 246C is turned on. If the reception state of GPS signals is unstable, the red display unit 246C is caused to blink.

As shown in FIGS. 16 to 22, the layered display lights 246 are supported by the left and right support members 244, using L-shaped fittings 247, so as to be provided laterally outward of the combination lamps 240. Thus, while the support members 244 are used to support the layered display lights 246, the layered display lights 246 can be provided laterally outward of the left and right rear pillars 175 such that an administrator is not prevented from visually checking the combination lamps 240 from the front side or rear side of the vehicle body. Thus, it is possible to desirably provide the left and right layered display lights 246 laterally outward of the left and right rear pillars 175 that can be easily visually checked from the administrator outside the vehicle, while simplifying the configuration through parts sharing.

The external display control unit 130F controls the action of the left and right blinker lamps 242 according to the driving state of the vehicle body during automatic driving. Specifically, during work travel through automatic driving in a farm field, the external display control unit 130F obtains the travel direction of the vehicle body and the distance from the current position to the start point of a ridge edge turn when the vehicle body travels straight, based on positioning information from the satellite navigation apparatus 160, in-vehicle information from in-vehicle information acquisition unit 136, and so on. If the distance to the start point of a ridge edge turn is longer than 15 meters, the external display control unit 130F causes the left and right blinker lamps 242 to flash each time the vehicle body travels 10 meters. If the distance to the start point of a ridge edge turn is within the range of 10 meters to 15 meters, the external display control unit 130F causes the blinker lamp 242 corresponding to the turning direction at first preset time intervals (e.g. intervals of one second). If the distance to the start point of a ridge edge turn is within the range of 5 meters to 10 meters, the external display control unit 130F causes the blinker lamp 242 corresponding to the turning direction at second preset time intervals (e.g. intervals of 500 milliseconds). If the distance to the start point of a ridge edge turn is within the range of 0 meter to 5 meters, the external display control unit 130F causes the blinker lamp 242 corresponding to the turning direction at third preset time intervals (e.g. intervals of 250 milliseconds). During a turn, the external display control unit 130F causes the blinker lamp 242 in the turning direction. When the vehicle body is travelling rearward, the external display control unit 130F causes the left and right blinker lamps 242 at the second preset time intervals, regardless of whether the travel is straight travel or a turn.

With the above-described configuration, the left and right blinker lamps 242 that are not particularly required to be operated during travel in a farm field can be effectively used as display lights for enabling the administrator outside the vehicle to grasp the driving state of the vehicle body during automatic driving. Also, the left and right blinker lamps 242 are provided at positions that can be more easily visually checked by a person outside the vehicle compared to the original state. Thus, it is possible to enable an administrator or the like outside the vehicle to easily grasp the state of action of each blinker lamp 242. That is to say, it is possible to enable an administrator or the like outside the vehicle to grasp more information regarding the driving state of the vehicle body of the tractor during automatic driving, while simplifying the configuration through parts sharing.

As shown in FIGS. 9 to 11 and 15 to 18, the cabin 104 is provided with left and right work lights 248 provided on both front and rear end portions of the upper end portion of the cabin 104. The automatic driving control unit 130C is configured to perform automatic lighting control based on detection that is performed by an illuminance sensor 249 that detects the illuminance of the outside of the vehicle, such that, upon detecting that the illuminance of the outside of the vehicle has decreased to be no greater than a preset value, the automatic driving control unit 130C causes each work light 248 to be automatically turned on, and upon detecting that the illuminance of the outside of the vehicle has increased to be greater than the preset value, the automatic driving control unit 130C causes each work light 248 to be automatically turned off.

The communication module 171 is configured to be able to wirelessly communicate with a remote controller 250 for remote operation. The remote controller 250 includes, for example, a work light switch 250A that is used to transmit a turn-on instruction signal for making an instruction to turn on the work lights 248, and a turn-off instruction signal for making an instruction to turn off the work lights 248. Upon receiving a turn-on instruction signal or a turn-off instruction signal from the remote controller 250, the communication module 171 outputs the received instruction signal to the automatic driving control unit 130C. Upon receiving a turn-on instruction signal, or a turn-off instruction signal, the automatic driving control unit 130C preferentially turns on or turns off the work lights 248 regardless of automatic lighting control.

With the above-described configuration, when the sun has set and it gets dark during work travel through automatic driving, it is possible to turn on the work lights 248 without interrupting the work travel, through control actions performed by the automatic driving control unit 130C based on detection performed by the illuminance sensor 249 or a turn-on instruction signal from the remote controller 250. Thus, it is possible to desirably monitor the tractor that performs work travel through automatic driving.

The automatic driving control unit 130C is configured such that, if the automatic driving control unit 130C has detected through communication with the engine ECU 131 that the engine 106 has stopped, the automatic driving control unit 130C does not turn on the work lights 248 regardless of detection performed by the illuminance sensor 249 or a turn-on instruction signal from the remote controller 250. Thus, it is possible to prevent the battery from dying as a result of the work lights 248 being unnecessarily turned on while the engine has stopped.

Note that the automatic driving control unit 130C may be configured to switch to a first control mode, in which the automatic driving control unit 130C controls the actions of the work lights 248 based on detection performed by the illuminance sensor 249, and a second mode, in which the automatic driving control unit 130C controls the actions of the work lights 248 based on an instruction signal from the remote controller 250, in response to an operation with a mode switch (not shown) that is provided in the driver part 117 or the remote controller 250.

Figure 18:
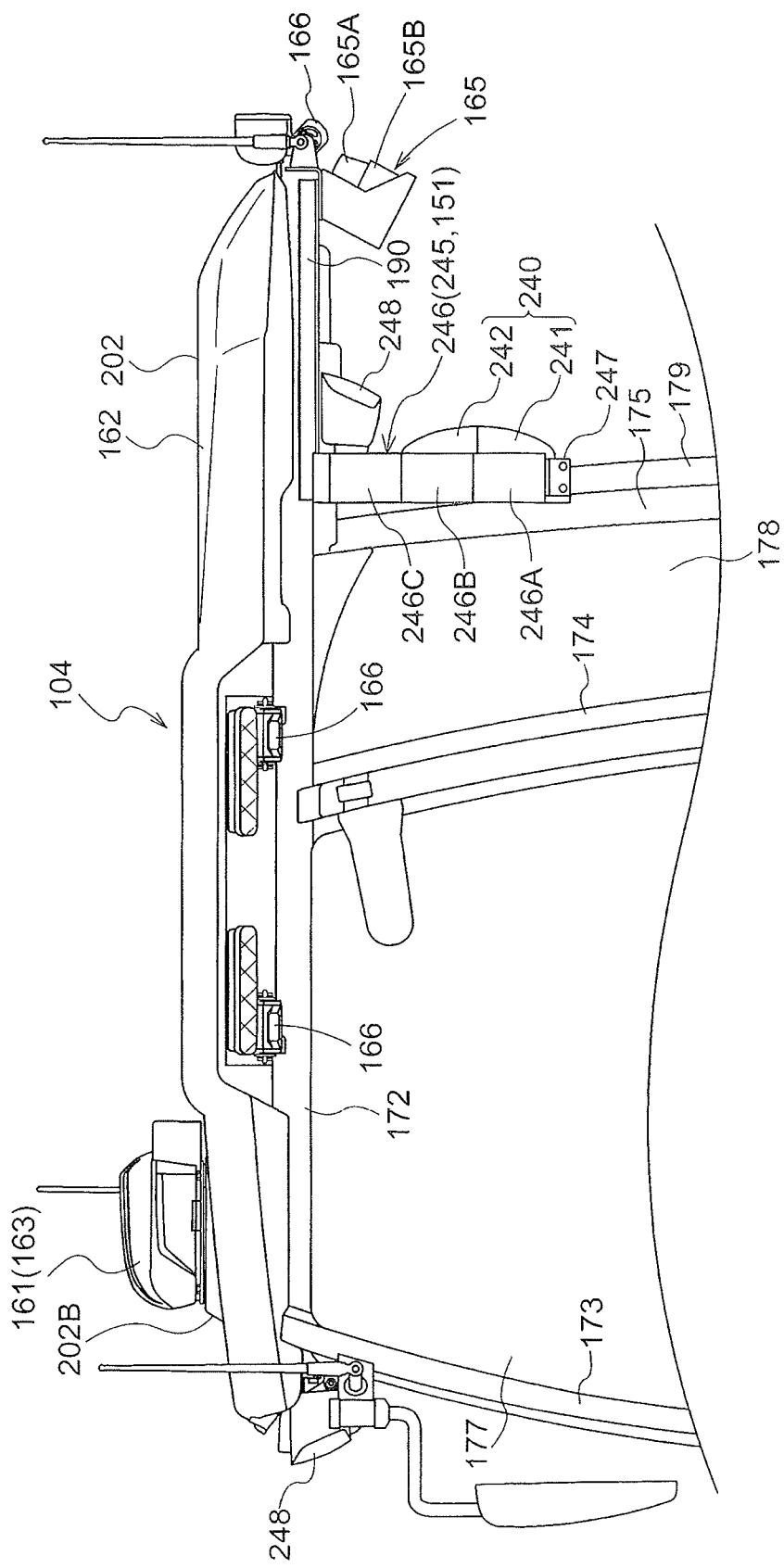
Figure 19:
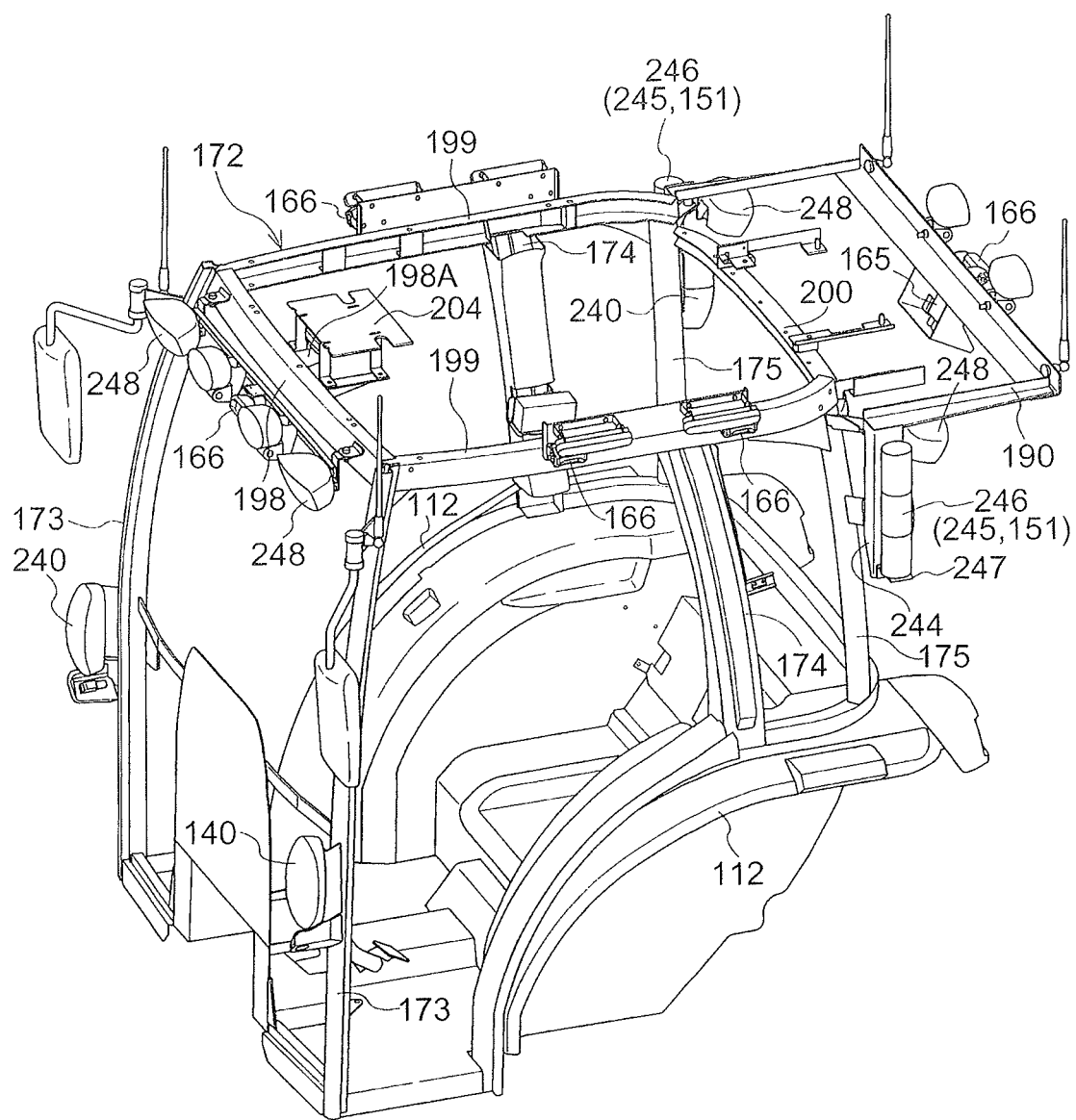
FIG. 19 is a perspective view of a main portion, showing a frame structure for the cabin.
Figure 20:
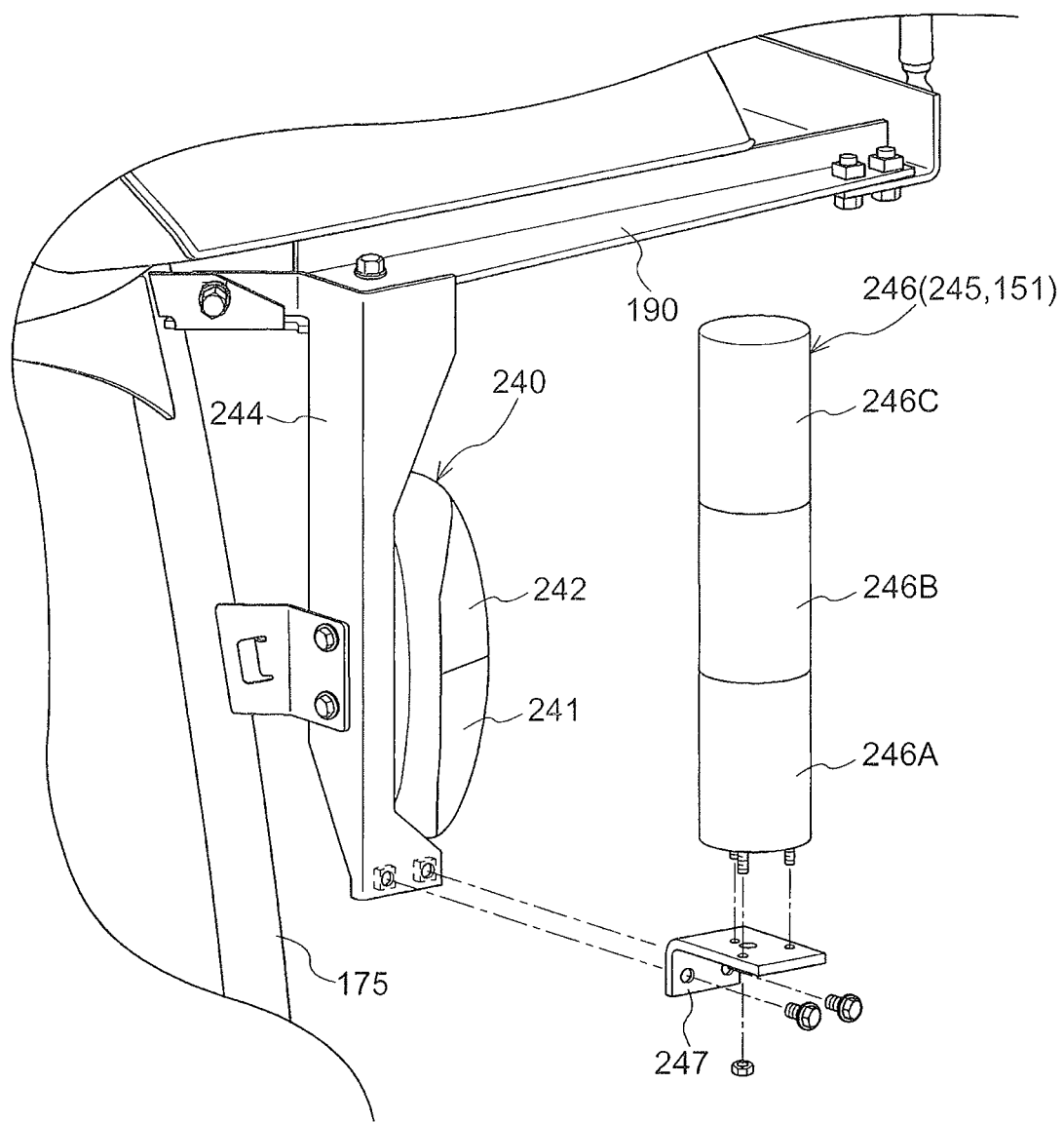
FIG. 20 is an exploded perspective view of a main portion, showing a support structure for display lights.
Figure 21:
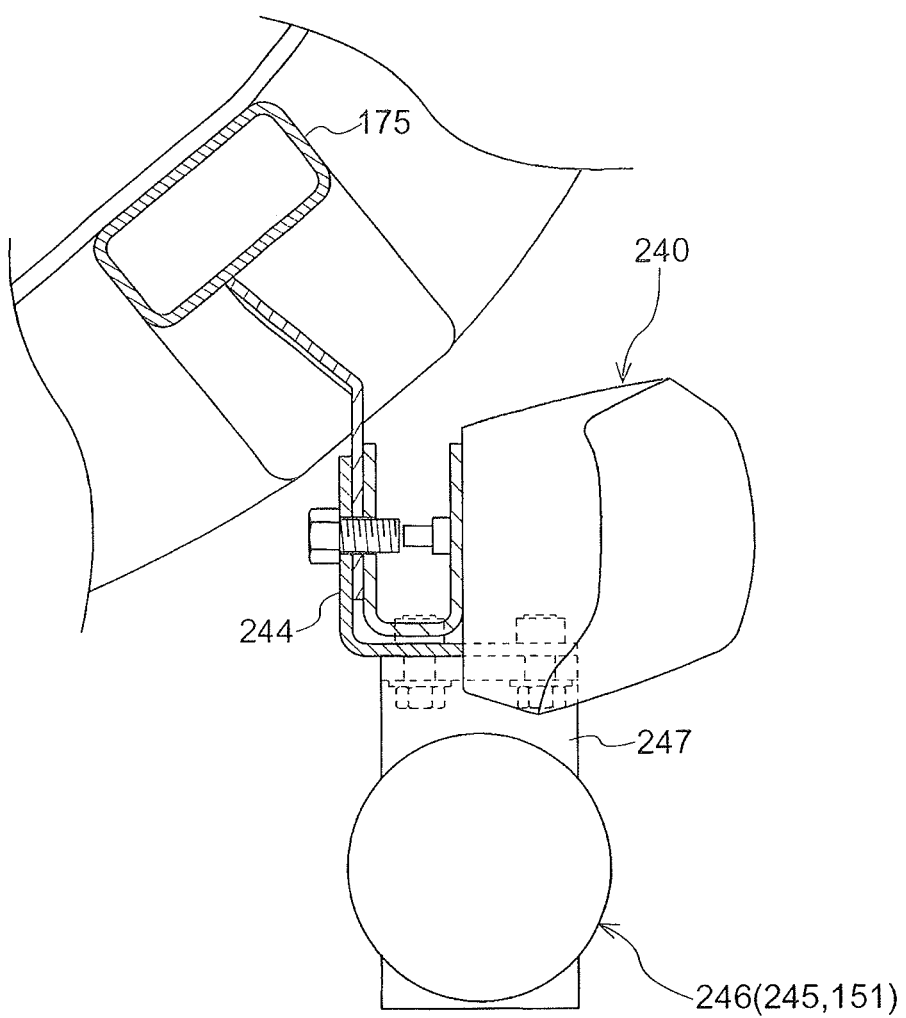
FIG. 21 is a horizontal plan view of a main portion, showing the support structure for the display lights.
Figure 22:
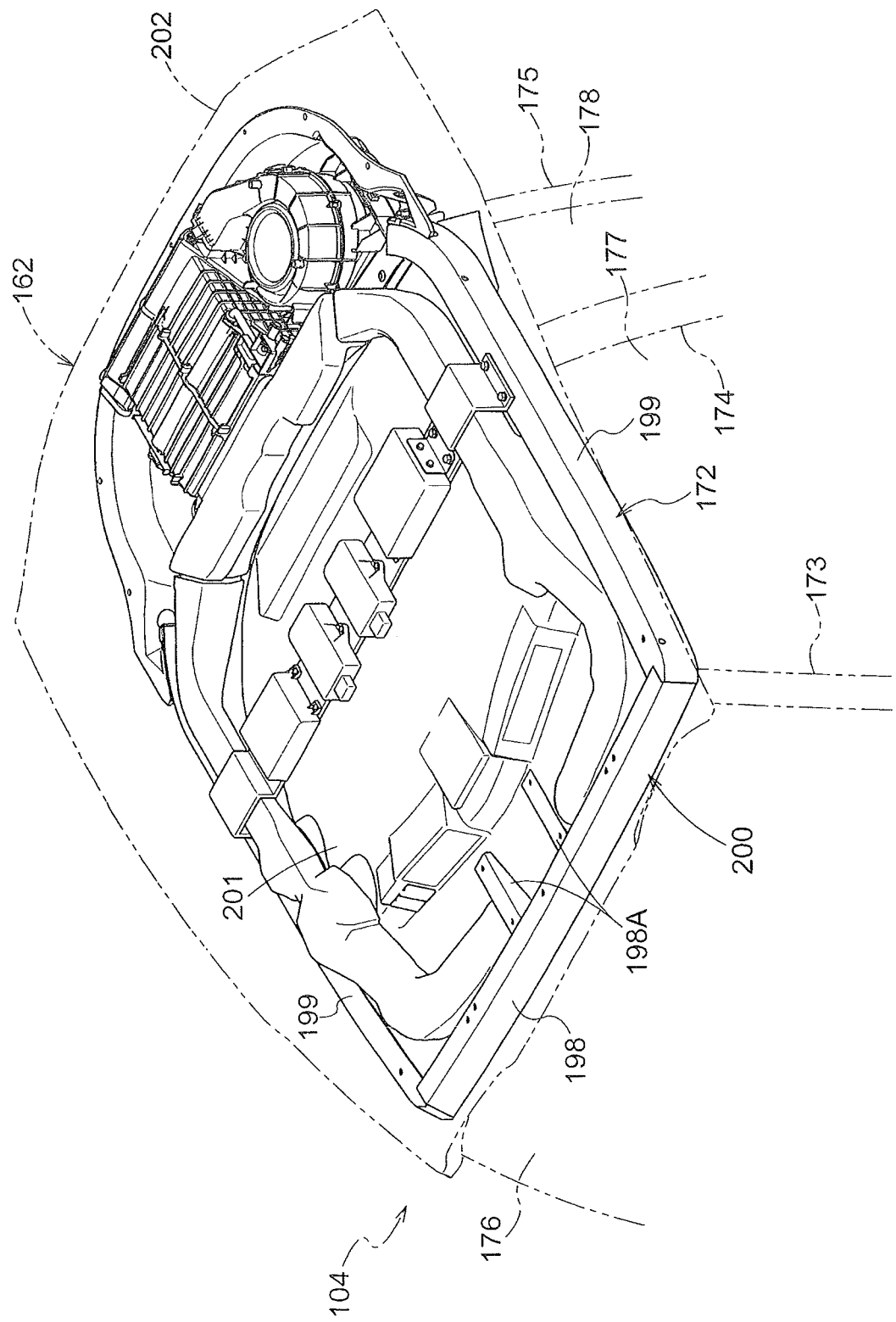
FIG. 22 is a perspective view of a main portion, showing a coupling structure for an antenna unit.

As shown in FIGS. 9 and 18, in a side view, upper end portions of the left and right front pillars 173 are located at a midpoint of the wheelbase L of the vehicle body. In side view, the antenna unit 161 is provided in extensions of the left and right front pillars 173.

With the above-described configuration, it is possible to provide the antenna unit 161 at a midpoint of the wheelbase L and a midpoint of the track T of the vehicle body in a stable state where the antenna unit 161 is supported by the front beam 198 that spans between the left and right front pillars 173 and has high strength.

As shown in FIGS. 9 to 11, 16 to 18, and 22 to 24, the roof 162 of the cabin 104 includes an inner roof 201 that is made of resin and an outer roof 202 that is made of resin, which are supported by the roof frame 172. A coupling portion 202A to which the antenna unit 161 is bolted is provided in a central area, in the left-right direction, of the upper surface of a front portion of the outer roof 202.

Four through holes 202a for bolting are formed in the coupling portion 202A, and rubber sleeves 203 are respectively fitted into the through holes 202a. Each rubber sleeve 203 includes a first flange portion 203A. When the antenna unit 161 is bolted to the coupling portion 202A, the first flange portion 203A is in close contact with the upper surface of the outer roof 202 and the bottom surface of the antenna unit 161.

With the above-described configuration, in a state where the antenna unit 161 is bolted to the coupling portion 202A of the outer roof 202, the first flange portions 203A of the rubber sleeves 203 are located between the upper surface of the outer roof 202 and the bottom surface of the antenna unit 161, and thus vibrations of the vehicle body are unlikely to be transmitted to the antenna unit 161. Also, the first flange portions 203A of the rubber sleeves 203 are in close contact with the upper surface of the outer roof 202 and the bottom surface of the antenna unit 161, and thus rain water or washing water is prevented from entering the inside of the cabin 104 through the through holes 202a of the second coupling portion 202A.

That is to say, the four rubber sleeves 203 that each include a first flange portion 203A serve as vibration-proof members and waterproof members, and thus it is possible to support the antenna unit 161 in a vibration-proof manner, and prevent water from entering the inside of the cabin 104, while simplifying the configuration by reducing the number of parts.

As shown in FIGS. 19 and 22 to 24, at a midpoint of the wheelbase L of the vehicle body, the front beam 198 of the roof frame 172 is provided with left and right support portions 198A that extend rearward from a central portion of the front beam 198 in the left-right direction. The coupling portion 202A of the outer roof 202 also serves as a coupling portion that is to be bolted to a support base 204 that is supported by the left and right support portions 198A. That is to say, the antenna unit 161 is coupled to the support base 204 in a state of being fastened together with the outer roof 202. Thus, assemblability is improved by reducing man-hour required for assembly.

Figure 23:
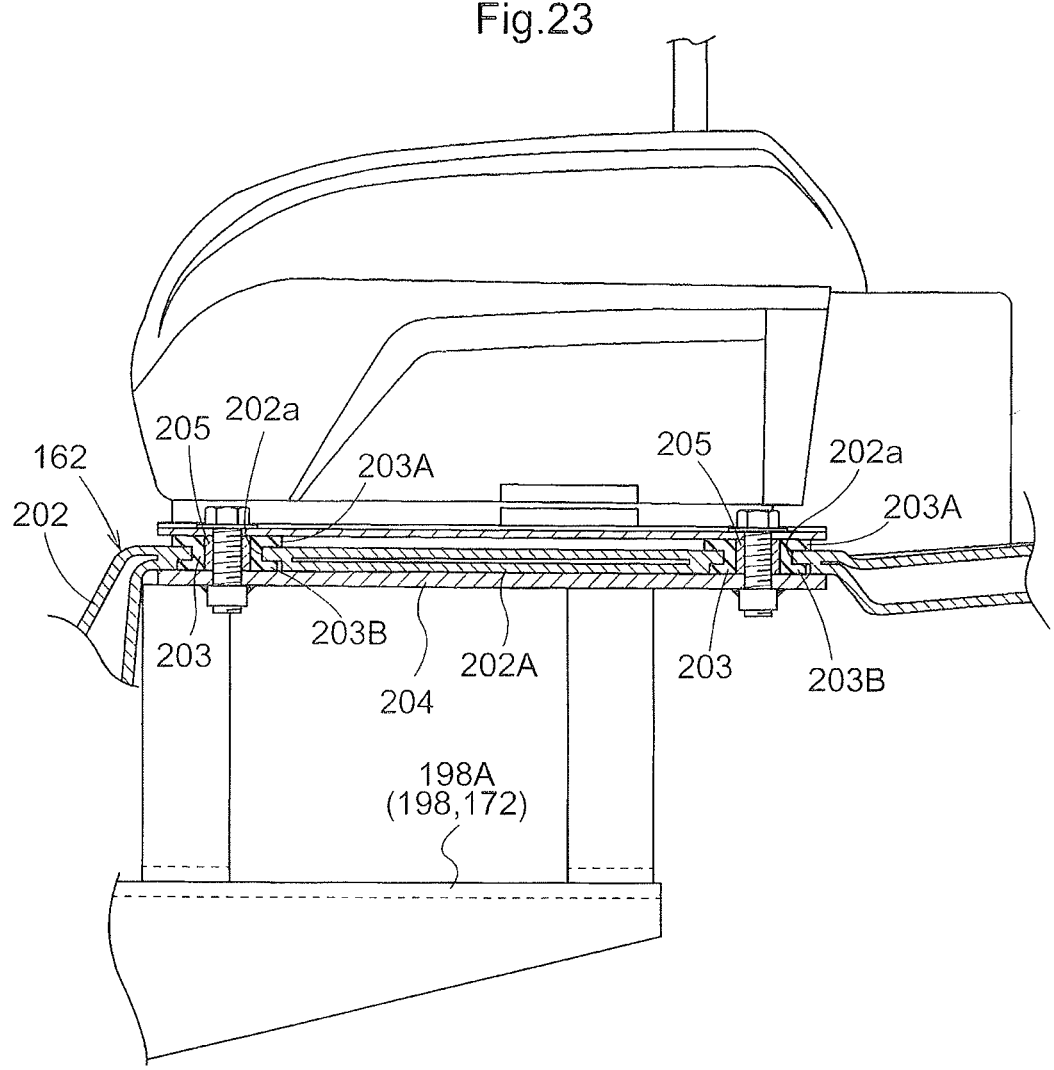
FIG. 23 is a vertical left side view of a main portion, showing the coupling structure for the antenna unit.
Figure 24:
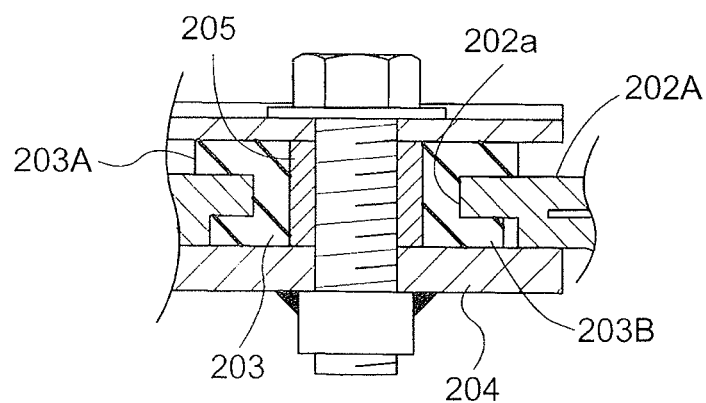
FIG. 24 is a vertical left side view of a main portion, showing a vibration-proof structure for the antenna unit.

As shown in FIGS. 23 and 24, each rubber sleeve 203 includes a second flange portion 203B that is in close contact with the upper surface of the support base 204 and the lower surface of the outer roof 202 when the outer roof 202 and the antenna unit 161 are bolted to the support base 204. Lower surface-side portions of the through holes 202a of the outer roof 202 have an increased diameter such that the second flange portions 203B can be fitted thereinto. A spacer 205 that allows a rubber sleeve 203 to appropriately deform and restricts the amount of screwing of a bolt at the time of bolting is fitted into each through hole 202a together with the rubber sleeve 203.

With the above-described configuration, it is possible to improve the vibration-proof properties of the antenna unit 161, and more reliably prevent water from entering the inside of the cabin 104. Also, due to the effects of the rubber sleeves 203 and the spacers 205, the bolting portion is prevented from becoming loose.

As shown in FIGS. 9 to 11, 16, and 18, the upper surface of a front portion of the outer roof 202 is formed so as to be inclined downward in the forward direction, and a seat 202B for attaching an antenna unit thereto is formed on a central area of the front portion in the left-right direction so as to bulge upward. The upper surface of the seat 202B is formed so as to be horizontal, and the above-described coupling portion 202A is formed on the upper surface. Also, the upper surface of the outer roof 202 is provided with a first water drain groove 202C that is U-shaped in plan view and extends from the start point of the downward slope in a central portion of the outer roof 202 in the front-rear direction to left and right ends of the front edge of the roof, and left and right second water drain grooves 202D that extend from the seat 202B, to which the antenna unit 161 is to be attached, to the left and right end portions of the front edge of the roof.

With the above-described configuration, rain water or washing water that has fallen on the upper surface of a rear portion of the outer roof 202 is likely to flow along the first water drain groove 202C toward the left and right ends of the front edge of the roof, and is therefore less likely to flow into an area around the antenna unit 161. Also, rain water or washing water that has fallen on the upper surface of a front portion of the outer roof 202 is likely to flow along the second water drain grooves 202D toward the left and right ends of the front edge of the roof, and is therefore less likely to be retained in an area around the antenna unit 161. Thus, while drainage around the antenna unit 161 is improved, the seating surface (the upper surface) of the seat 202B, to which the antenna unit 161 is to be attached, can be formed as a flat surface that is suitable for attaching the antenna unit 161 thereto, unlike the upper surface of a front portion of the outer roof 202.

As a result, the antenna unit 161 can be attached in an appropriate orientation, while rain water or washing water is prevented from being retained around the antenna unit 161 and causing harmful effects on the antenna unit 161 and so on.

Also, during work travel in rainy weather, a large portion of the rain water that has fallen on the upper surface of the outer roof 202 flows downward from the left and right ends of the front edge of the roof. Therefore, it is possible to effectively prevent visibility in the forward direction from degrading due to rain water falling from the front end of the outer roof 202.

Also, the upper surface of a front portion of the outer roof 202, to which the antenna unit 161 is to be attached, is formed so as to be inclined downward in the forward direction, and is lower than the upper surface of a rear portion of the outer roof 202. Therefore, the height of the vehicle including the antenna unit 161 is smaller than when the antenna unit 161 is attached to the upper surface of the rear portion of the outer roof 202. Such a configuration makes it easier to move the tractor into or out of the barn or the like to which the tractor is to be stored, via the entrance thereof.

Other Embodiments Modified from Second Embodiment

The following only describes differences from the above-described embodiment.

1. The work vehicle may employ the configurations illustrated below.

For example, the work vehicle may have a semi-crawler type configuration that is provided with left and right crawlers instead of the left and right rear wheels 110.

For example, the work vehicle may have a full-crawler type configuration that is provided with left and right crawlers instead of the left and right front wheels 109 and the left and right rear wheels 110.

For example, the work vehicle may be of a two-wheel drive type in which either the left and right front wheels 109 or the left and right rear wheels 110 are driven.

For example, the work vehicle may have an electric type configuration that is provided with an electric motor instead of the engine 106.

For example, the work vehicle may have a hybrid type configuration that is provided with the engine 106 and an electric motor.

For example, the work vehicle may be provided with a protection frame instead of the cabin 104.

2. Only the layered display lights 246 or only the blinker lamps 242 may be provided as display lights.

Also, a plurality of rotating lights of different display colors may be provided as display lights.

3. The number of layers of display units 246A to 246C included in each layered display light 246 may be variously modified, and four or more display units of different display colors may be layered, for example.

4. The positions to which the layered display lights 246 are attached may be variously modified. For example, the layered display lights 246 may be attached to the left and right front pillars 173.

Also, if the work vehicle is provided with a protection frame instead of the cabin 104, the layered display lights 246 may be attached to the left and right-side portions of the protection frame.

5. A work vehicle according to the present invention is not limited to the tractor described in the above embodiments. The present invention is applicable to another work vehicle that is provided with an automatic driving electronic control system for automatically driving a vehicle body such as a ridable mower, a combine harvester, a ridable rice transplanter, or a wheel loader.

DESCRIPTION OF REFERENCE SIGNS

First Embodiment

6: Cabin
24: Roof
24A: Coupling Portion
24a: Through Hole
24D: Inclined Surface
24F: Bulging Edge Portion
24G: Water Drain Groove
24Ga: First Groove Portion
24Gb: Second Groove Portion
24H: Recessed Portion
24K: Guide Groove
24Ka: First Guide Portion
24Kb: Second Guide Portion
29: Roof Frame
32: Outer Roof
34: Internal Space
51: Electronic Control System
56: Antenna Unit
65: Communication Module
68: Communication Antenna
70: Remote Control Tool
73: Support Tool
76: Ground Plane ("Element")
80: Rubber Sleeve
80A: Upper Flange Portion
80B: Lower Flange Portion
85: Cable
86: Cable Second Embodiment 102: Travel Apparatus
104: Cabin
130F: External Display Control Unit
151: Electronic Control System
161: Antenna Unit
162: Roof
163: Inertial Measurement Unit
175: Rear Pillar
202A: Coupling Portion
202a: Through Hole
202B: Seat
202D: Water Drain Groove
203: Rubber Sleeve
203A: Flange Portion
24: Combination Lamp
242: Blinker Lamp ("Display Light")
244: Support Member
245: External Display Unit
246: Layered Display Light ("Display Light")
246A: Display Unit
246B: Display Unit
246C: Display Unit
L: Wheelbase
T: Track

The invention claimed is:

1. A work vehicle comprising:
an electronic control system for automatic driving through which a vehicle body is automatically driven; and
a cabin with which a boarding space is formed,
wherein the electronic control system includes an antenna unit for satellite navigation, and the antenna unit is attached to a central area of a roof of the cabin in a left-right direction,
an upper surface of an area of the roof around the antenna unit is formed so as to be an inclined surface that is inclined in a front-rear direction,
left and right end portions of the roof are provided with left and right bulging edge portions that bulge upward from the left and right end portions and have a length that spans between front and rear ends of the roof,
water drain grooves that guide water on the roof toward the left and right bulging edge portions such that water detours the antenna unit, and
the water drain grooves include a first groove portion that is provided in the inclined surface at a position on a higher-side area that is higher than the antenna unit and extends in the left-right direction so as to span between the left and right bulging edge portions, and left and right second groove portions that respectively extend from left and right ends of the first groove portion toward left and right ends of a front edge of the roof across the left and right bulging edge portions.

2. The work vehicle according to claim 1,
wherein the roof is provided with a recessed portion for connecting a connector for the antenna unit thereto, at a position on a higher-side area of the inclined surface that is adjacent to the antenna unit.

3. The work vehicle according to claim 1,
wherein the roof is provided with a communication antenna that is attached to an area that is adjacent to the antenna unit,
the roof is provided with left and right guide grooves that respectively position and guide a cable that is connected to the antenna unit and a cable that is connected to the communication antenna, to positions below the roof, and
the left and right guide grooves include first guide portions that are formed in the inclined surface and second guide portions that are formed in the left and right bulging edge portions.

* * * * *